July 30, 1963 R. G. FISHER 3,099,718
UNIVERSAL LINE CONCENTRATOR
Filed May 24, 1960 34 Sheets-Sheet 4

INVENTOR
R.G. FISHER
BY
John C. Allbrecht
ATTORNEY

INVENTOR
R.G. FISHER
BY
ATTORNEY

July 30, 1963

R. G. FISHER 3,099,718

UNIVERSAL LINE CONCENTRATOR

Filed May 24, 1960

INVENTOR
R.G. FISHER
BY
John C. Allnutt
ATTORNEY

July 30, 1963  R. G. FISHER  3,099,718
UNIVERSAL LINE CONCENTRATOR
Filed May 24, 1960  34 Sheets-Sheet 16

INVENTOR
R.G. FISHER
BY
John C. Allrecht
ATTORNEY

July 30, 1963 R. G. FISHER 3,099,718
UNIVERSAL LINE CONCENTRATOR
Filed May 24, 1960 34 Sheets-Sheet 17

INVENTOR
R.G. FISHER
BY
John C. Albrecht
ATTORNEY

July 30, 1963  R. G. FISHER  3,099,718
UNIVERSAL LINE CONCENTRATOR
Filed May 24, 1960  34 Sheets-Sheet 18

INVENTOR
R.G. FISHER
BY
John C. Albrecht
ATTORNEY

July 30, 1963  R. G. FISHER  3,099,718
UNIVERSAL LINE CONCENTRATOR
Filed May 24, 1960  34 Sheets-Sheet 25

INVENTOR
R.G. FISHER
BY
John C. Albrecht
ATTORNEY

July 30, 1963    R. G. FISHER    3,099,718
UNIVERSAL LINE CONCENTRATOR
Filed May 24, 1960    34 Sheets-Sheet 34

FIG.34

| FIG.3 | FIG.4 | | | | | | |
| FIG.6 | FIG.7 | FIG.5 | | | | | |
| FIG.10 | FIG.11 | FIG.8 | FIG.9 | | | | |
| FIG.14 | FIG.15 | FIG.12 | FIG.13 | | | | |
| | FIG.16 | | | | | | |

| FIG.19 | FIG.20 | FIG.21 |
| FIG.22 | FIG.23 | FIG.24 | FIG.25 |
| FIG.26 | FIG.27 | FIG.28 | FIG.29 |
| FIG.30 | | | FIG.31 |

*INVENTOR*
*R.G. FISHER*
BY
John C. Allrecht
ATTORNEY

United States Patent Office 3,099,718
Patented July 30, 1963

3,099,718
UNIVERSAL LINE CONCENTRATOR
Richard G. Fisher, Birmingham, Mich., assignor to American Telephone and Telegraph Company, New York, N.Y., a corporation of New York
Filed May 24, 1960, Ser. No. 31,349
18 Claims. (Cl. 179—18)

This invention relates in general to telephone systems and more particularly to subscriber line concentrating systems.

Single party subscriber stations are generally connected to a telephone central office by means of a pair of conductors. Often party line subscribers share a cable pair to the central office for a portion of the distance; however, in many instances, party line subscribers also each require a pair of conductors from the subscriber's station to the central office and there is merely a sharing of central office line equipment. Where subscribers are located at a considerable distance from a telephone central office, the cost of wire facilities is appreciable and the problem of providing wire facilities in sufficient quantity is not without its own peculiar problems. For example, where a community has experienced unanticipated growth, the underground ducts which carry subscribers' cables are often fully utilized and additional cable capacity can be provided only after major construction efforts have been undertaken.

It is well known that only a portion of a group of subscribers have a need for service at any one particular instant. Such requirements vary from subscriber group to subscriber group; however, traffic studies can readily develop representative service requirements of a group of subscribers.

Line concentrating systems are designed with the above-noted traffic considerations in mind and in a line concentrator system a group of subscriber stations are connected to a telephone central office by a group of transmission paths which are fewer in number than the number of subscribers served. A line concentrating system includes apparatus for recognizing the transmission needs of a subscriber's line and for establishing the required transmission and signaling paths between such subscribers and the telephone central office.

Subscriber line concentrators fall in two broad categories; namely, universal and non-universal. A universal line concentrator, although it may have optional internal wiring may generally be used with any of the well-known present-day telephone switching systems. A non-universal concentrator, however, is designed for use with one particular type of telephone switching system and, in fact, generally represents a dispersion of a portion of the particular telephone switching system to which the concentrator applies. The subject invention is a universal type concentrator.

It is a general object of this invention to provide an improved communication switching system wherein subscriber stations are selectively and individually connected to a telephone central office by a smaller number of common trunks.

More particularly, an object of this invention is the optimum utilization of electronic and electromechanical techniques whereby subscriber needs are more economically and efficiently served.

It is another object of this invention to provide the desired interconnections between subscriber stations and the central office without adversely affecting the transmission or signaling characteristics of the telephone central office.

It is a further object of this invention to serve subscriber requests for service with a minimum of delay.

These and other objects of this invention are attained in one illustrative embodiment wherein requests for service and requests for origination and termination are handled on an electronic basis and wherein the communication paths are established by electromechanical means.

The concentrator system comprises a central office unit which is located at a telephone central office and is connected to subscriber line circuits therein and a field unit which is located some distance from the central office and is connected to subscriber stations in the region of the field unit. System operation is controlled by a concentrator control which is located in the central office unit. Requests for service at both the central office and at the field unit are detected by electronic scanning circuits. Once a request for service has been detected, the connection between the subscriber station and its associated central office line circuit is established and maintained by electromechanical means.

Requests for release of a trunk are detected by an electronic trunk release scanner which is located at the central office unit and which operates simultaneously with the line scanners rather than on an interleaved basis. Through the unique combination of electronic and electromechanical techniques employed in this system, subscriber service is efficiently and economically provided.

In accordance with one feature of this invention, subscriber stations and their associated central office line circuitry, when served by the subject invention, are interconnected by a transmission path which is comparable in transmission and signaling performance to that of a fixed cable pair of the same length.

In accordance with another feature of this invention, requests for service from the field unit are advantageously returned to the central office over a simplex transmission path.

In accordance with another feature of this invention, subscriber lines and the trunks interconnecting the central office unit and the field unit are simultaneously scanned.

The above and other objects and features of this invention will be more readily understood from the following description when read with respect to the drawings in which:

FIG. 34 shows the arrangement of FIGS. 3 through 31.

GENERAL DESCRIPTION

Figure 1:
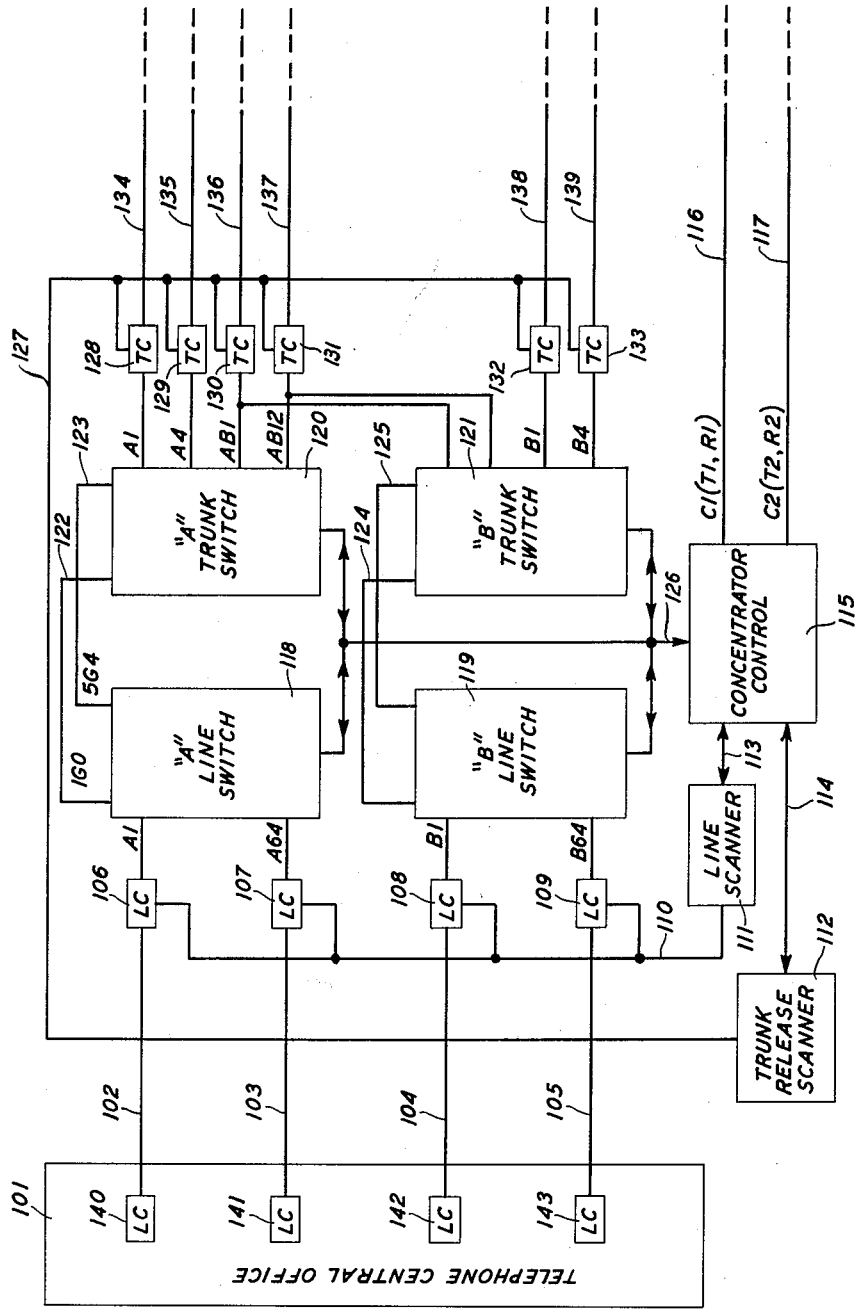
FIG. 1 is a general block diagram schematic of a concentrator central office unit in accordance with this invention.
Figure 2:
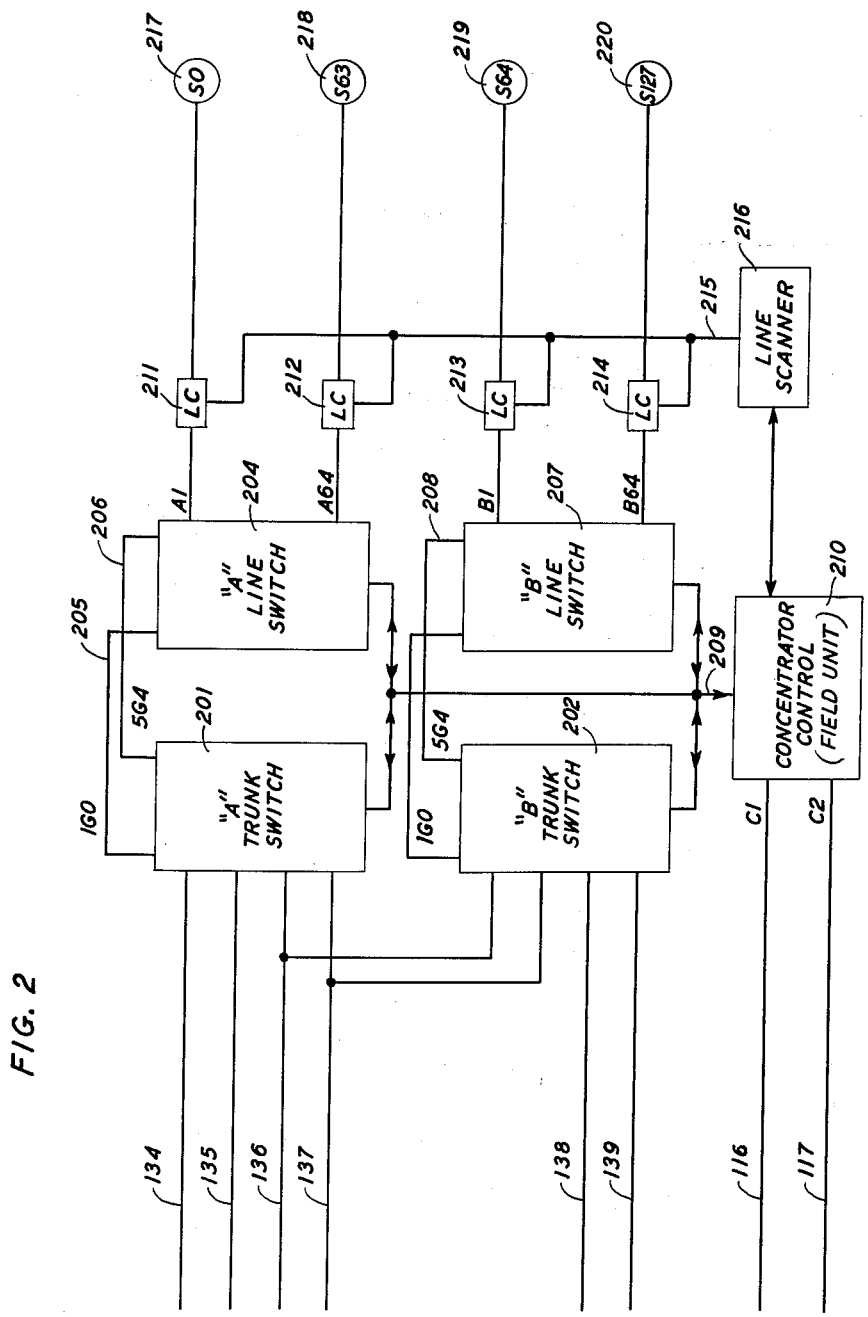
FIG. 2 is a general block diagram schematic of a line concentrator field unit.

The principal divisions of a line concentrator system in accordance with this invention are shown in FIGS. 1 and 2. The Concentrator Control 115 sets the pace for work operations within the system. A pulse source therein governs the operation of the Line Scanners 111 and 216 which are located at the central office and at the field unit, respectively, and of the Trunk Release Scanner 112. In this one illustrative embodiment, each concentrator system serves 128 subscriber stations which are represented in FIG. 2 by the stations 217 through 220. Associated with each of these stations is a field unit scanning circuit such as 211 through 214, a central office unit scanning circuit such as 106 through 109, an interconnecting transmission and signaling path from the central office to the scanning circuits such as 102 through 105, and individual subscriber line circuits 140 through 143 in the telephone central office 101.

Terminating calls directed to subscriber stations served by the subject concentrator system are detected by the Central Office Unit Line Scanner 111 which is connected to the subscriber line scanning circuits such as 106 through 109 by the conductor group 110. Requests for origination of service by subscribers served by the system are detected by means of the Field Unit Line Scanner 216 which is connected to the field unit line scanning circuits such as 211 through 214 by means of the conductor group 215. The Central Office Line Scanner 111 and the Field Unit Line Scanner 216 are under the control of the Concentrator Controller 115 which directs the attention of the two scanners simultaneously to a particular subscriber station and its associated central office line circuit. That is, when the S0 subscriber station 217 line scanning circuit 211 is being scanned by the Line Scanner 216, its associated central office scanning circuit 106 is being scanned by the Line Scanner 111.

In the absence of a request for service, line circuits are sequentially and periodically scanned. A scanning rate of 500 lines per second is employed herein. The number of requests for service, both originating and terminating, is statistically small compared to the number of scans performed, accordingly, the Trunk Release Scanner 112 is arranged to scan the trunk circuits such as 128 through 133 simultaneously with the scanning of the line scanning circuits such as 106 through 109.

The 128 subscribers' lines served by the concentrator are divided equally into A and B groups of lines. Associated with each group of lines is a central office line switch such as 118 and 119, a central office trunk switch such as 120 and 121, a field unit trunk switch such as 201 and 202, and a field unit line switch such as 204 and 207. Twenty transmission trunks interconnect the central office and field units. Four of the trunk circuits such as 134 and 135, 138, and 139 are permanently associated with each of the groups of sixty-four lines and twelve of the trunks are employed in common by the two groups of lines.

Once a request for action has been detected by the Line Scanner 111, the Trunk Release Scanner 112, or the Line Scanner 216, further scanning is terminated until the necessary action has been completed.

When a request for service has been detected by either the Line Scanner 111 or the Lie Scanner 216, the Concentrator Control 115 detects the identity of the first idle central office to field unit transmission trunk and then orders the appropriate interconnections through the central office unit and field unit line and trunk switches. Control communication between the Central Office Concentrator Control 115 and the Field Unit Concentrator Control 210 is by way of two control cable pairs 116 and 117.

Upon detection of a trunk release by the Scanner 112, the Central Office Concentrator Control 115 takes the steps necessary to release the transmission paths through both the central office and field unit line and trunk switches. Again, orders from the Central Office Concentrator Control 115 to the Field Concentrator Control 210 are transmitted over the control pairs 116 and 117.

DETAILED DESCRIPTION

Supervisory Scan of Lines at the Central Office Unit

The following discussion is directed to the electronic scanning of subscribers' lines, both at the central office unit and the field unit, and the scanning of trunks to detect requests for release thereof.

Figure 3:
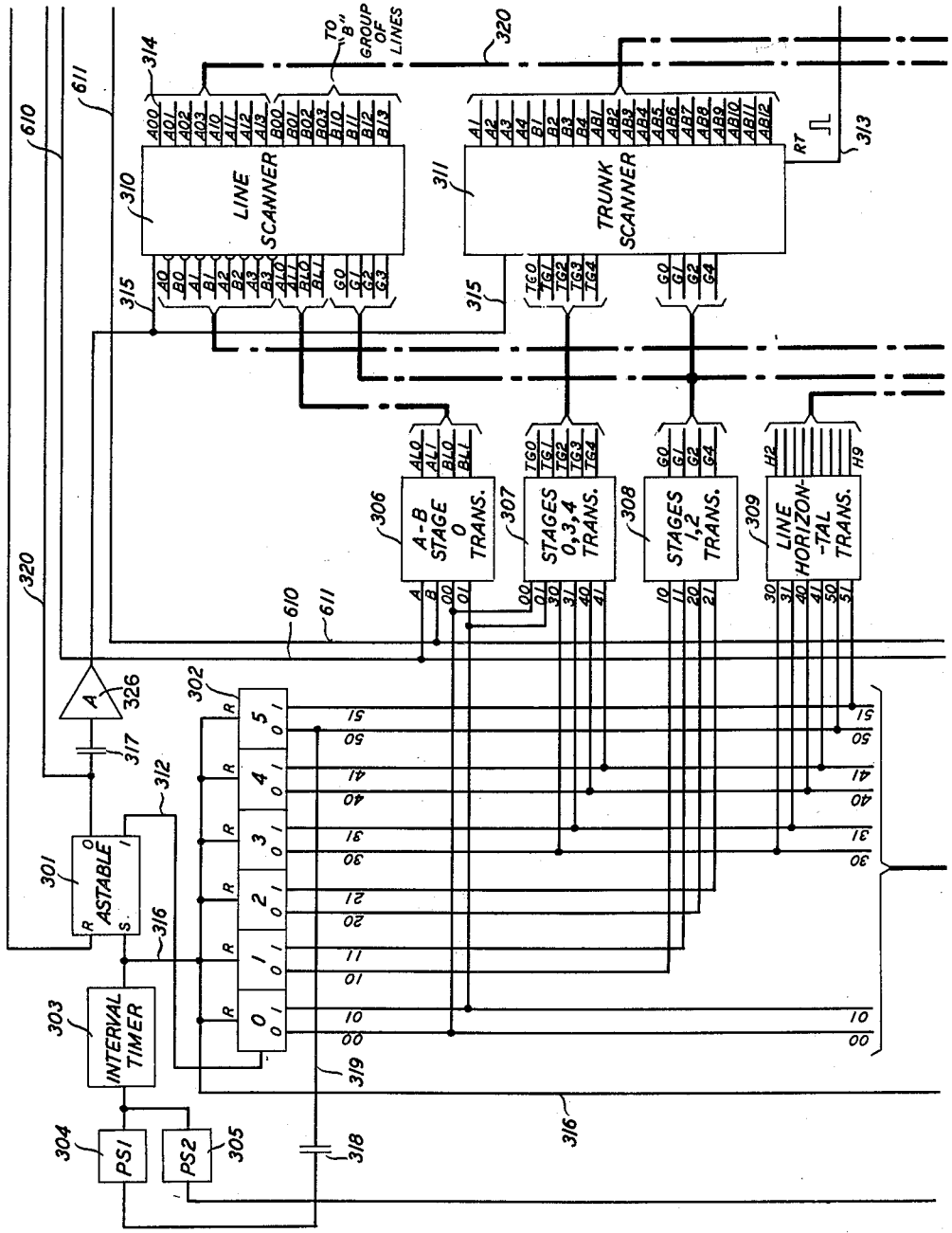
FIGS. 3 through 16 are a schematic representation of a line concentrator central office unit in accordance with one illustrative embodiment of this invention.

In FIG. 3, there is shown an Astable Circuit 301 which is the basic timing source for this system. The Astable Circuit 301 produces square wave pulses having a repetition rate of approximately 500 pulses per second and a pulse duration of 500 microseconds. Accordingly, the Astable Circuit 301 is in its "0" state for 1500 microseconds and in its "1" state for 500 microseconds, alternately. The "0" terminal of the Astable Circuit 301 is connected to various points throughout the central office unit of the concentrator and is connected to the field unit via appropriate gates and one of the two control pairs. The "1" terminal of the Astable Circuit is employed as an input signal to the 6 stage Binary Counter 302. The 6 stage Binary Counter 302 determines the identity of the trunk being scanned for supervision and in combination with the A—B flip-flop 601 determines the identity of the line being scanned. Each time the Astable Circuit 301 is set to its "1" state, a pulse on conductor 312 serves to increment the Counter 302 by one count.

A 6 stage Binary Counter has 64 stable states. These states range from the condition wherein all stages are in their "0" state to the condition wherein all stages are in their "1" state. The Binary Counter has completed its natural cycle when the sixth or most significant stage is reset to its "0" state. To assure synchronization of operation between the central office unit and the field unit, a synchronizing sequence is performed whenever a group of 64 lines has been scanned and whenever a service or release request has been served.

As previously indicated, each time the Astable Circuit 301 is set to its "1" state, the Binary Counter 302 in the central office unit is incremented by one count. Scanning at both the central office unit and the field unit is under control of the Astable Circuit 301 and a scanning pulse is generated each time the Astable Circuit 301 is reset to its "0" state.

The "0" terminal of the Astable Circuit 301 is connected through conductor 320 to the AND gates 419 and 420 which are selectively enabled in accordance with the setting of the A—B flip-flop 601. If the A—B flip-flop 601 is in the A state, the AND gate 419 will be enabled upon the occurrence of a pulse on conductor 320. A scanning pulse which is transmitted through AND gate 419 will generate a signal of a first polarity across the terminals 416 and 417 of the Line Transformer 401 and a scanning pulse transmitted through the AND gate 420 will produce a pulse of the opposite polarity across the terminals 416 and 417 of the Line Transformer 401. As will be explained later, during scanning the TR relay 418 is energized; therefore, signals which appear at the terminals 416 and 417 are transmitted via conductors 407 and 408, make contacts 410 and 411, and the first control pair, conductors 414 and 415, of cable 421 to the field unit for use therein. The operation of the field unit will be later described in detail and it is sufficient at this point to note that the field unit recognizes the polarity of pulses received over the control pair.

When the natural cycle of the Binary Counter 302 has been completed and the sixth stage is returned to its "0" state, a pulse will be provided to the Pulse Stretcher 304 via conductor 319 and capacitor 318. The Pulse Stretcher 304, in response to a short pulse from conductor 319, provides a signal of appropriate duration to the Interval Timer 303. The Interval Timer is a monostable circuit which energizes conductor 316 for approximately 5,000 microseconds. The signal on conductor 316 is employed to: (1) hold the Astable Circuit 301 in its "1" state; (2) reset all stages of the Binary Counter 302 to their "0" state (at this point in time, the Binary Counter should be fully reset; however, in the event of noise or faulty operation, the present act assures the desired state); and (3) changes the state of the A—B flip-flop 601.

In the normal scanning of lines, pulses either positive or negative are transmitted from the central office unit at a 500 pulse per second rate. That is, once every 2,000 microseconds, a new pulse is transmitted. The Interval Timer 303 holds the Astable Circuit 301 in its "1" state for 5,000 microseconds; therefore, the transmission of pulses to the field unit is halted during this period. The 5,000 microsecond interval between scanning of groups of lines permits: (1) resetting of the Binary Counter 302 at the central office unit; (2) resetting the Binary Counter 2501 in the field unit which is the counterpart of the Counter 302; and (3) electrical recovery of the first control pair (conductors 414 and 415 of cable 421) in preparation for transmission of pulses of opposite polarity thereon.

At a starting point in time, the A—B flip-flop 601 may be in either the A or B state and the Counter 302 may be in any one of its 64 stable states. The state of the A—B flip-flop 601 and the state of the Binary Counter 302, are employed as input signals to the Translators 306 through 309. The input signals to each of these four translators is on a two-rail basis. That is, conductors representative of the two binary states are connected to the translators as input conductors.

The Translator 306 is a 2 bit binary to 1-out-of-4 translator which has as its input the "A" and "B" conductors 610 and 611, respectively, of the A—B flip-flop 601 and the "0" and "1" conductors of the first stage of the Binary Counter 302.

The Translator 307 is a 3 bit binary to 1-out-of-8 translator wherein five of the eight output conditions are utilized. The input signals to the Translator 307 comprise the "0" and "1" output conductors of the first, fourth, and fifth stages of the Binary Counter 302.

The Translator 308 is a 2 bit binary to 1-out-of-4 translator which has as its input conductors the "0" and "1" output conductors from the second and third stages of the Binary Counter 302.

The Translator 309 is a 3 bit binary to 1-out-of-8 translator. The input conductors to the Translator 309 comprise the "0" and "1" output conductors of the fourth, fifth, and sixth stages of the Binary Counter 302.

The 128 subscriber stations served by a concentrator in accordance with this one illustrative embodiment are divided evenly into two groups of 64 lines each, commonly referred to as the A and B groups of lines. Each group of 64 lines is further divided into 4 subgroups, namely G0 through G3, each of which includes 16 lines. The subscribers' lines terminate on the line crossbar switches and their arrangement within the switch is illustrated in FIG. 17.

Figure 17:
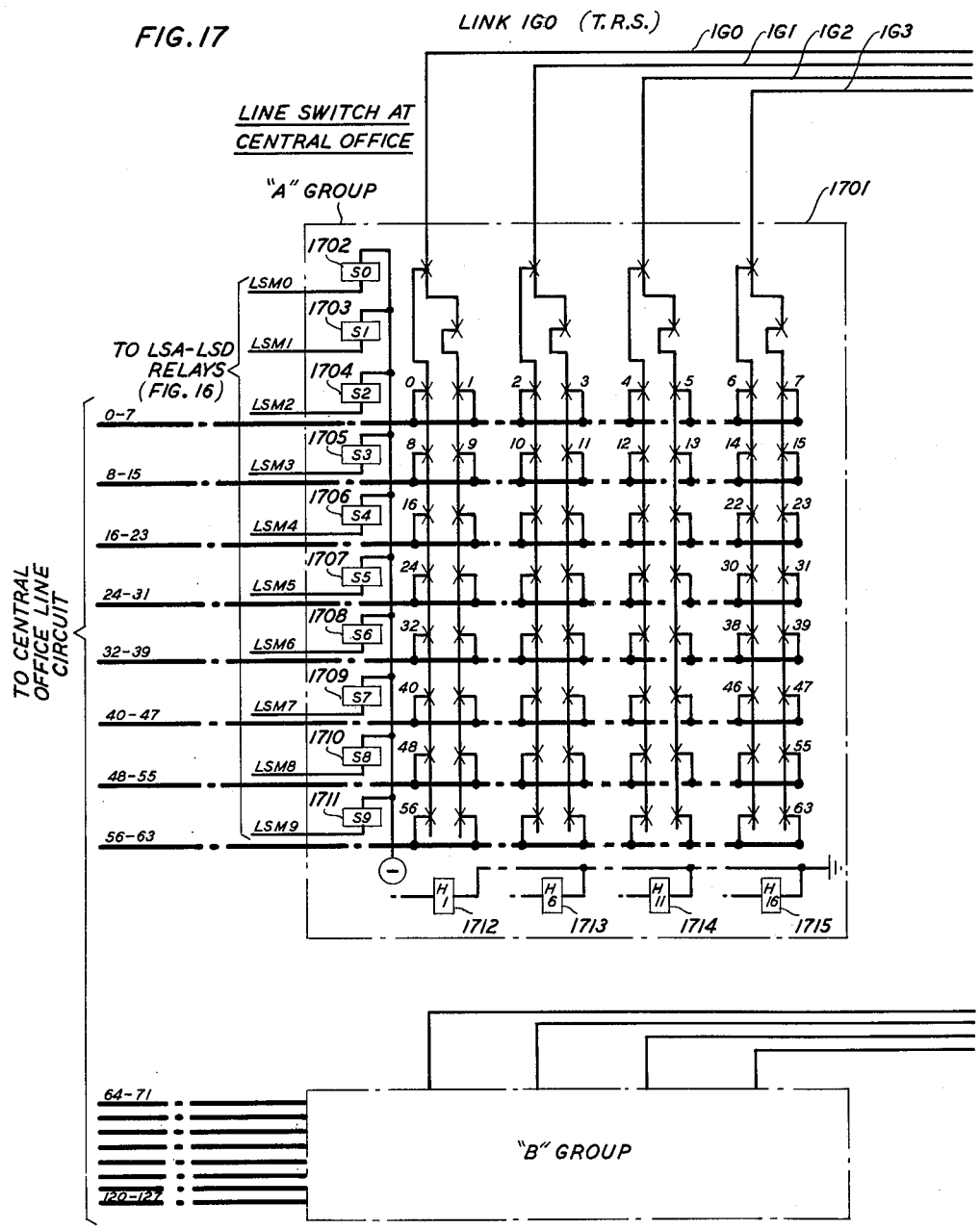
FIG. 17 is a schematic representation of a line crossbar switch as employed in this invention.

The crossbar switch of FIG. 17 comprises 20 verticals and 10 horizontals. At each intersection of the switch there lies a group of 6 contacts representing two 3 wire subscriber circuits. The contacts at an intersection are selectively closed by first enabling a select magnet which is associated with one of the 10 horizontals on the switch and by then energizing a hold magnet associated with one of the 20 verticals on the switch. Once the hold magnet has been energized, the select magnet may be de-energized and subsequently employed in the selection of another set of crosspoint contacts.

In this one illustrative embodiment, two of the horizontals on the switch; namely, H0 and H1, are employed for purposes of circuit steering. That is, sets of crosspoints which are selected by the select magnets of the first or second level are employed in conjunction with the sets of crosspoints in horizontals 2 through 9 to determine which three of the six contacts of the latter group of crosspoints is to be employed. In FIG. 17 there are shown 2 X's at the intersections of lines projected from each select magnet and each hold magnet. Each X represents a group of 3 contacts. The contact groups which lie to the left of a hold magnet are shown terminating on the first horizontal of the crossbar switch while the contact sets to the right of the hold magnet are shown terminating on the second horizontal of the crossbar switch. Alongside each contact set there is a numerical label which indicates the subscriber's line associated with that particular contact set. Only the crossbar switch for the A group of lines is shown in detail in FIG. 17; therefore, each of the lines labeled 0 through 63 lies in the A group. As stated earlier, the A group of lines is divided into four subgroups, G0 through G3. Further, it was previously stated that the crossbar switch 1701 has a total of 20 verticals. Four links, 1-G0, 1-G1, 1-G2, and 1-G3 are shown leaving the top of the crossbar switch 1701. Each of these links represents one link of a group of five links. That is, there are four groups of links 1-G0 through 5-G0, 1-G1 through 5-G1, 1-G2 through 5-G2, and 1-G3 through 5-G3.

The manner in which a line is connected to a link can best be understood by way of illustration. For example, assume that line 24 is to be connected to link 1-G0. Under these conditions, the S0 select magnet 1702 associated with the first horizontal of switch 1701 is operated and S5 select magnet 1707 associated with the sixth horizontal of the crossbar switch is also energized. The interconnection of line 24 to link 1-G0 is completed by energizing the H1 hold magnet 1712 which closes through the appropriate contacts to connect the subscriber's line 24 to link 1-G0. If it were desired to connect subscriber line 25 through to link 1-G0, the S1 and S5 select magnets 1703 and 1707 would be energized in conjunction with the H1 hold magnet 1712.

Figure 18:
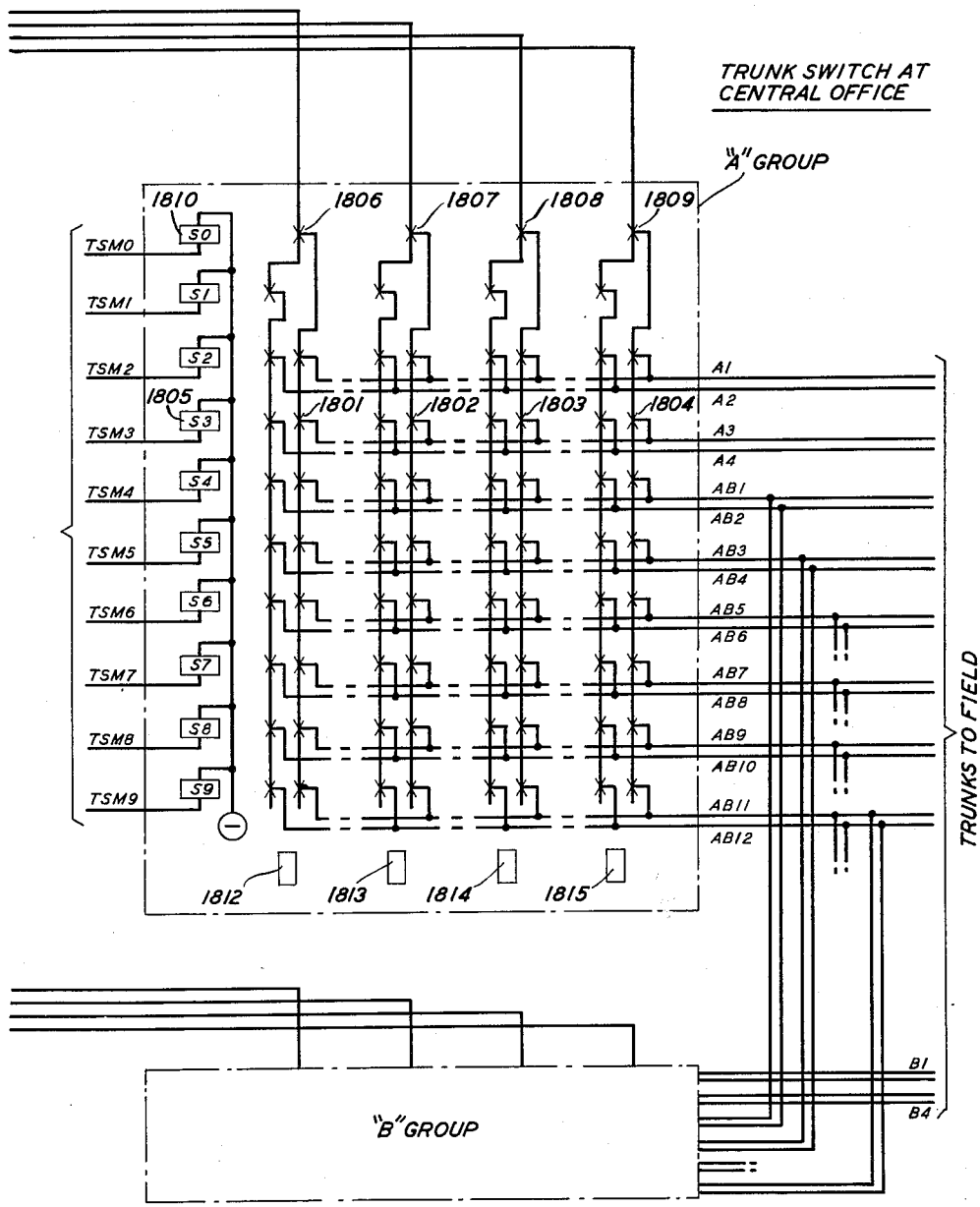
FIG. 18 is a schematic representation of a trunk crossbar switch as employed in this invention.
Figure 19:
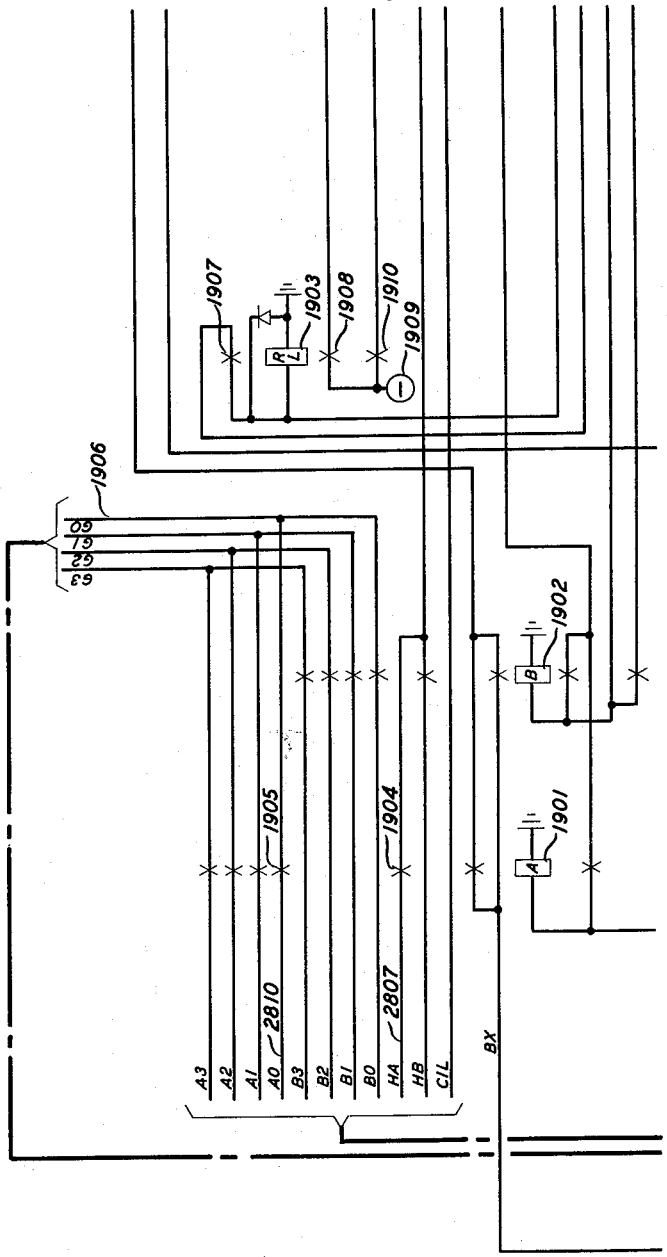
FIGS. 19 through 31 are a schematic representation of a line concentrator field unit in accordance with one illustrative embodiment of this invention.
Figure 20:
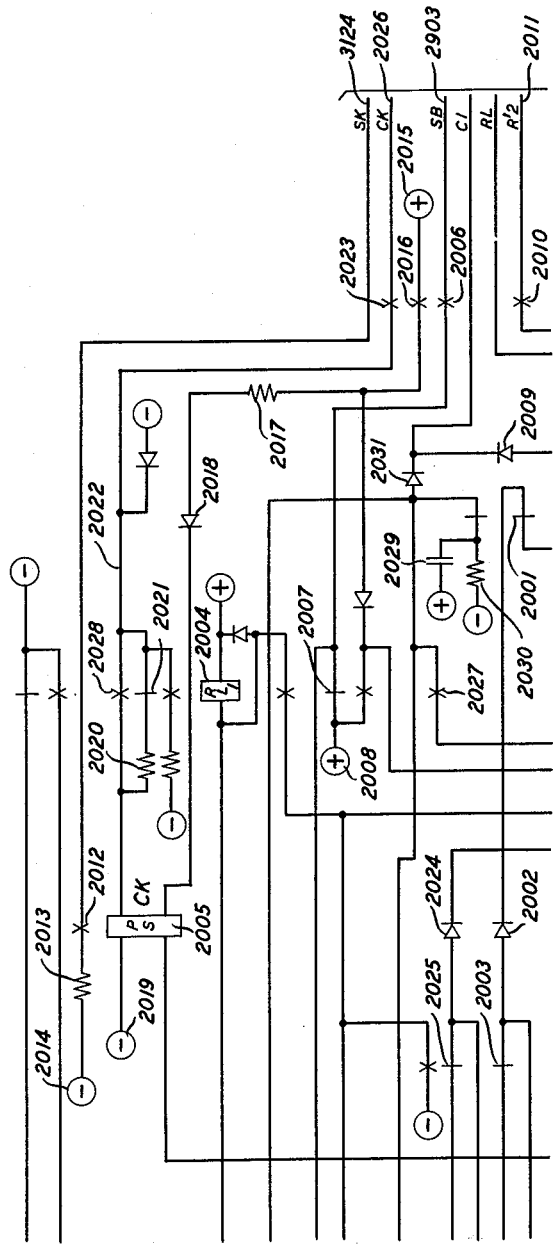

From an examination of FIG. 17, it can be seen that a line within the group of 64 lines can be identified by specifying a steering horizontal, a line horizontal, and a subgroup. That is, there are two steering horizontals, eight line horizontals, and four subgroups for a total of 64 choices. The vertical conductors of the line and trunk switches of FIGS. 17 and 18, are, of course, continuous; the making of a crosspoint on any one of levels S2 through S9 sufficing to connect the vertical conductor (selected by operation of either S0 or S1) to the appropriate horizontal.

Figure 13:
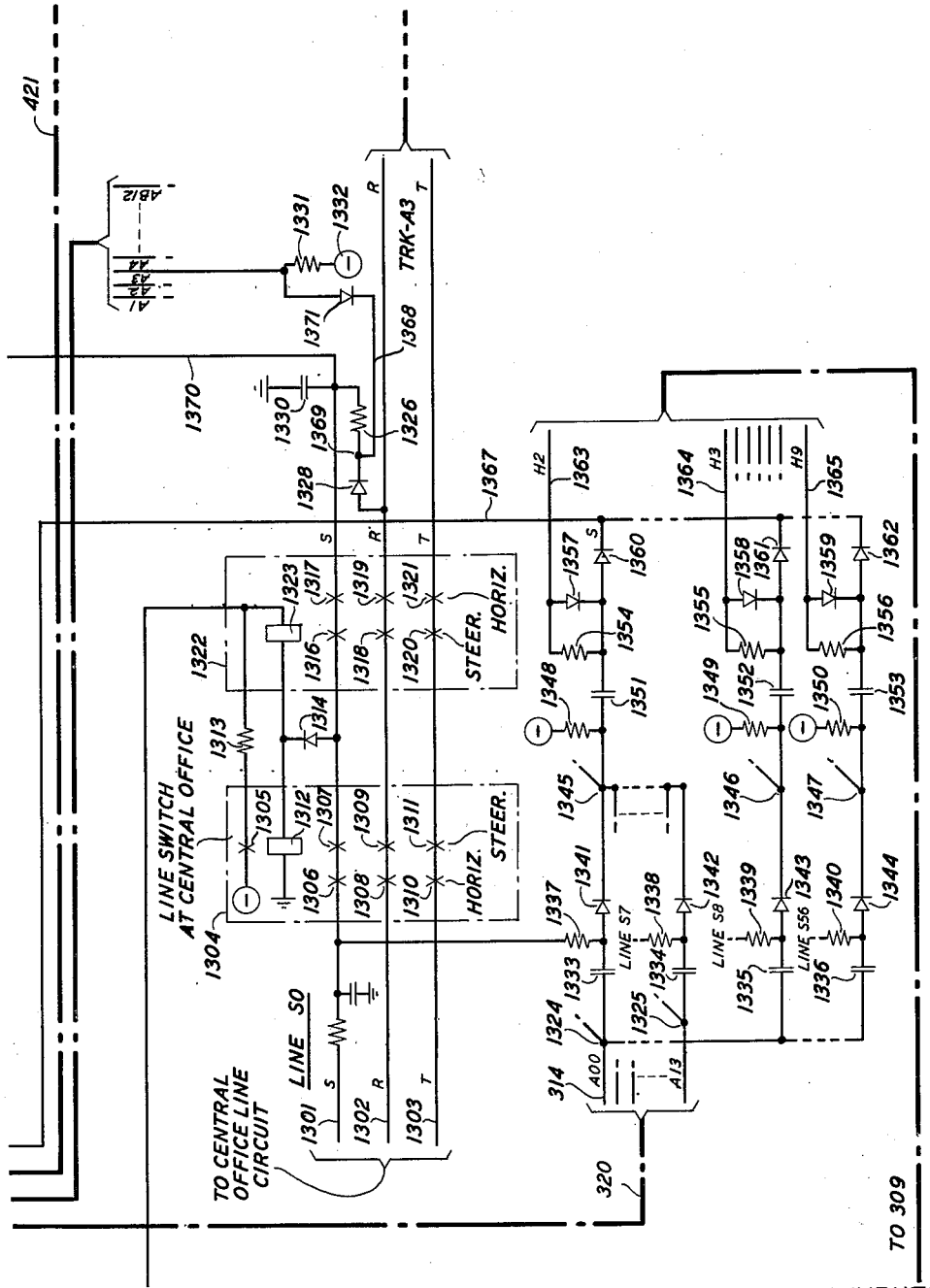

The central office unit scanning circuits such as 106 through 109 are shown in detail in FIG. 13. In the upper portion of FIG. 13, there is shown a portion of central office line switch 1304 and a portion of the central office trunk switch 1322. Specifically, there is shown the portion of the line switch relating to subscriber's line number S0, the portion of the trunk switch relating to trunk A3 and one of the interconnecting links.

The details at the bottom of FIG. 13 show the interconnection of the subscriber line circuits which can be best understood by reference to the line switch 1701 of FIG. 17. There are 16 subscribers' lines such as S0, S1, S8, S9, S16, S17, S24, S25, S32, S33, S40, S41, S48, S49, S56, and S57 in each subscriber subgroup and there are 8 subscribers' lines in each line switch horizontal. The scanning circuit for subscriber number S0 comprises the common point 1324, capacitor 1333, resistor 1337, diode 1341, and common point 1345. Subscribers' lines which are within a subgroup and which employ a common steering level are multiplied at a common point such as 1324. Subscriber lines appearing on a single line switch horizontal are multiplied at a common point such as 1345. That is, at the subgroup common point 1324, there are connected 8 subscribers' line circuits such as S0, S8, S16, S24, S32, S40, S48, and S56 and at the horizontal common point 1345 there are connected 8 subscribers' line circuits such as 0 through 7. Enabling signals for the subscriber line scanning circuits are derived from the Line Scanner 310 and the Line Horizontal Translator 309.

The output conductors of the Line Scanner 310 are labeled with three-element alpha-numeric designations. The first element of the label, either "A" or "B," designates the line group being scanned; the second element either "0" or "1" defines the steering level to which the line is assigned and the third element, which may be any value from "0" through "3," designates the subgroup in which the line appears. The output conductors from the Line Scanner 310 are connected to subgroup common points such as 1324 and 1325. The output conductors of the Scanner 310 are energized only during a portion of the time the Astable Circuit 301 is in its "0" state.

In FIG. 13, the scanning circuit for subscriber line S7 comprises the common point 1325, capacitor 1334, resistor 1338, diode 1342, and common point 1345. The scanning circuits for subscribers' lines S0 through S7 are connected in parallel to the horizontal common point 1345 and these subscribers' lines employ in common the horizontal selection circuitry comprising the H2 conductor 1363, resistor 1354, diode 1357, and diode 1360 which is connected to the scanner output conductor 1367.

As previously stated, the states of the A—B flip-flop and of the Binary Counter 302 define the subscriber line and the transmission trunk which is being scanned. The state of the A—B flip-flop 601 determines whether a line in the A or B group of lines is being scanned. The "0" stage of the Binary Counter 302 defines the line switch steering level, stages 1 and 2 define the subscriber subgroup and stages 3 through 5 define the line horizontal.

Scanning of lines under the influence of the output conductors of Scanner 310 proceeds during all times in which a connection to a trunk is available to the scanned subscriber's line. The A0 through B3 inhibiting conductors 1140 through 1147 are selectively energized whenever all links within a subscriber's subgroup are busy.

Figure 11:
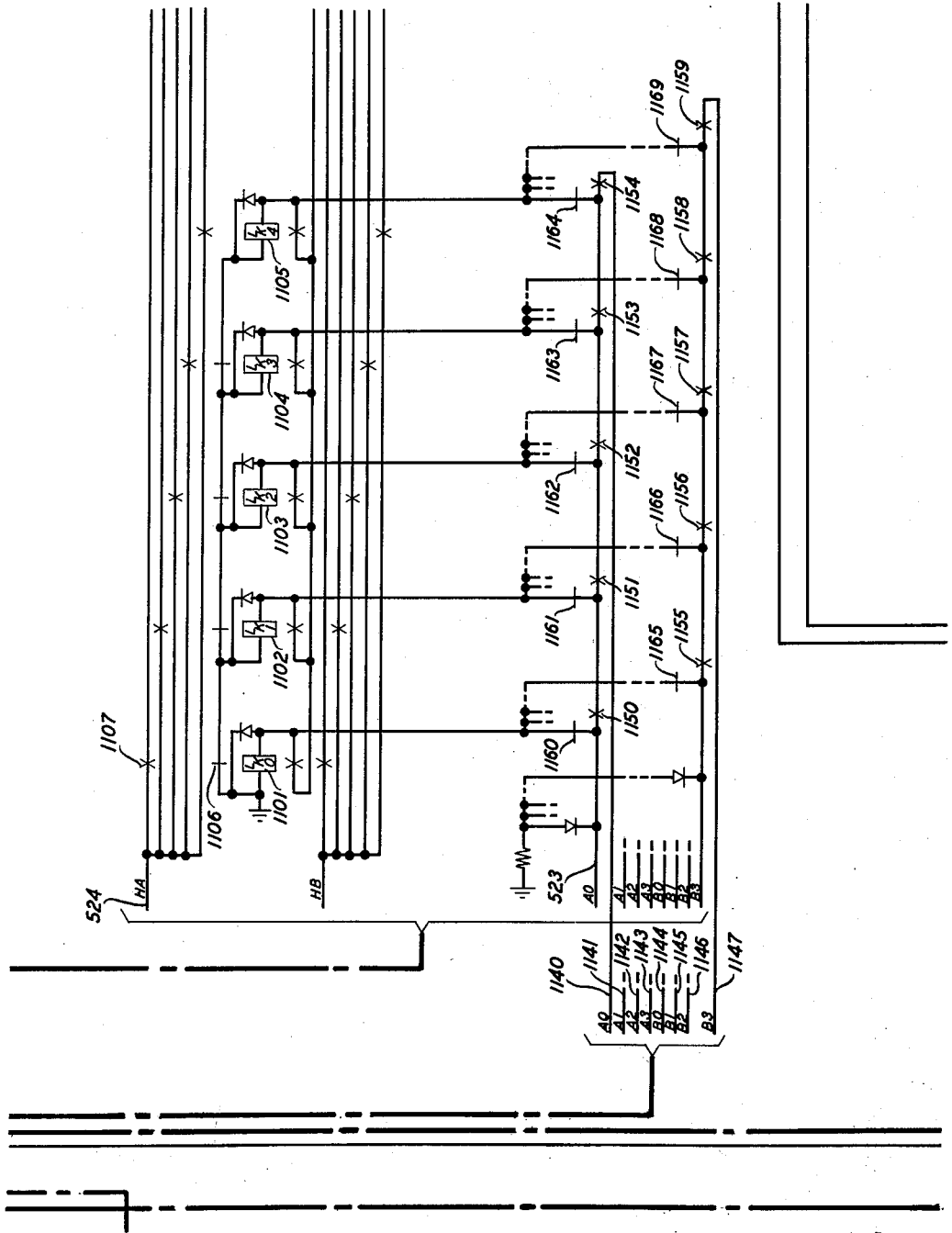
Figure 12:
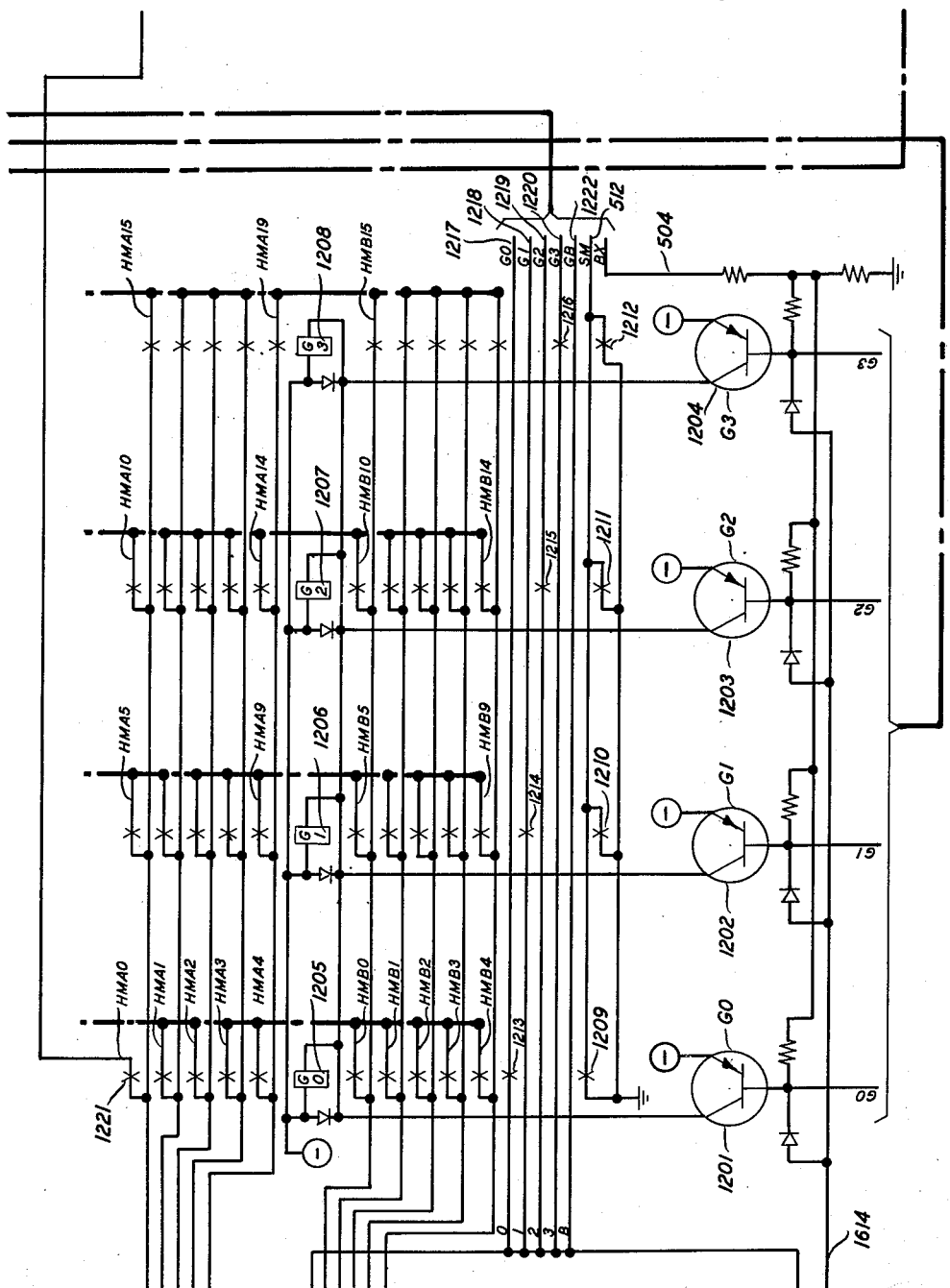

An all-links-busy contact chain is shown in FIG. 11. The particular trunk crossbar switches employed in this one illustrative embodiment include auxiliary contacts such as 1150 through 1169 which are operated by the switch hold magnets. As previously explained with respect to FIG. 17, there are five links such as 1–G0 in FIG. 17 to serve a subscriber's line subgroup. If all links available to the subscriber's line under immediate consideration are found to be busy, the scanning of lines in that subgroup is suspended until a link becomes available. The availability of links is indicated by the electrical state of the A0 through A3 and B0 through B3 inhibiting conductors 1140 through 1147. The auxiliary contacts of hold magnets assigned to a particular subscriber's subgroup are serially connected; therefore, when all hold magnets within a subscriber's subgroup are simultaneously energized, a complete path will be provided between the appropriate one of the inhibit conductors appearing on the Line Scanner 310 and a source of potential. The complete path to this source of potential will be later described in detail. The operation of the Line Scanner 310 is suspended for the respective subgroup whenever one of the inhibit conductors A0 through A3 and B0 through B3 is energized.

The scanning of subscribers' lines at the central office unit can be best understood by a specific example in which subscriber's line number S0 is being scanned. In FIG. 17, it is seen that subscriber's line number S0 is in the A group of lines, is served by the first steering level, is in the first subgroup of lines of the A group, and is on the third horizontal H2 of the line switch. When subscriber's line S0 is being scanned, the A—B flip-flop 601 will be in the "A" state and all stages of the Binary Counter 302 will be in the "0" state. Assuming that there are links available to serve line S0, the Line Scanner 310 will not be inhibited, and the AL0 and G0 input conductors will be energized. Under these input conditions, the A00 output conductor 314 is energized. Conductor 314 is a portion of cable 315 and is shown terminating in FIG. 13 at common point 1324. When the Astable Circuit 301 changes from its "1" to its "0" state, a "P" pulse is applied through condenser 326 and amplifier 316 to the Line Scanner 310. The output signals from Scanner 310, such as that which appears on conductor 314, are positive pulses which are coincident in time with the above-noted "P" pulses.

Scanning at the central office serves to detect requests for terminating calls. That is, when there is a call placed to a subscriber served by the line concentrating system, the associated central office line circuit will energize the associated subscriber's line circuit in the central office unit of the concentrator. Such line circuitry is seized by placing a ground on the sleeve conductor 1301. Prior to the time the line circuit is seized, the central office line circuit is arranged to provide approximately —50 volts on the sleeve conductor 1301. In the absence of a terminating request, the above-noted negative potential applied through resistor 1337 is sufficient to back-bias diode 1341 and the positive pulse which is applied by the Line Scanner to common point 1324 is not permitted to pass through diode 1341. If a terminating request is present and the sleeve conductor 1301 is at ground potential, the positive pulse on conductor 314 will pass through diode 1341 to the horizontal common point 1345. Eight subscribers' lines are multiplied at common point 1345; however, only one of this group of eight lines is scanned at any one instant. The H2 conductor 1363 became energized when the third, fourth, and fifth stages of the Binary Counter 302 well all set to the "0" state. If the H2 conductor 1363 is energized at the time a pulse is permitted to pass through diode 1341 and capacitor 1351, the diode 1360 will be forward-biased and the positive pulse which originated in the Line Scanner 310 will be transmited to the S conductor 1367. A positive pulse on conductor 1367 indicates a request to terminate a call to one of the subscribers of the group served by the line concentrator system. The pulse on conductor 1367 sets the service action flip-flop 404 to its "1" state.

When a request for service is detected, steps are undertaken to prevent further scanning of subscribers' lines and transmission trunks until aftter the request has been served. The detailed steps required to effect the necessary connections through the central office and field unit line and trunk switches will be later described with respect to a call through the concentrator.

Supervisory Scan of Trunks

For release control the transmission trunks are divided into five groups of four trunks each. The trunk group is defined by the states of the 0, 3, and 4 stages of the Binary Counter 302 and the trunk within the group is defined by the states of stages 1 and 2 of the Binary Counter 302.

The Translator 307 is a 3 bit binary to 1-out-of-8 translator; however, in that only five groups of transmission trunks are employed, only five output conductors, namely, TG0 through TG4 are utilized.

The 2 bit binary to 1-out-of-4 Translator 308, in addition to other system functions, defines for purposes of scanning the particular trunk within a group of trunks. The five output conductors of the Translator 307 and the four output conductors of the Translator 308 provide input signals to the Trunk Scanner 311.

Each of the transmission trunks has associated therewith a diode such as 1328 and a resistor such as 1326 which are connected between the ring and sleeve conductors of the trunk at the central office unit trunk crossbar switch. The point 1369 at which the diode 1328 joins the resistor 1326 is a trunk scan point which is connected to the Trunk Scanner 311 over an associated conductor such as 1368.

A scanned trunk may be in one of four states; namely, (a) trunk idle and associated crosspoints are not operated; (b) trunk is connected through both the central office trunk and line switches to a subscriber's line equipment in the central office and the subscriber's line equipment is in the on-hook state; (c) trunk is connected through both the central office trunk and line switches to a subscriber's line equipment in the central office and the subscriber's line equipment is in the off-hook state; and (d) the station of a subscriber originating a call is connected through the line and trunk switches at both the remote concentrator and the central office unit to the subscriber's line equipment; however, the central office equipment has not returned dial tone to the calling subscriber.

In each of the above possible conditions, discrete potentials exist at the trunk scan point such as 1369.

In state (a) above, the trunk scan circuit comprising the diode 1328, scan point 1369, and resistor 1326 is not connected through the crosspoints such as 1317 and 1319 and the diode 1371 is back-biased by the negative potential of the voltage source 1332 which is negative with respect to the potential supplied by the TRK relay on the other side of the diode. In states (b) and (c) above, the scan point 1369 will be at a first high negative potential when the subscriber's line circuit in the central office is in the on-hook state and a low negative potential when the subscriber's line equipment is in the off-hook state. The Trunk Scanner 311 is arranged to provide an output signal on the RT conductor 313 whenever the scanned trunk is found to be in the above-noted condition (b). That is, if a trunk is connected through the line and trunk switches in the central office unit of the concentrator and the associated subscriber's line circuit in the central office is in the on-hook state, a request for the release of the trunk is indicated and the release trunk conductor 313 will be energized. The RT conductor 313 is connected to the set terminal of the release action flip-flop 405. The function of the RA flip-flop 405 and the attendant system actions will be described later.

It is possible that scanning of trunks to detect requests for release may begin before the central office equipment has returned dial tone to a subscriber whose request for service has just been processed by the concentrator. That is, there may be a lapse in time between the time that a subscriber station is connected through to the central office and the time the central office equipment responds to return dial tone to the originating subscriber. In this short period of time, scanning of lines and trunks may have been restored and steps must be taken to prevent a line in such condition to appear as a request for release. Until such time as the central office equipment has responded to provide dial tone, a negative 50 volt potential is returned over conductor 1301 and through the central office line and trunk switches 1304 and 1322 to the junction of capacitor 330 and resistor 1326. With the subscriber station in the off-hook condition, the potential returned from the central office equipment is shunted down through the diode 1328 and the subscriber's loop through contacts of the concentrator trunk and line switches 2203 and 2204. Accordingly, if a trunk is connected to a line awaiting dial tone, the voltage at scan point 1369 inhibits the generation of a request for disconnect signal.

In that the Line Scanner 310 and the Trunk Scanner 311 operate simultaneously and independently, the scanning of lines and trunks proceeds simultaneously in an ordered fashion.

*Supervisory Scan of Lines at the Field Unit*

System scanning at the field unit is also under the control of the Astable Circuit 301 and counterparts of several functional blocks of equipment in the central office unit are found in the field unit. For example, there is a 6 stage Counter 2501 which is the counterpart of the Counter 302; there is a Line Scanner 2502 which is the counterpart of the Line Scanner 310; and there are the Translators 2503 and 2504 which are the counterparts of the Translators 308 and 309.

Figure 23:
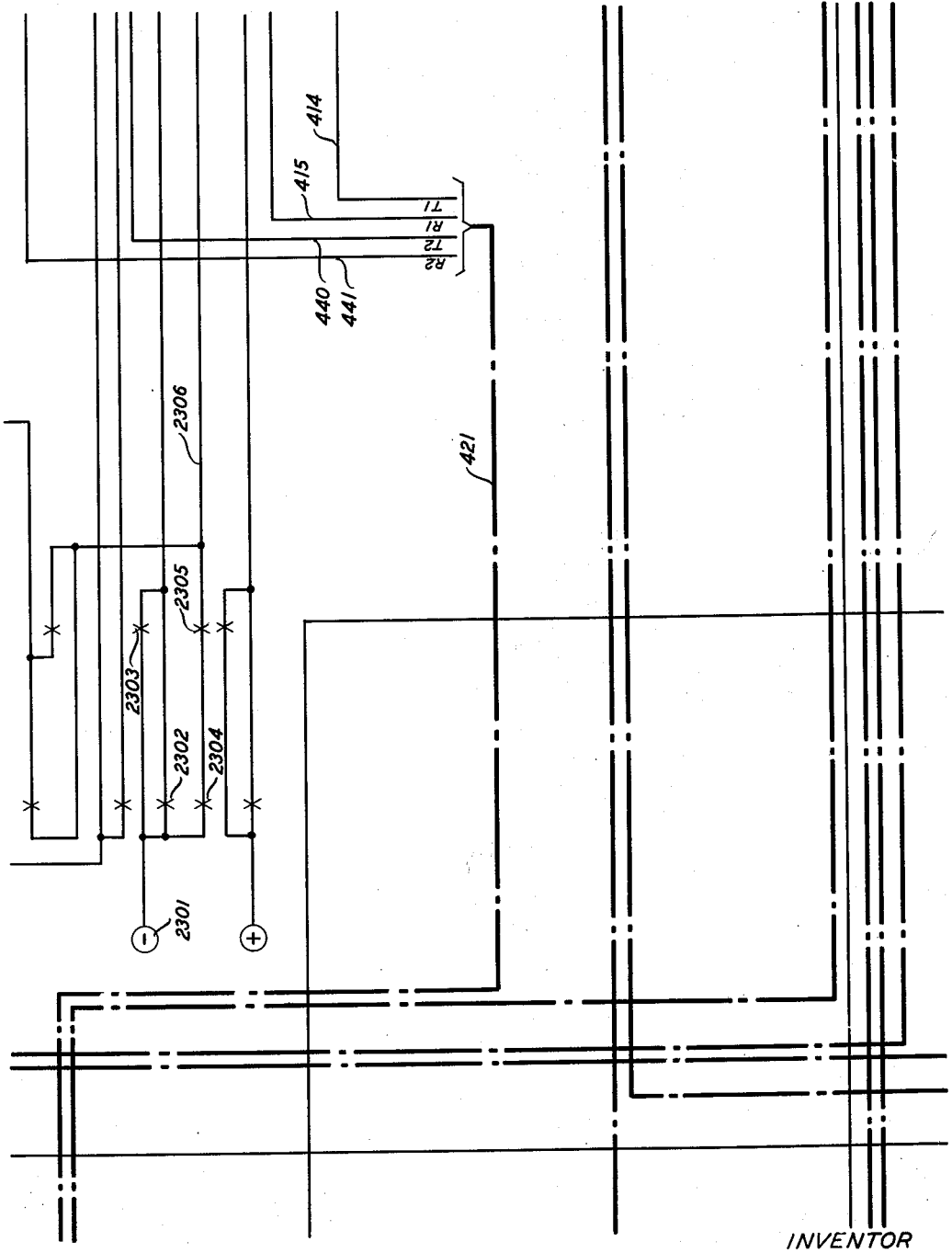
Figure 24:
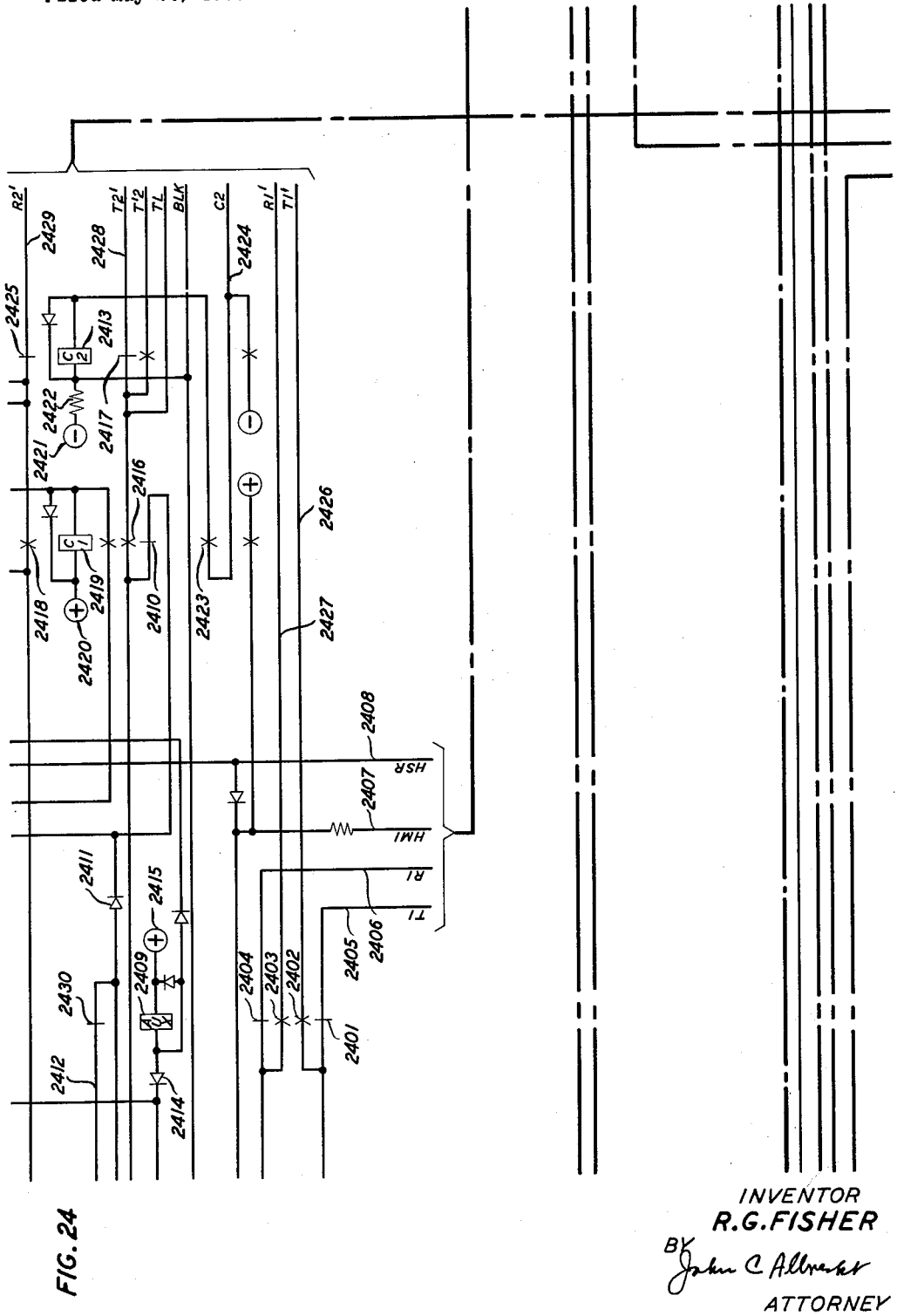
Figure 25:
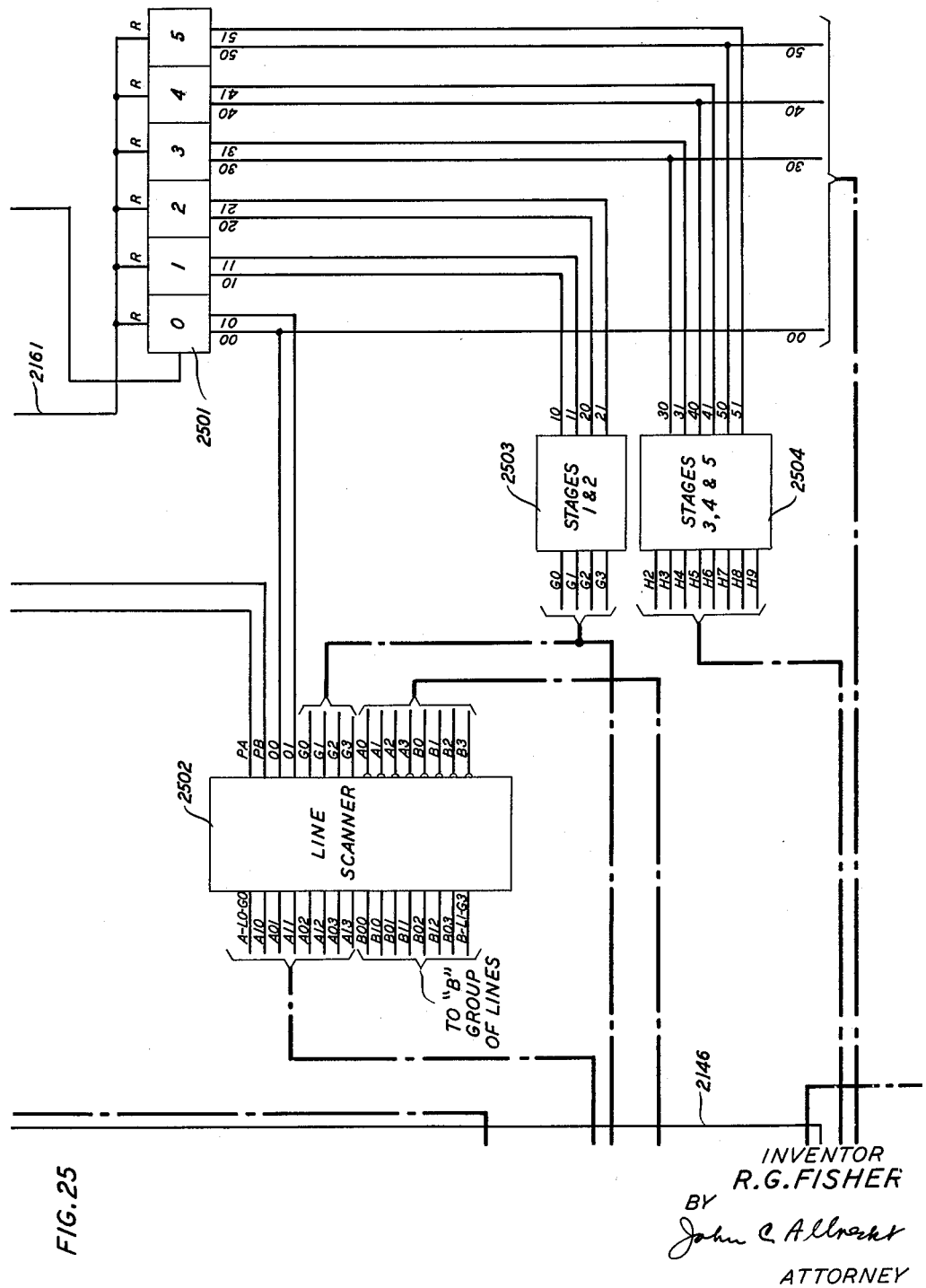

As previously stated, signals on the "0" output conductor of the Astable Circuit 301 are selectively transmitted through the A or B AND gates 419 and 420 depending upon the setting of the A—B flip-flop 601. Output signals from the AND gates 419 and 420 are transmitted to the primary winding of the Line Transformer 401 and thence to the first control pair comprising conductors 414 and 415 via conductors 407 and 408 and make contacts 410 and 411. The first and second control pairs are shown entering the central office to field unit cable 421 which terminates in FIG. 23 of the field unit.

Before proceeding to a detailed discussion of the scanning of lines at the field unit and the attendant actions following the detection of a request for service, it is essential that the functions of the control relays at both the central office unit and the field unit be thoroughly understood. The following statements are intended to set forth the functions of the various control relays and their states at various times in the course of system operation.

The TR relay 418 is operated during scanning and released during the time a service request is being served. The TR relay serves to transfer the first control pair comprising conductors 414 and 415 from the winding of the coil 401 to other locations within the central office unit. That is, during scanning, the conductors 414 and 415 of the first control pair are connected to terminals 416 and 417 of the coil 401 and during other times conductors 414 and 415 are connected to contact chains of the ID1 through ID8 identification relays 1401 through 1408.

The TR1 relay 437 is unoperated during scanning. It is responsive to the release of the TR relay 418 and is operated during both the establishment and disestablishment of connections through the concentrator system. The TR1 relay primarily serves to transfer the conductors 440 and 441 of the second control pair from a scanning function to either a release or establishment of connection function.

The A relay 502 is released during scanning and operates whenever a request for service to or from a line in the A group is detected.

The B relay 503 is similar to the A relay 502 and operates whenever a request to or from a line in the B group is detected.

The RL relay 804 is released during scanning and operates whenever a request for release of a connection is detected.

The RL1 relay 501 is auxiliary to the RL relay 804 and provides additional contacts during the release function.

The ID1 through ID8 relays 1401 through 1408 are released during scanning and are selectively operated during both the establishment and disestablishment of a connection through the concentrator system. The ID1 through ID8 relays are identification relays which are selectively operated to define the trunk between the central office unit and the field unit which is to be connected or disconnected.

The C relay 432 is operated when a plausible number of identification relays ID1 through ID8 are operated.

The LSA through LSD relays 1605 through 1608 operate during the establishment and disestablishment of a connection through the central office unit in accordance with the setting of the Counter 302. In that the setting of the Counter 302 defines the line which is to be connected, the LSA through LSD relays have contacts which serve to selectively operate the appropriate steering level select magnet and horizontal select magnet for the line to be connected.

The G0 through G3 relays 1205 through 1208 are energized in accordance with the signals from the Translator 308 and therefore operate in accordance with the setting of the second and third stages of the Counter 302. The second and third stages of the counter define the group in which the line being served resides.

Contacts of the LSA through LSD relays 1605 through 1608 and of the G0 through G3 relays 1205 through 1208 effect operation of the required ones of the ID1 through ID8 relays 1401 through 1408.

The LK0 through LK4 relays 1101 through 1105 are operated during the establishment of a connection through the concentrator and serve to define the first available link within a subgroup. The contacts of the LK0 through LK4 relays 1101 through 1105, in combination with the contacts of the operated one of the G0 through G3 relays 1205 through 1208, serve to define the hold magnet which is to be operated during the establishment of a connection.

The CK relay 706 is employed during both the establishment and disestablishment of a connection through the concentrator and when operated indicates that the appropriate connections at the central office unit have either been established or broken as the case may be. The CK1 relay 702 operates directly in response to the CK relay 706. The CK1 relay provides a path by which the operation complete signal from the remote concentrator is returned to the central office.

The trunk relays 901 through 910 are individually assigned to the transmission trunks from the central office unit to the field unit and these are selectively and individually operated during the time a trunk is connected through the concentrator units. Contact chains of the trunk relays 901 through 910 serve to identify the first available trunk.

The control relays at the field unit have functions as follows which are similar to the functions of the control relays at the central office unit.

The A and B relays 1901 and 1902 are similar to the A and B relays 502 and 503 and are operated when a request for service to a line in the A or B group, respectively, is indicated.

The RL relay 1903 is similar to the RL relay 804 and is employed at the field unit during the release of a connection therethrough.

The auxiliary relay 2409 is auxiliary to the A, B, and RL relays 1901, 1902, and 1903 and serves to provide additional contacts therefor during the establishment and disestablishment of a connection through the field unit.

The G0 through G3 relays 2706 through 2709 are counterparts of the G0 through G3 relays 1205 through 1208 and serve to define the subgroup in which the line to be connected resides during the establishment of a connection.

LK0 through LK4 relays 2801 through 2805 are counterparts of the LK0 through LK4 relays 1101 through 1105 and are operated during the establishment of a connection in accordance with the first available link. The contacts of the LK0 through LK4 relays 2801 through 2805 in combination with the contacts of the G0 through G3 relays 2706 through 2709 serve to operate the desired hold magnet in the establishment of a connection through the concentrator.

The LSA through LSD relays 3005 through 3008 are similar to the LSA through LSD relays 1605 through 1608 and when operated in accordance with the setting of the Counter 2501 serve to operate the desired steering select magnet and horizontal select magnet at the field unit.

The ID1 through ID8 identification relays 3101 through 3108 are counterparts of the ID1 through ID8 identification relays 1401 through 1408 and operate during both the establishment and disestablishment of a call. Similarly numbered relays in both the central office unit and field unit operate to define the trunk to be connected or disconnected.

The C1 and C2 relays 2419 and 2413 are released during scanning and operate during both the establishment and disestablishment of a connection through the field unit upon the operation of a plausible number of the ID1 through ID8 identification relays 3101 through 3108.

The CK relay 2005 is employed to check that the appropriate trunk has been connected or disconnected at the field unit and serves to generate an operation complete signal which is transmitted to the central office unit.

While lines are being scanned, the auxiliary relay 2409 is de-energized and the first control pair comprising conductors 414 and 415 is connected through break contacts 2401 and 2404 to conductors 2405 and 2406 which terminate on the coil 2100.

Figure 21:
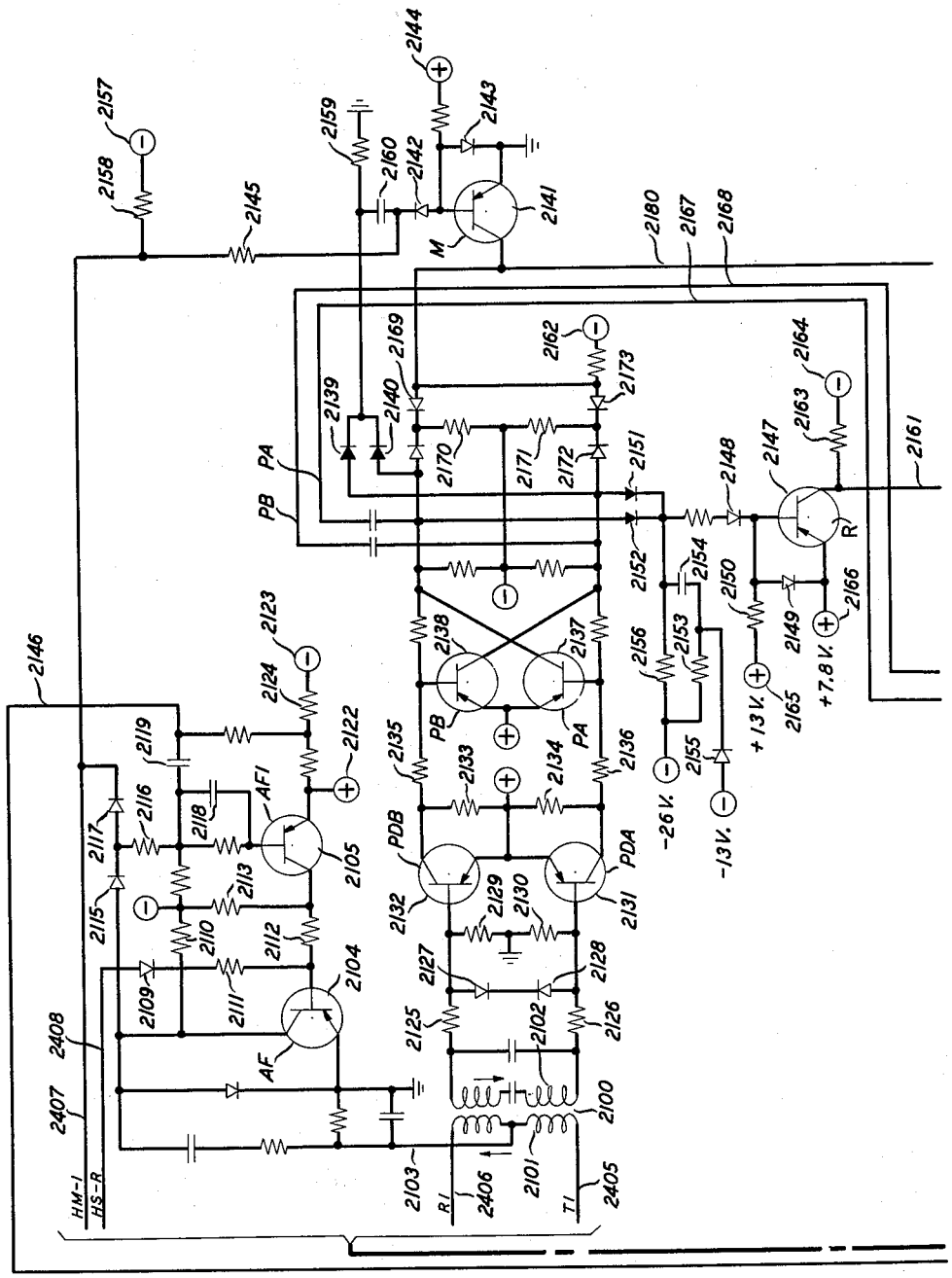

The circuitry in FIG. 21 is: (1) selectively responsive to the two polarities of pulses transmitted over the first control cable pair comprising conductors 2405 and 2406; (2) responsive to signals transmitted over the simplex of the first control pair; and (3) provides means for transmitting a service request from the field unit to the central office unit via the simplex circuit of the first control pair.

In FIG. 21, the PDA and PDB transistors 2131 and 2132 are employed to detect the two polarities of scanning pulses which are transmitted from the central office to the field unit. In the absence of pulses from the central office unit, the two transistors 2131 and 2132 are both in the On state. Transistor 2131 is held in its On state by forward-biasing the emitter-to-base junction over a path that includes positive battery, the emitter-to-base junction of transistor 2131, and resistor 2130 returned to ground. Similarly, transistor 2132 is held in its On state by a signal path which includes positive battery, the emitter-to-base junction of transistor 2132, and resistor 2129 returned to ground. When the A pulse detection transistor 2131 is in its On state, the PA transistor 2137 is held in its Off state. Similarly, when the B pulse detection transistor 2132 is in its On state, the PB transistor 2138 is held in its Off state.

The PA and PB transistors 2137 and 2138, in combination with the M transistor 2141, form mutually exclusive monostable circuits. That is, at certain times in the cycle of system operation, the PA transistor 2137 and the M transistor 2141, in combination, comprise a monostable circuit while at other times in the operating cycle the PB transistor 2138, in combination with the M transistor 2141, similarly form a monostable circuit. As long as the PA and PB transistors 2137 and 2138 are in the Off state, the M transistor 2141 will be fully conducting. The M transistor is held in the On state by forward-biasing the base-to-emitter junction of the transistor 2141 over a path which includes the negative source of potential 2157, resistors 2158, and 2145, diode 2142, and the base-to-emitter junction of transistor 2141 returned to ground. When the PA transistor is turned on, a positive pulse is transmitted through the diode 2140 and capacitor 2160 to back-bias the diode 2142. When the diode 2142 is back-biased, the M transistor 2141 is turned off and the voltage at the collector thereof becomes more negative and approaches the value of the potential source 2162. In that pulses transmitted from the central office to the remote unit may be mutilated in transmission and therefore may be of irregular shape and duration when they arrive at the field unit, the timing of the monostable circuit which comprises the PA transistor 2137 and the M transistor 2141 during the scanning of lines in the A group or the M transistor 2141 and the PB transistor 2138 during the scanning of lines in the B group must be independent of the wave shape of the incoming pulses from the central office and therefore independent of the operation of the PDA and PDB transistors 2131 and 2132. Isolation of the above-mentioned mutually exclusive monostable circuits from the operation of the pulse detection amplifiers 2131 and 2132 is accomplished by making the timing of these circuits dependent upon the time required for recovery of the capacitor 2160. When the M transistor 2141 is turned off, the collector thereof no longer draws current through the diodes 2169 and 2173 and resistors 2170 and 2171. Under this condition, the current will flow through resistor 2171 and diode 2172 to hold the PA transistor 2137 in its On state. When the pulse through the diode 2139 or diode 2140, which occurred when the PA or PB transistor was turned on, has terminated, the capacitor 2160 will tend to charge to the potential level of the source 2157. The capacitor 2160 will charge over a path which includes resistor 2158, resistor 2145, and resistor 2159 to ground potential. When the capacitor 2160 has again reached its negative charge, the M transistor 2141 will be turned on due to the forward biasing of the base-to-emitter junction thereof through diode 2142. The capacitor 2160 requires approximately 1,000 microseconds to charge through the above enumerated path and thereby approximately 1,000 microseconds pass before the M transistor is again turned on. The M transistor will again draw current through diodes 2169 and 2173 and resistors 2170 and 2171 and the voltage at the collector thereof will become less negative. This generates a positive pulse on the conductor 2180 which advances the Counter 2501 by one count. When the M transistor 2141 turns on and current to the collector thereof is drawn through the above-enumerated path, current will no longer flow through the diode 2172 to sustain the PA transistor 2137 in its On state; therefore, it restores to its Off state.

The R transistor 2147 and the attendant circuitry provides a means for detecting the absence of scanning pulses from the central office. As previously noted, the two ends of the line concentrator system are synchronized after each complete group of lines has been scanned and after each service request is served. Synchronization occurs when the central office halts the transmission of scanning pulses to the field unit for a period of five milliseconds. Whenever the PA or PB transistor is turned on, a pulse is transmitted through the A diode 2151 or the B diode 2152 to discharge the capacitor 2154. The R transistor 2147 is held in its Off state by back-biasing the base-to-emitter junction thereof over a path which includes the positive voltage source 2165, resistor 2150, the base-to-emitter junction of transistor 2147, and positive potential source 2166. In the absence of pulses through diodes 2151 and 2152, the capacitor 2154 will charge and the point at which diodes 2151 and 2152 and capacitor 2154 join will become substantially more negative than the base of transistor 2147. The diode 2148 is a reverse threshold diode which conducts when the reverse voltage thereacross exceeds approximately 6 volts. When diode 2148 is conducting, the base-to-emitter junction of transistor 2147 will become forward-biased and the R transistor will become fully conducting. Under these conditions, a positive pulse will be applied to conductor 2161 and thereby to the reset terminals of all stages of the Binary Counter 2501.

In summary, the PDA and PDB transistors 2131 and 2132 respond to pulses of opposite polarity which are transmitted from the central office unit to the field unit over the first control pair, conductors 2405 and 2406, and in response thereto, trigger the monostable circuit comprising the PA transistor 2137 and the M transistor 2141 or the monostable circuit comprising the PB transistor 2138 and the M transistor 2141. The M transistor is normally in its On state and a negative pulse appears at the collector thereof whenever the PA or PB transistor is turned on.

The negative potential at the collector of the M transistor indirectly permits the PA or PB transistors 2137 or 2138 to stay on independent of the state of the PDA or PDB transistors, respectively. When the M transistor again turns on, a positive pulse is developed on conductor 2180 and this pulse is employed to advance the count of the Binary Counter 2501.

The R Transistor 2147 is normally in its Off state as long as either the PA or PB transistor becomes active within prescribed limits of time, approximately once every two milliseconds. If the time between pulses exceeds this period, the R transistor 2147 will be turned on and a reset pulse transmitted to all stages of the Binary Counter 2501.

The Binary Counter 2501 is advanced in synchronism with the Binary Counter 302. Trunks are scanned for release only at the central office unit; therefore, a line scanner only is provided in the field unit. The Translator 2503 is a 2 bit binary to 1-out-of-4 translator which, in accordance with the states of the second and third stages of the Binary Counter 2501, determines the subgroup of lines being scanned and the Translator 2504 is a 3 bit binary to 1-out-of-8 translator, which, in accordance with the states of stages 3 through 5 of the Binary Counter 2501 determines the line switch horizontal in which the scanned line appears.

Figure 28:
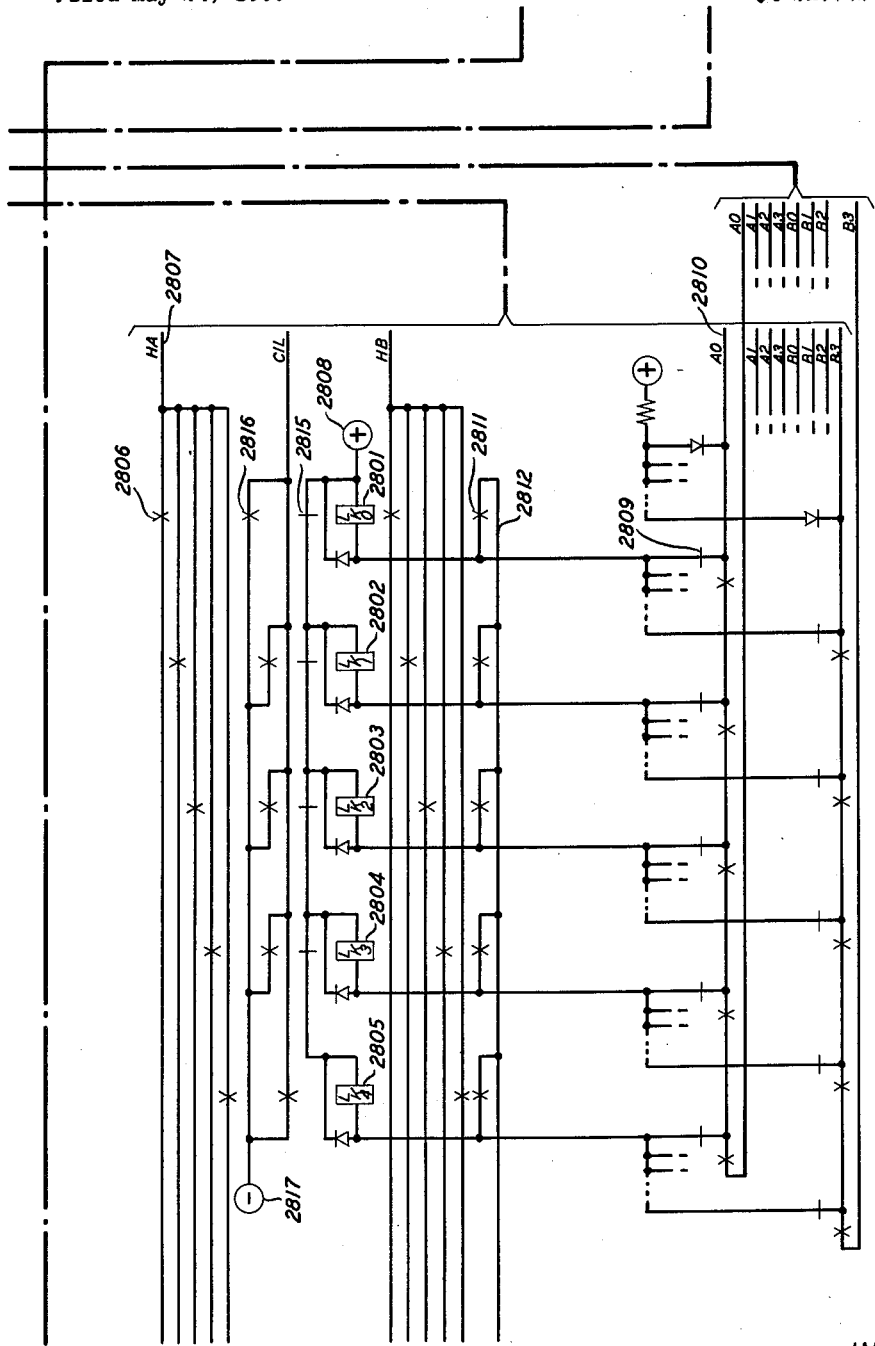
Figure 29:
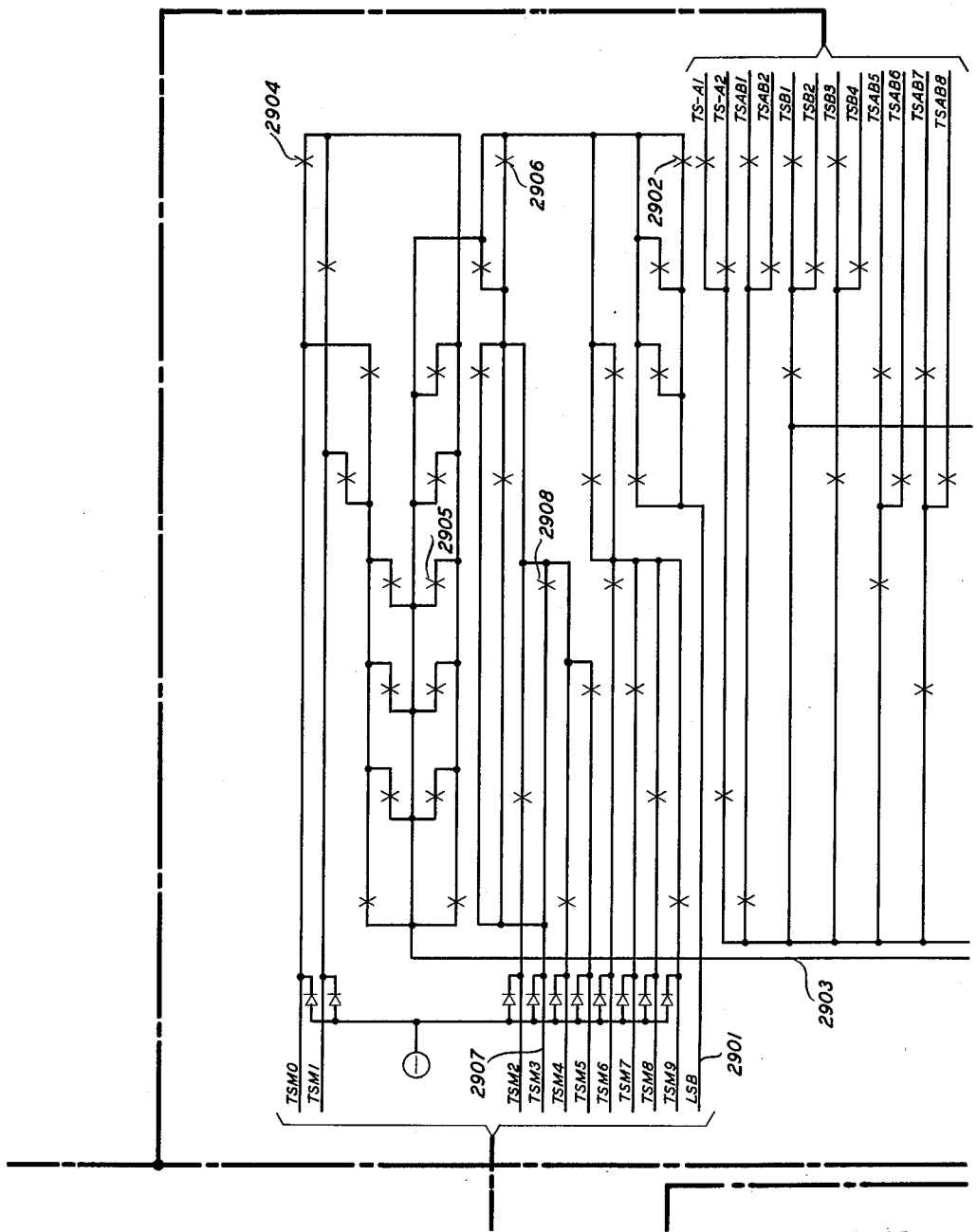
Figure 30:
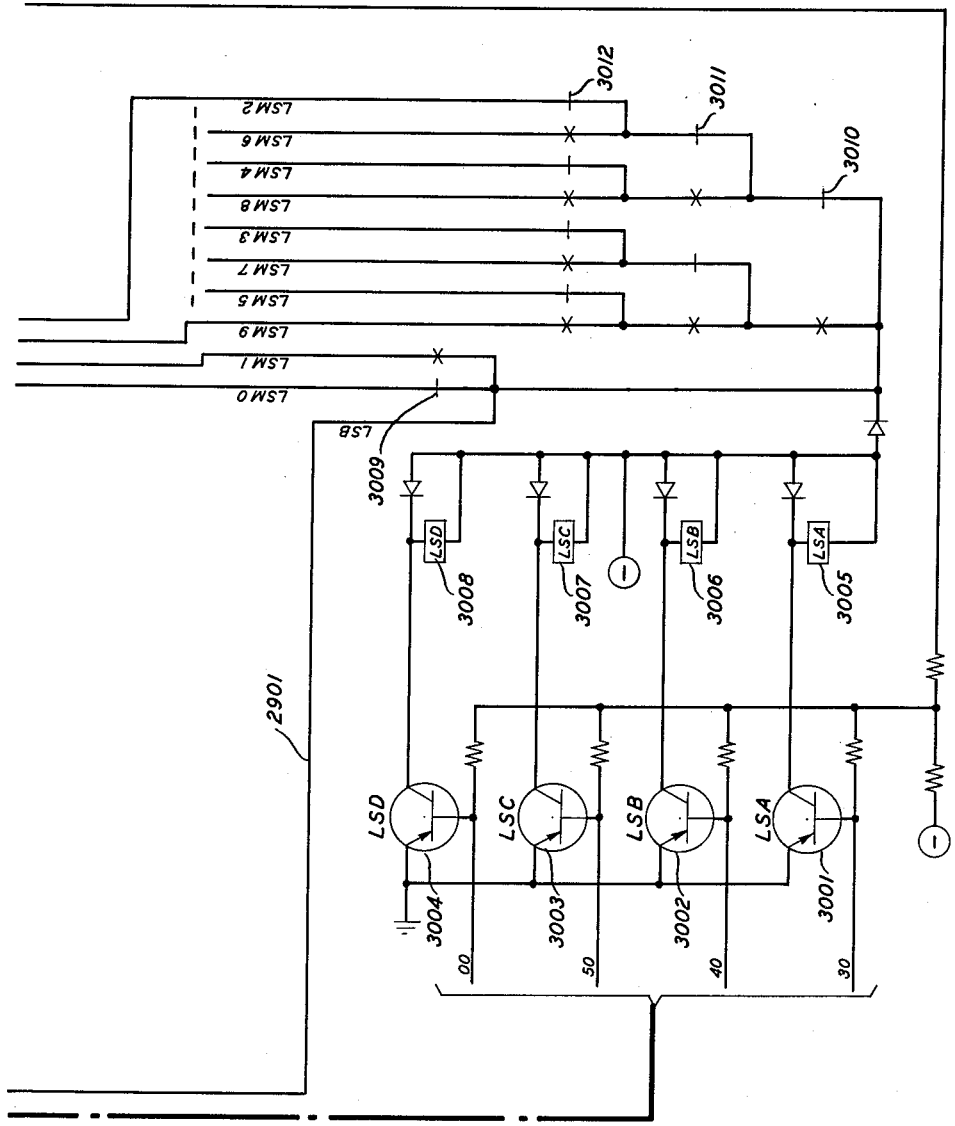

The Line Scanner 2502 is similar to the Line Scanner 310. The A0 through A3 and B0 through B3 conductors from the all-links-busy chain of FIG. 28 are inhibiting leads which inhibit scanning whenever a link is not available to serve the scanned line. The output conductors of Scanner 2502 define the group and subgroup and steering level in which the scanned line appears and the output conductors of Translator 2504 determine the horizontal level associated with the scanned line. The output conductors of the Scanner 2502 and of the Translator 2504 are applied to the field unit line scanning circuits of FIG. 22 to define the line being scanned.

Figure 22:
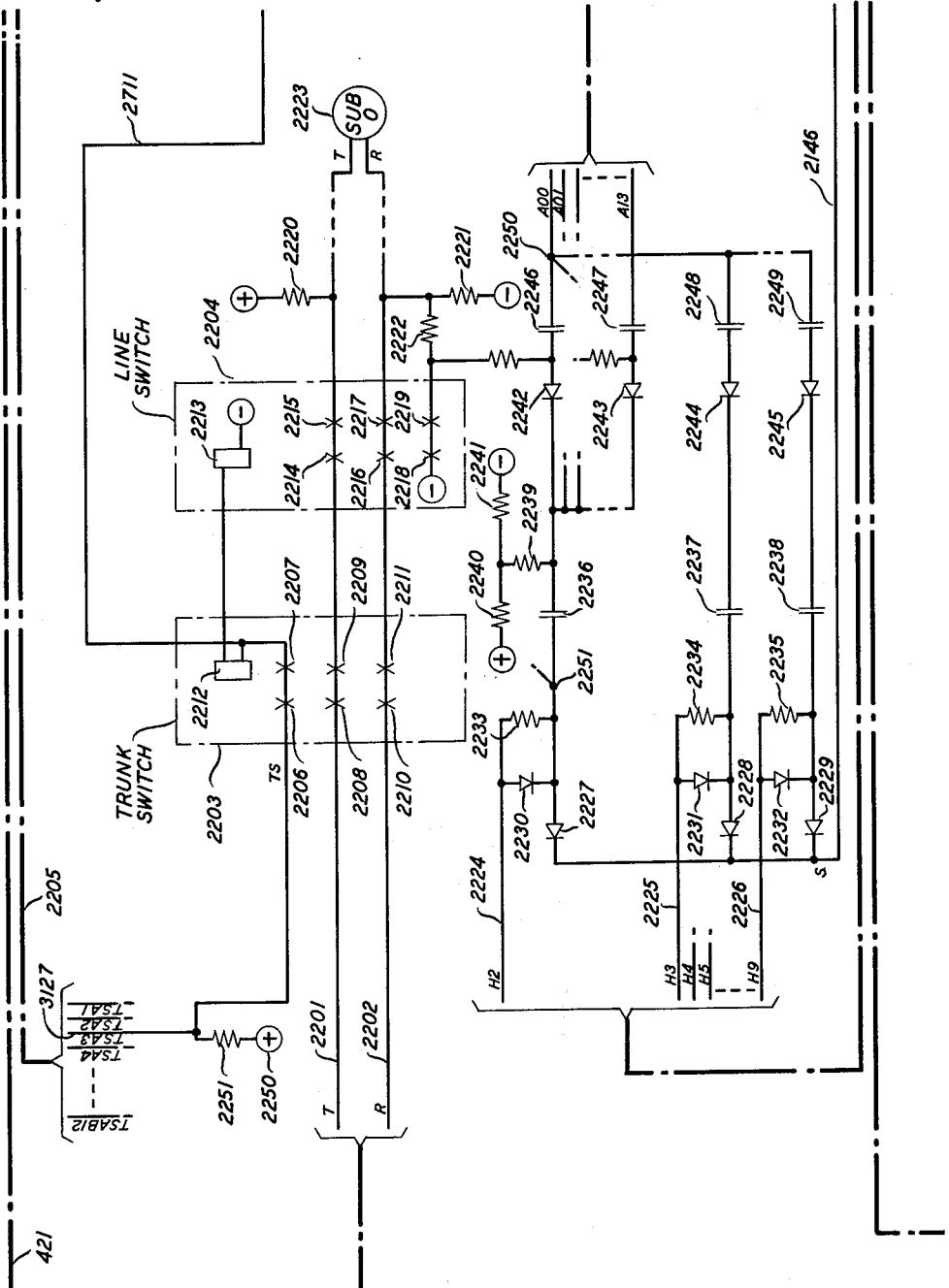

The line scanning circuits of FIG. 22 resemble the central office unit line scanning circuits of FIG. 13; however, in that trunks are not scanned at the field unit, certain simplifications are effected. In FIG. 22, the line scanning circuit for the S0 subscriber 2123 is shown in detail. There is also shown a portion of the line switch 2204 and a portion of the Trunk Switch 2203. Specifically, there is shown that portion of the line switch 2204 which relates to the S0 subscriber's line 2223 and a link connecting the line switch 2204 to the trunk switch 2203.

The scanning circuit for the S0 subscriber's line 2223 comprises the common point 2250, capacitor 2246, diode 2242, the voltage divider comprising resistors 2239 through 2141 and the connected voltage sources, capacitor 2236, and the diode 2227. Common point 2251 at the junction of diode 2227 and capacitor 2236 comprises a common point at which all lines appearing in the third horizontal of the field unit line switch are multiplied for purposes of scanning.

The signals on the A00 through A13 conductors from the Line Scanner 2502 are either halted or passed through the diodes such as 2242 in accordance with the supervisory state of the scanned line. If the subscriber's station is in the off-hook state and the line is not connected through the line switch and the trunk switch to the central office, the pulse will be passed through the diode such as 2242; however, if the subscriber station is in the on-hook state, whether or not it is connected through the line switch 2204 and the trunk switch 2203, the pulse on the A00 conductor will be inhibited from passing through the diode such as 2242. If the H2 conductor is energized when a pulse passes through capacitor 2236 to the common point 2251, the diode such as 2227 will be forward-biased and a positive pulse will be passed to the scanner output conductor 2146.

While scanning is in progress, the AF1 transistor 2105 is in its On state and the AF transistor 2104 is in its Off state. A positive scan pulse on conductor 2146 is effective to turn off the AF1 transistor 2105 and thereby turn on the AF transistor 2104. When the AF transistor is turned on, the voltage at the collector thereof becomes more positive and a positive pulse is transmitted to the simplex of the first control pair via conductor 2103. A positive pulse transmitted via the simplex from the field unit to the central office unit indicates a request for service from the field unit.

Earlier in this discussion it was noted that a positive freeze pulse is transmitted to the field unit whenever a request to terminate a call to one of the subscribers served by the line concentrating system occurs. In the field unit, the positive freeze pulse from the central office unit is treated in the same manner that a field unit service request is treated. The freeze signal from the central office unit is received over the simplex circuit of the first control pair and appears as a positive signal on conductor 2103. This signal is coupled to the base of the AF1 transistor 2105 and is effective to turn off the AF1 transistor and thereby turn on the AF1 transistor 2104. Energization of the AF transistor 2104 serves to hold the M transistor 2141 in its Off state, to hold the appropriate PA or PB transistor 2138 or 2137, respectively, in the On state and thereby hold the R transistor 2147 in the Off state.

The field unit operates under the philosophy that all actions within the field unit should be primarily under the command of the central office unit. For example, upon the occurrence of a request for service by one of the subscribers served by the concentrating system, the field unit will take steps to temporarily halt the scanning of lines therein; however, the field unit, in the absence of additional orders from the central office unit, will withdraw control and will again become subservient to further orders from the central office. Under this philosophy, it is impossible for the field unit to disable itself for prolonged periods of time. In keeping with this philosophy, the circuitry comprising the AF1 transistor 2105 and the AF transistor 2104 is arranged to restore within a period of 150 to 175 milliseconds. Once the AF1 transistor has returned to the On state and the AF transistor is returned to its Off state, the field unit is again prepared to accept scanning pulses or other orders from the central office. In the normal course of events, once a service request has been transmitted from a field unit to the central office unit, the central office unit will transmit additional control signals to freeze the operation at the field unit until the required action has been completed.

Figure 32:
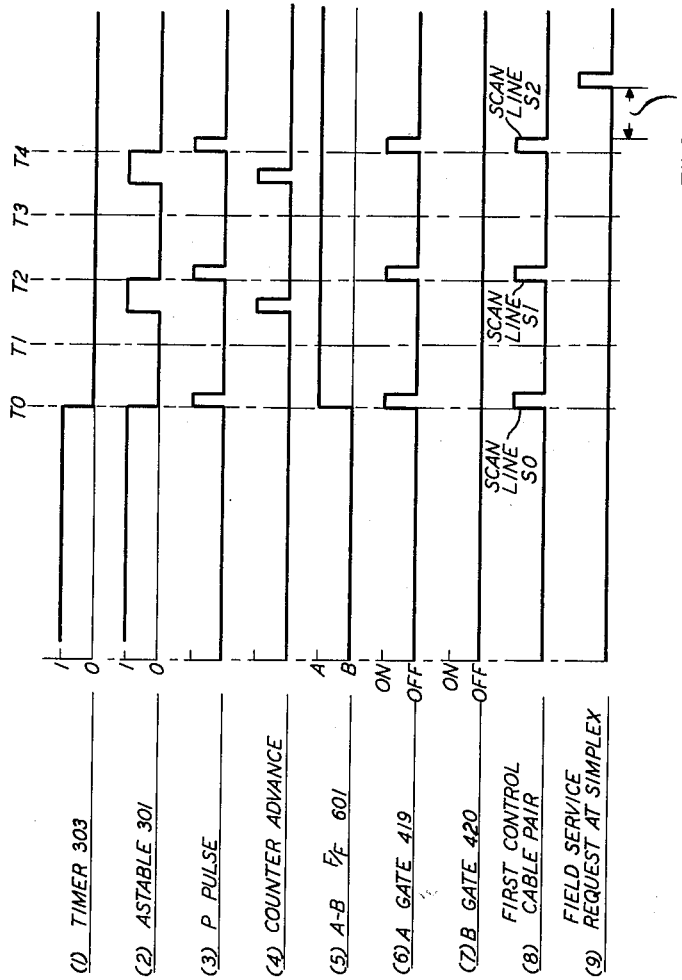
FIGS. 32 and 33 are time diagrams of events which occur within the units of this invention.
Figure 33:
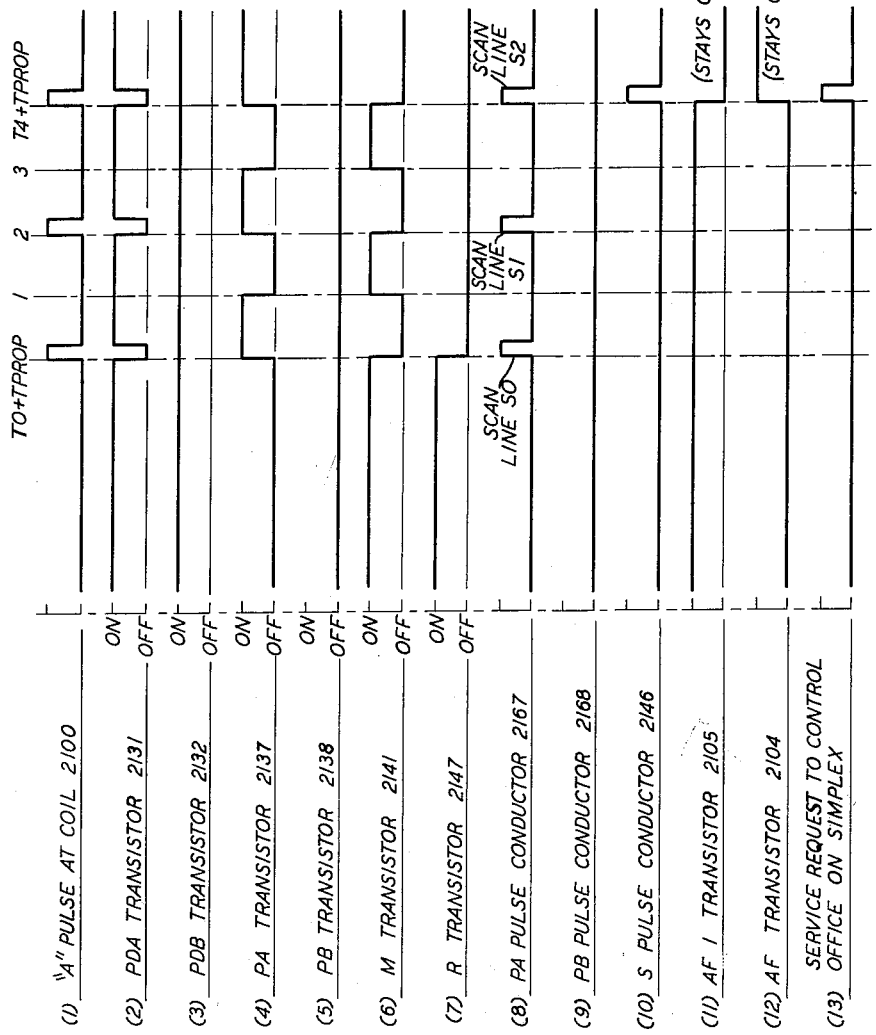

FIGS. 32 and 33 are time diagrams of events which occur at the central office unit and at the field unit in the event of an originating request for service from one of the subscribers served by the concentrator system. In FIG. 32, at time $T_0$, the Interval Timer 303 reaches the end of its timing cycle and the Astable Circuit 301 changes from the "1" to the "0" state. A "P" pulse appears at the "0" output terminal of the Astable Circuit 301 each time the Astable Circuit changes from a "1" to a "0" state. As seen in line 4 of FIG. 32, a counter advance pulse is generated when the Astable Circuit 301 changes from its "0" to its "1" state. There is therefore a 1500 microsecond period between the initiation of the "P" pulse and the initiation of the counter advance pulse. A request for service, either at the central office unit or at the field unit, must be detected within this 1500 microsecond period of time. In the 1500 microsecond period of time, the "P" pulse must be propagated from the central office unit to the field unit; the field unit must respond thereto and effect scanning of the appropriate line; and a service request signal originating in the field unit must be returned to the central office unit. It should be noted at this time that requests for service originating in the field unit are transmitted to the central office unit via the simplex circuit of the first control cable pair comprising conductors 414 and 415. The velocity of propagation of a pulse along a simplex path is greater than the velocity of propagation along a full metallic path. Use of the simplex in returning the requests for service, therefore, advantageously permits either greater distance between the central office unit and the field unit, or, alternatively, a higher rate of scanning of subscribers' lines and trunks.

In the example of FIG. 32, the A group of lines is being scanned and the AND gate 419 is periodically enabled under the influence of "P" pulses. In FIG. 32 at line 8 there are shown the pulses which appear on the first control cable pair. Further, in FIG. 32 at line 9 there is shown a service request pulse as it arrives at the central office unit from the field unit.

In FIG. 33, there are shown a series of A pulses as they occur at the coil 2100. In line 2 of FIG. 33, the response of the A pulse detection transistor 2131 is noted. Here it is seen that the PDA transistor 2131 turns from the On state to the Off state in response to each A pulse. In line 3 of FIG. 33 it is seen that the B pulse detection transistor 2132 stays in its On state during the receipt of the A pulses. At times when B pulses are being received, the PDA transistor 2131 will stay in its On state and the PDB transistor 2132 will follow the incoming B pulses. Each time the PDA transistor 2131 transfers from its On to its Off state, the first monostable circuit comprising the PA transistor 2137 and the M transistor 2141 will be keyed. That is, under the influence of output pulses which occur at the collector of the PDA transistor 2131, the PA transistor 2137 will be turned on and the M transistor 2141 will be turned off. The monostable circuit comprising the PA transistor 2137 and the M transistor 2141 has a basic period of 1000 microseconds. That is, the PA transistor 2137 stays on for 1000 microseconds and then remains off until the next incoming pulse is applied thereto. The PB transistor 2138 stays in its Off state during the receipt of A pulses. In line 7 of FIG. 33, it is seen that the R transistor 2147 was in its On state prior to receipt of the first A pulse and immediately after the PA transistor 2137 turns to the On state, the R transistor is de-energized.

The PA conductor 2167 is connected to the collector of the PA transistor 2137 and positive pulses appear thereon each time the PA transistor goes from its Off state to its On state. In FIGS. 32 and 33, the three P and PA pulses shown are associated with the scanning of lines S0, S1 and S2. This sequence of scanning can be understood by reference to FIG. 17. Those lines appearing on the third horizontal of the line switch are scanned in order; therefore, the lines are scanned as follows: lines S0 through S7 and then the lines in the following horizontals are scanned.

By way of example in FIG. 32, it is assumed that line S2 is found in the off-hook state and is not connected through the field unit line and trunk switches to the central office. Shortly after the PA pulse is generated, an S pulse will occur at the field unit on conductor 2146 indicating a request for originating service. The AF1 transistor 2105, in response thereto, is turned off and the AF transistor 2104 is turned on. As previously noted, the AF1 transistor, because of the circuit constants and potentials associated therewith, is turned off for a period of 150 to 175 milliseconds to give the central office unit sufficient time to assume control of the field unit. Further, the energization of the AF transistor generates a service request signal to the central office as shown in line 13 of FIG. 33.

In FIG. 32, all actions are shown with respect to time $T_0$, and in FIG. 33, all actions are shown with respect to time $T_0$ plus the time of propagation from the central office unit to the field unit. That is, due to the delays incurred in transmitting a signal from the central office unit to the field unit, all actions within the field unit follow the actions in the central office unit by a fixed period of time. A service request from the field unit in traveling from the field unit to the central office unit experiences a similar delay; however, in that the service request is transmitted via the simplex circuit rather than the metallic pair the return delay is shorter than the delay from the central office unit to the field unit.

The relationship of the scanning pulse for line S2 and the service request pulse in response to that scanning pulse is shown in lines 8 and 9 of FIG. 32. The service request must be received in the central office unit prior to the time the counter is incremented. As seen by examination of lines 4 and 8 of FIG. 32, the counter is incremented 1500 microseconds after the scanning pulse is transmitted to the field unit. Accordingly, the service request must be returned within this 1500 microsecond period. That is, the total of the time of propagation from the central office to the field unit over the metallic pair, the time of response of the various elements in the field and the time of propagation on the simplex circuit from the field unit to the central office unit must not exceed 1500 microseconds.

*Terminating Service Request*

Figure 4:
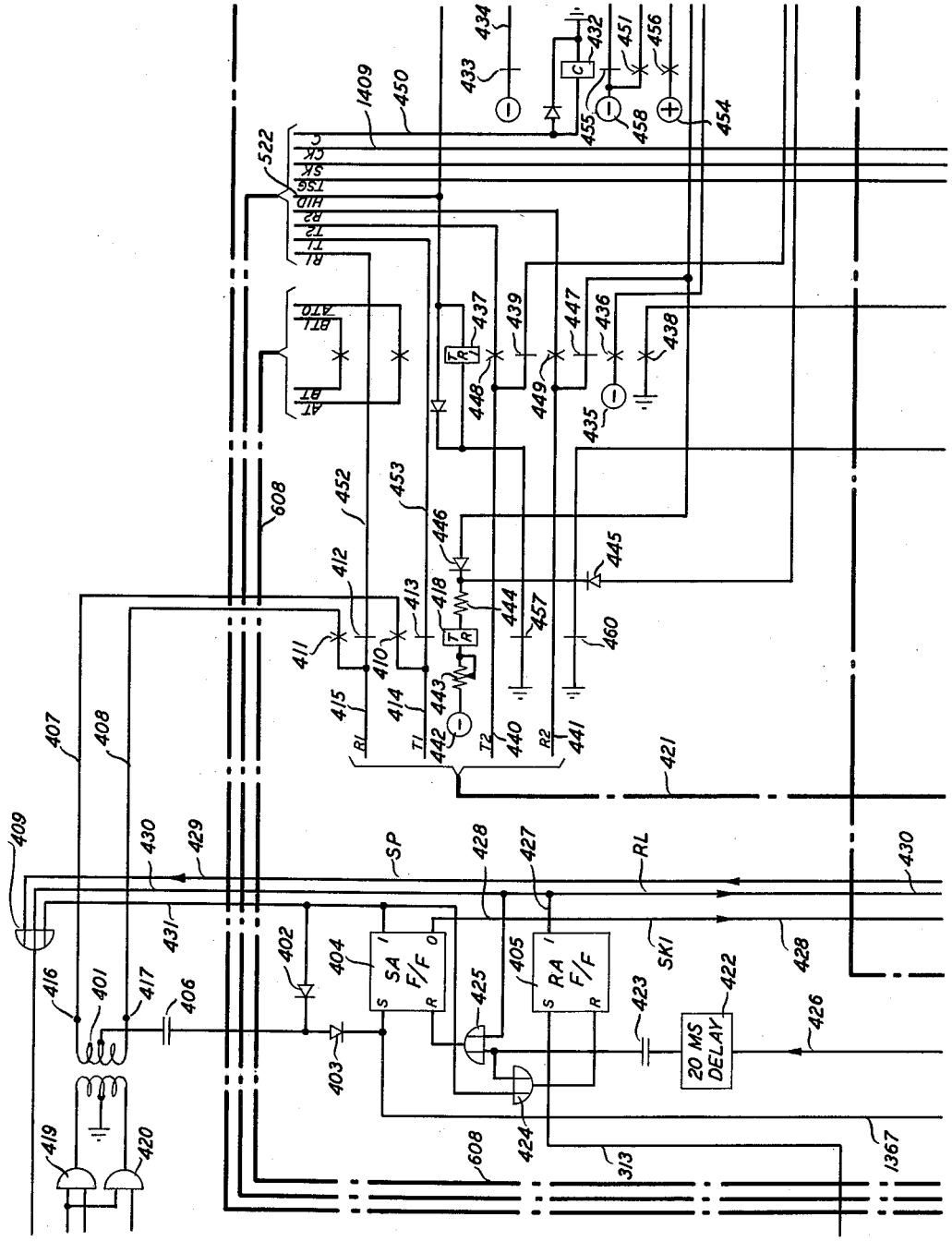
Figure 5:
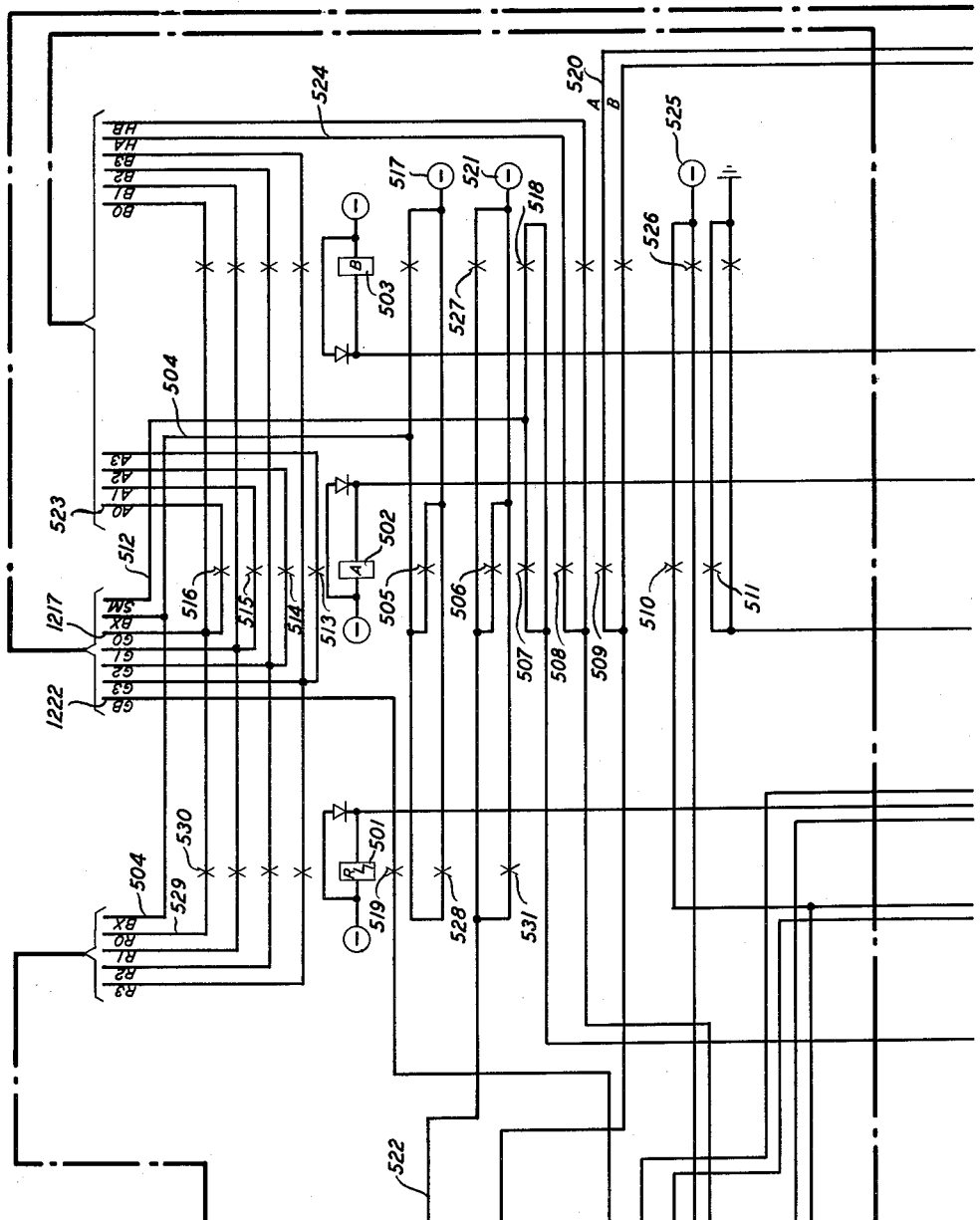
Figure 6:
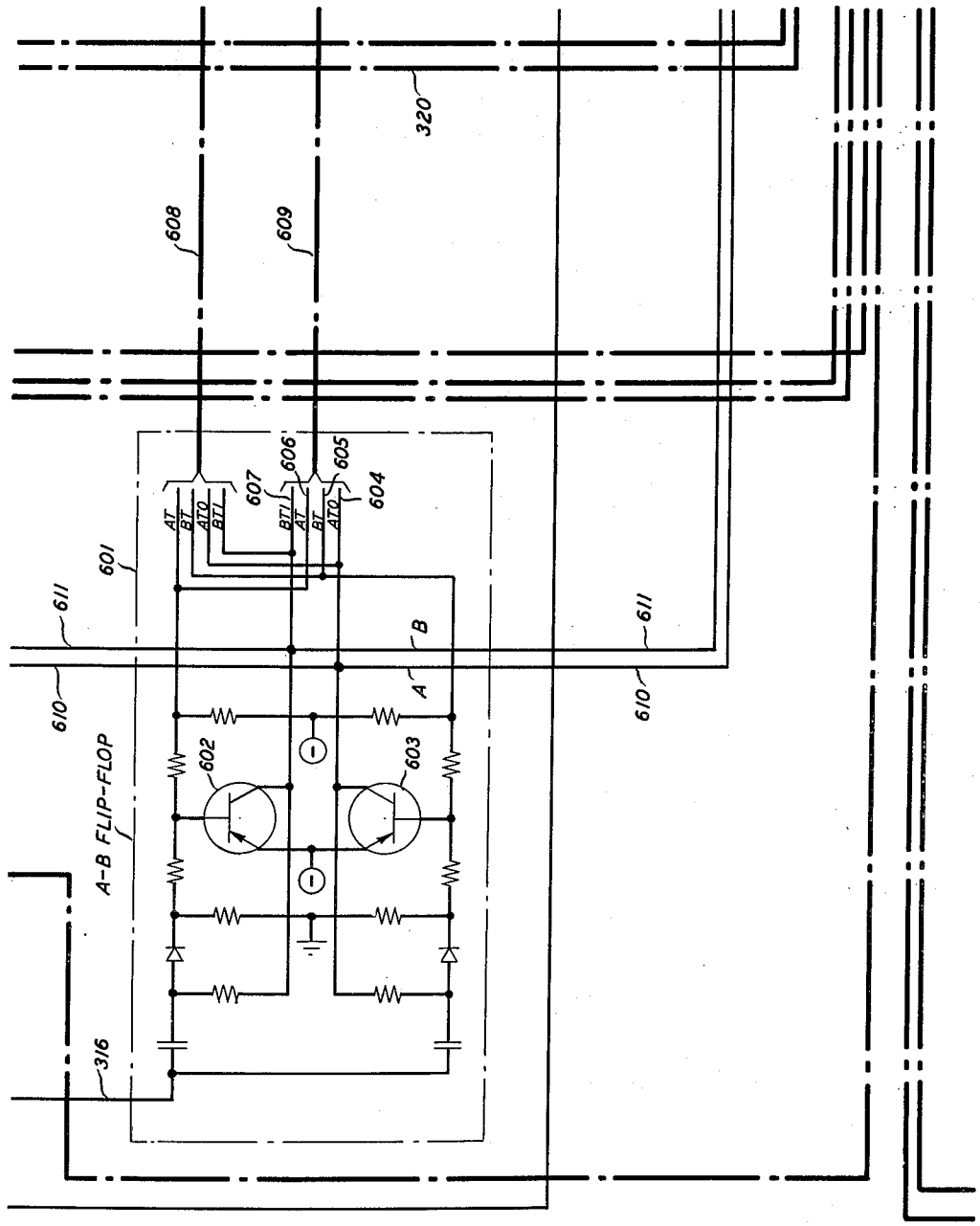
Figure 7:
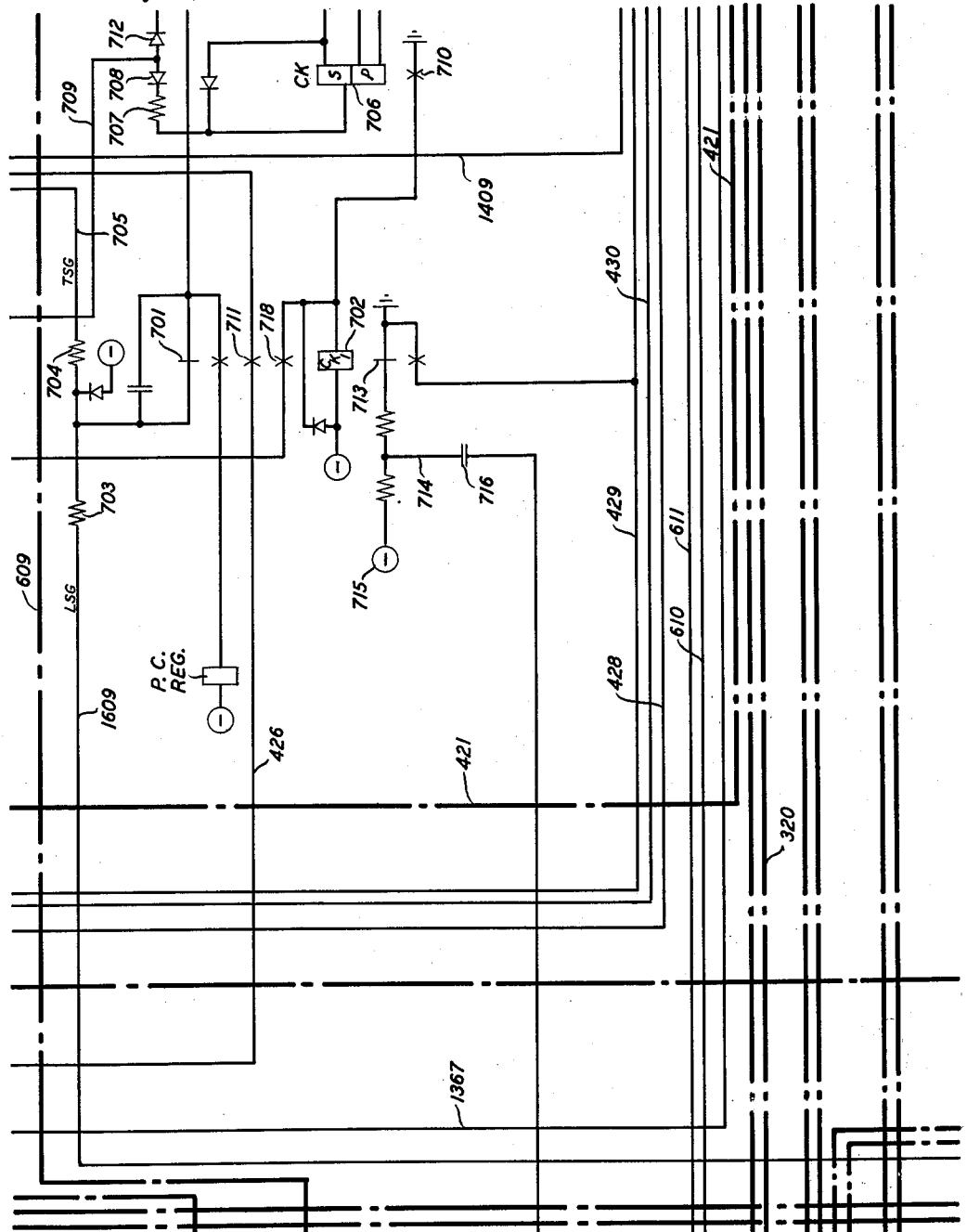
Figure 8:
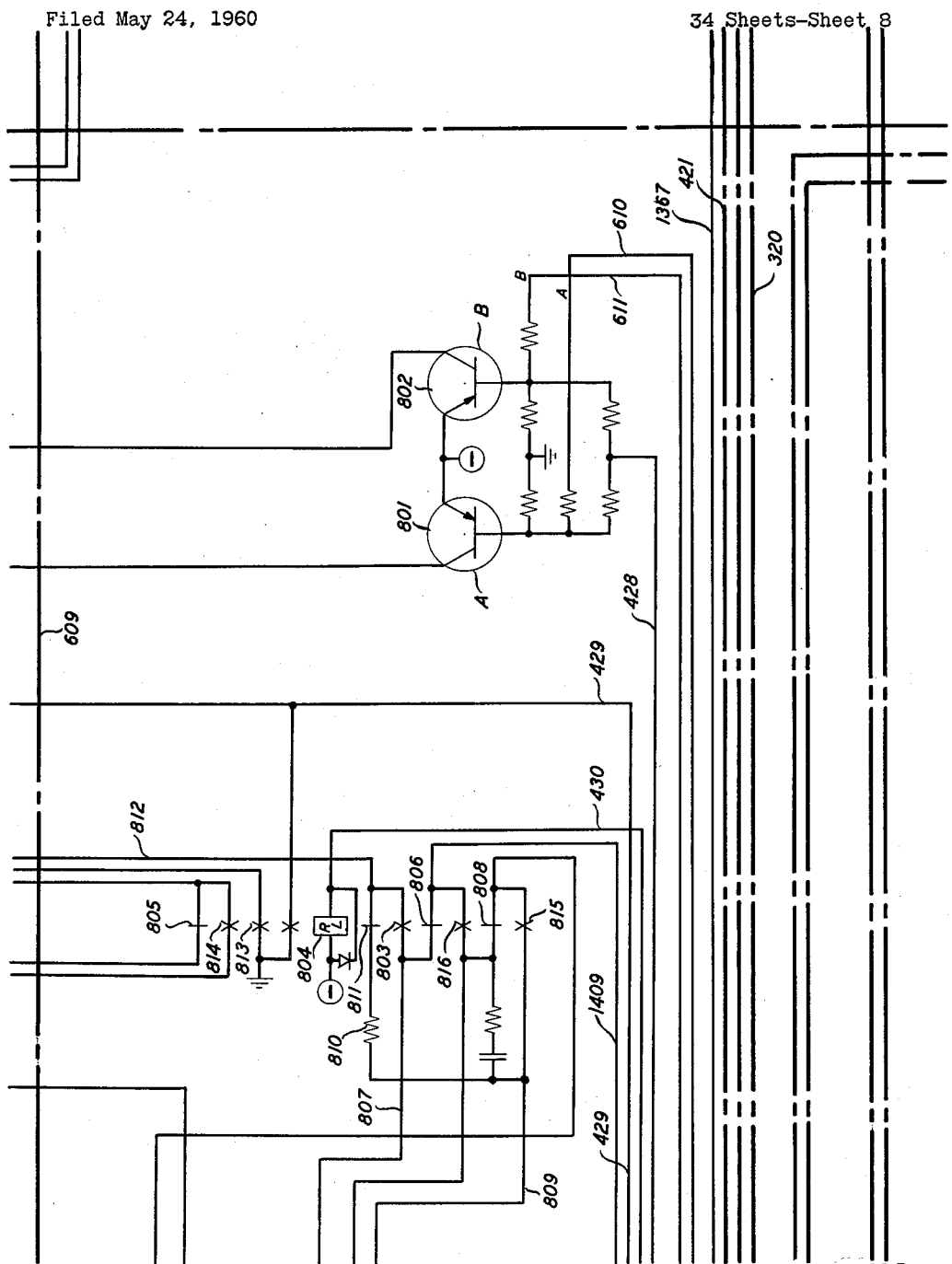

As previously described, a terminating service request, that is, a request to terminate a call to a line served by the line concentrator system, is detected by means of the Line Scanner 111 of FIG. 1. The details of the Line Scanner 111 and the line scanning circuits such as 106 through 109 are shown in FIGS. 3, 4, and 13. The principles involved in providing the necessary connections upon the occurrence of a terminating service request can best be illustrated by way of an example wherein one of the telephone central office line circuits such as 140 through 143 is enabled.

For example, assume that a subscriber, whose station circuitry is not shown, served by the telephone central office 101 has placed a call through the telephone office 101 to the S0 subscriber 217. In response to such a call, the telephone line circuit 140 is energized and the line scanning circuit 106 of FIG. 1 is set to a state which indicates that service is being requested and a connection through the line and trunk switches of the line concentrator central office unit has not been completed. As previously explained, systematic scanning of subscribers' lines proceeds at the central office unit until such time as a request for service, either terminating, originating, or release is indicated. When the telephone office subscriber's line circuit 140 is enabled in response to a terminating request for service, ground potential will be placed on the sleeve conductor 1301 of FIG. 13. Prior to the time that the telephone central office subscriber's line circuit 140 is energized, a potential of approximately —50 volts appears on the sleeve conductor 1301 of FIG. 13. This negative potential is sufficient to back-bias diode 1341 and thereby inhibit the transmission of positive scanning pulses from common point 1324 to common point 1345. When a request for terminating service is indicated each time the A00 conductor 314 is enabled under the control of the Line Scanner 310, a positive pulse will be transmitted from common point 1324 through capacitor 1333 and diode 1341 to common point 1345. Eight line circuits, in this example the line circuits S0, S8, S16, S24, S32, S40, S48 and S56 are connected to common point 1324. Common point 1324 therefore will be enabled eight times in each scanning cycle; however, only during one of these eight times will the H2 conductor 1363 be simultaneously enabled. That is, only during the time that S0 subscriber's line 217 is being scanned will both the A00 conductor 314 and the H2 conductor 1363 be simultaneously energized.

When the S0 subscriber's line 217, which is labeled 2223 in FIG. 22, is being scanned all stages of the Binary Counter 302 will be in the "0" state and the AB flip-flop 601 will be in the A state. With all stages of the Binary Counter 302 in the "0" state, the following conditions obtain:

(1) The AL0 output conductor of Translator 306 will be enabled;

(2) The TG0 output conductor of Translator 307 will be enabled;

(3) The G0 output conductor of Translator 308 will be enabled; and (4) The H2 output conductor of the Translator 309 will be enabled.

Under these conditions, upon the occurrence of a P pulse on conductor 315, the A00 conductor 314 of the Line Scanner 310 will be enabled and if, as indicated in this example, there exists a terminating request for service to the S0 subscriber 2223, the positive pulse on the A00 conductor 314 will be transmitted through capacitor 1333, diode 1341, capacitor 1351 and diode 1360 to the scanner output conductor 1367.

When the S conductor 1367 is energized, the service action flip-flop 404 will be set to its "1" state. It should be noted that a positive pulse is required to set the flip-flop 404; therefore, the diode 403 will be back-biased at this time. Setting of the SA flip-flop 404, as described later, halts the scanning of lines and trunks at the central office unit and the scanning of lines at the field unit until after the necessary connections have been provided through both the central office unit and the field unit between the central office line circuit 140 and the S0 subscriber's station 2223.

The effect of setting of the SA flip-flop 404 can best be understood by the following statements of results;

(1) Upon enablement of the "1" output conductor 431, OR gate 409 will be enabled and the Astable Circuit 301 will be held in its "0" or reset state.

(2) Upon enablement of the "1" output conductor of the flip-flop 404, OR gate 424 will be enabled and the release action flip-flop 405 will be held in its reset or "0" state.

(3) When the SA flip-flop 404 is set to its "1" state, a positive freeze pulse will be transmitted through diode 402, capacitor 406, and the simplex of the first control pair to the field unit. Actions within the field unit will be described later.

(4) When the SA flip-flop 404 is in its "1" state, the "0" output conductor 428 will be de-energized and the inhibiting potential thereon will be removed from the bases of the A and B transistors 801 and 802. Since the AB flip-flop 601 is in its A state, the A conductor 610 is energized at this time and the A transistor 801 will become active. The B transistor 802 will remain passive.

The above actions temporarily halt the scanning of subscribers' lines at both the central office unit and the field unit and scanning of the trunks at the central office unit. Steps must next be taken to establish the appropriate connections through both the central office line and trunk switches and through the field unit line and trunk switches. The establishment of connections through the central office line and trunk switches will first be described and later the connections through the field unit line and trunk switches will be described.

In the central office unit, a connection must be established through the line switch 118 between the central office line circuit 140 of the called subscriber and the first idle link serving the subgroup in which the called subscriber's equipment resides. In the present example, the called subscriber S0 is in the G0 subgroup of subscribers' lines and is served by links 1G0 through 5G0.

Figure 15:
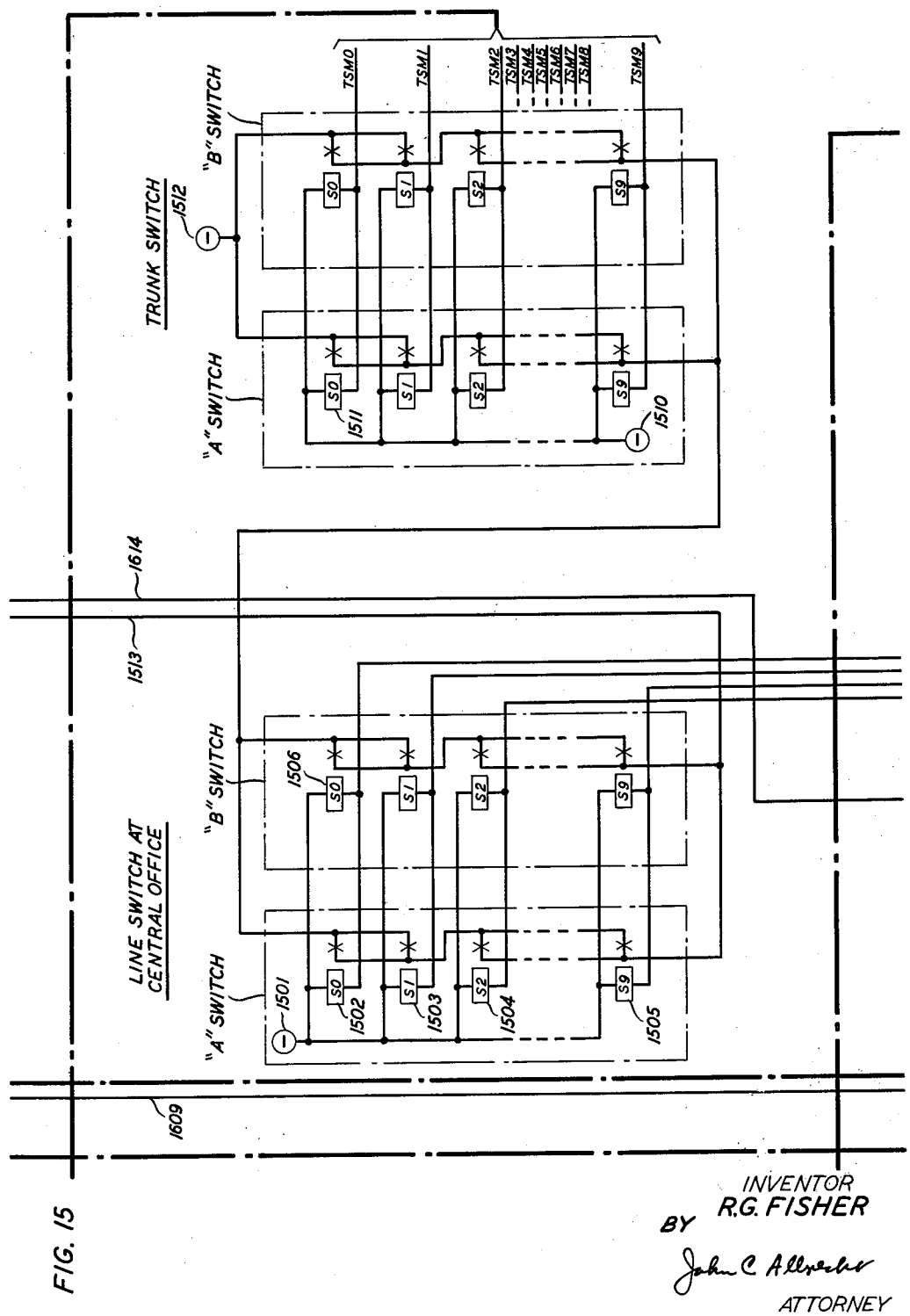
Figure 16:
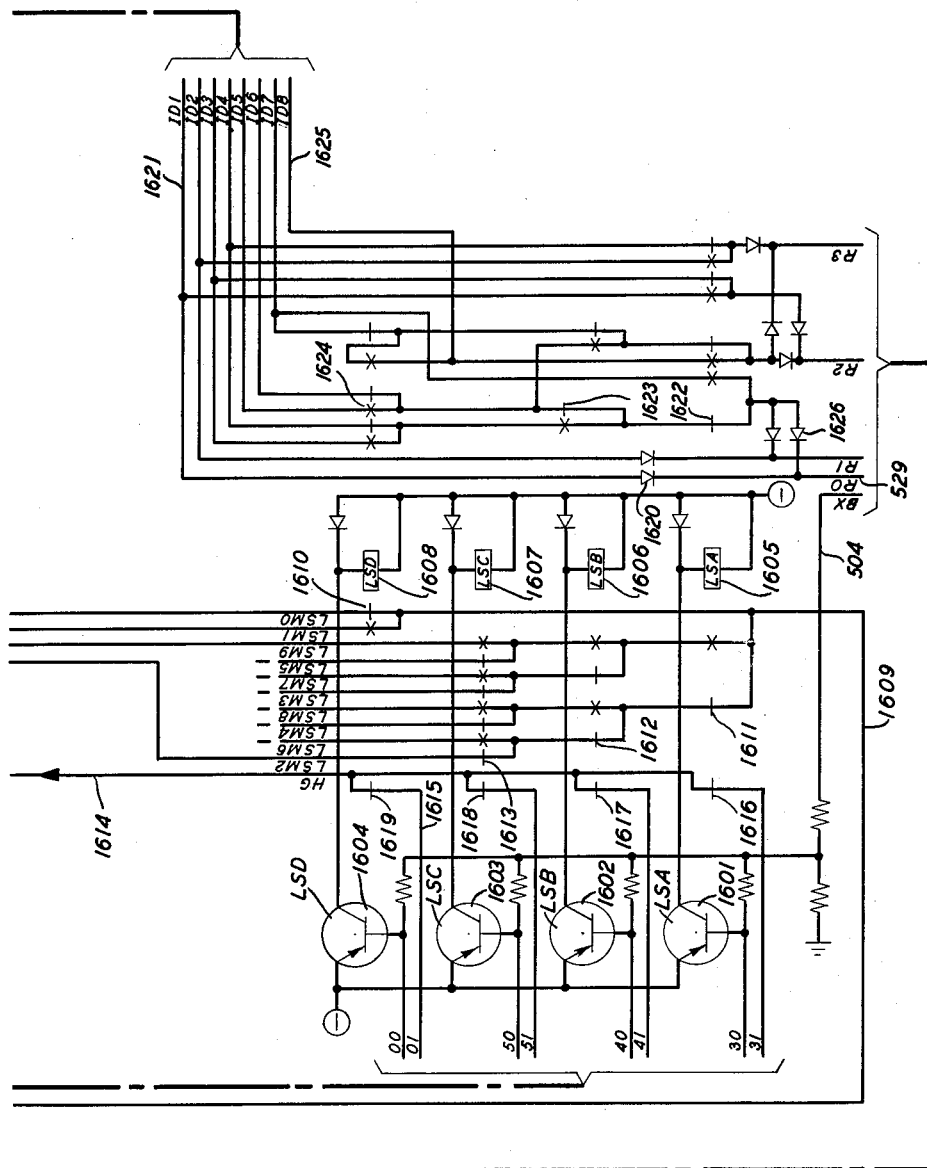

A connection between the S0 subscriber's line and the first idle trunk in group A is prepared by energizing line switch select magnets in accordance with the setting of the zero, third, fourth, and fifth stages of the Binary Counter 302. The line switch hold magnet which is operated to complete the paths prepared by operation of the above-noted select magnets is determined by means of the setting of the second and third stages of the Binary Counter 302 which define the subscriber's line subgroup in which the called line resides and by the appropriate chain to hold magnet contacts shown in FIG. 11. In the present example, the S0 subscriber's line is being called and all stages of the Binary Counter 302 are in their "0" state. Under these conditions, none of the LSA through LSD transistors 1601 through 1604 are activated when the BX conductor 504 is energized and the associated LSA through LSD relays 1605 through 1608 are thereby not energized. The LSA through LSD relays 1605 through 1608 prepare operating paths for the line switch select magnets shown in FIG. 15. In connecting a line to a link through a central office line switch, it is necessary to energize both a steering level select magnet and a subscriber's level select magnet. For example, to connect the S0 subscriber's line to an available link, both the S0 or first steering level select magnet 1502 and the S2 first subscriber's level select magnet 1504 are energized. As will be explained later, the LSG conductor 1609 will be connected to ground potential and this ground signal is transmitted through the LSD relay break contact 1610 to the winding of the S0 select magnet 1502 to the negative potential source 1501. It should be noted that the S0 select magnet 1506 in the B subscriber's line switch is also operated at this time; however, as will be seen later, only a hold magnet in the A switch will be energized to effect a connection through the switch. The operating path for the S2 select magnet 1504 is from the LSG conductor 1609 through break contacts 1611, 1612, and 1613 and the select magnet winding 1504 to the negative potential source 1501.

The G0 through G3 transistors 1201 through 1204 are under joint control of the HG conductor 1614, the BX conductor 504, and the G0 through G3 conductors from the Translator 308. The BX conductor 504, which, as previously described, is an enabling lead to the LSA through LSD transistors, is similarly an enabling lead for the G0 through G3 transistors 1201 through 1204. The G0 through G3 transistors 1201 through 1204, however, are held in their passive state by a signal on the HG conductor 1614 until such time as the appropriate ones of the LSA through LSD relays 1605 through 1608 have operated to remove the inhibiting potential from the HG conductor 1614 over paths which include the LSA through LSD relay break contacts 1616 through 1619. When a counter stage such as the first stage is in its "1" state, a significant potential will exist on the "01" conductor 1615 and this potential is connected to the HG conductor 1614 until such time as the LSA relay 1608 has operated. A similar situation obtains with respect to the "1" conductors of the fourth, fifth, and sixth stages as these are connected through break contacts 1616 through 1618, respectively.

After the necessary LSA through LSD relays have operated, the inhibiting potential is removed from the HG conductor 1614 and the appropriate one of the G0 through G3 transistors 1201 through 1204 becomes active. In the present example, the called subscriber's line S0 resides in the G0 subgroup of the A group of lines and the G0 output conductor of the Translator 308 remains energized when the scanning of lines is halted. Activation of the G0 transistor 1201 effects operation of the G0 relay 1205. The operating paths for the hold magnets in the first or G0 subgroup of subscribers' lines in both the A and B groups include make contacts of the G0 relay 1205. Similarly, operating paths for the hold magnets of the links serving the G1 subgroup of lines for both the A and B groups include make contacts of the G1 relay 1206.

The particular hold magnet within a subgroup which is to be operated is determined from the hold magnet contact chains shown in FIG. 11. No attempt is made to allot traffic between the various links within a subgroup but rather the lowest numbered idle link is always employed. Each of the hold magnets has an auxiliary contact which is closed when the link is in use. The auxiliary contacts of hold magnets within a subscriber subgroup are connected in series as shown in FIG. 11.

The operating path for the line switch select magnets is from ground through one of the make contacts 1209 through 1212 of the G relays 1205 through 1208; through the SM conductor 512, the make contact 507 of the A relay, in the case of a line in the A group or the make contact 518, in the case of a line in the B group, the normally made contact 701 of the CK1 relay 702, resistor 703; LSG conductor 1609, the appropriate contacts of the LSA through LSD relays 1605 through 1608, and the appropriate select magnet windings to the negative potential source 1501. It is seen, therefore, that the operation of the line switch select magnets is under control of the subgroup relays 1205 through 1208, the A or B group relays 502 and 503, and the LSA through LSD relays 1605 through 1608.

Figure 9:
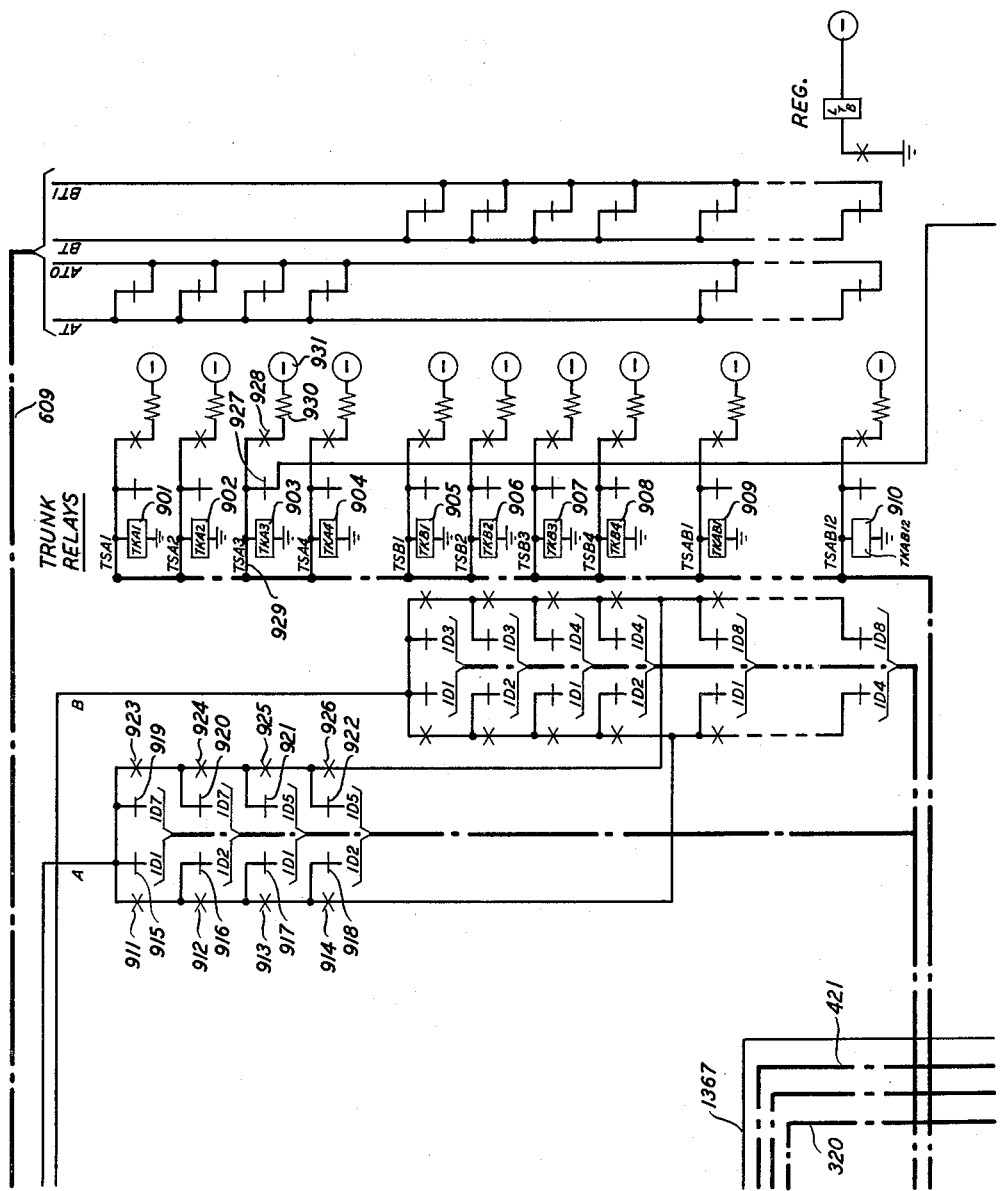

As previously noted, the first available transmission trunk from the central office to the remote concentrator is always employed. The first available trunk is determined by means of the trunk relay contact chains shown in FIG. 9. There are as many trunk relays such as 901 through 910 as there are transmission trunks connecting the central office to the remote concentrator. Whenever a trunk is busy, the associated trunk relay, such as 901 through 910, is operated.

Figure 14:
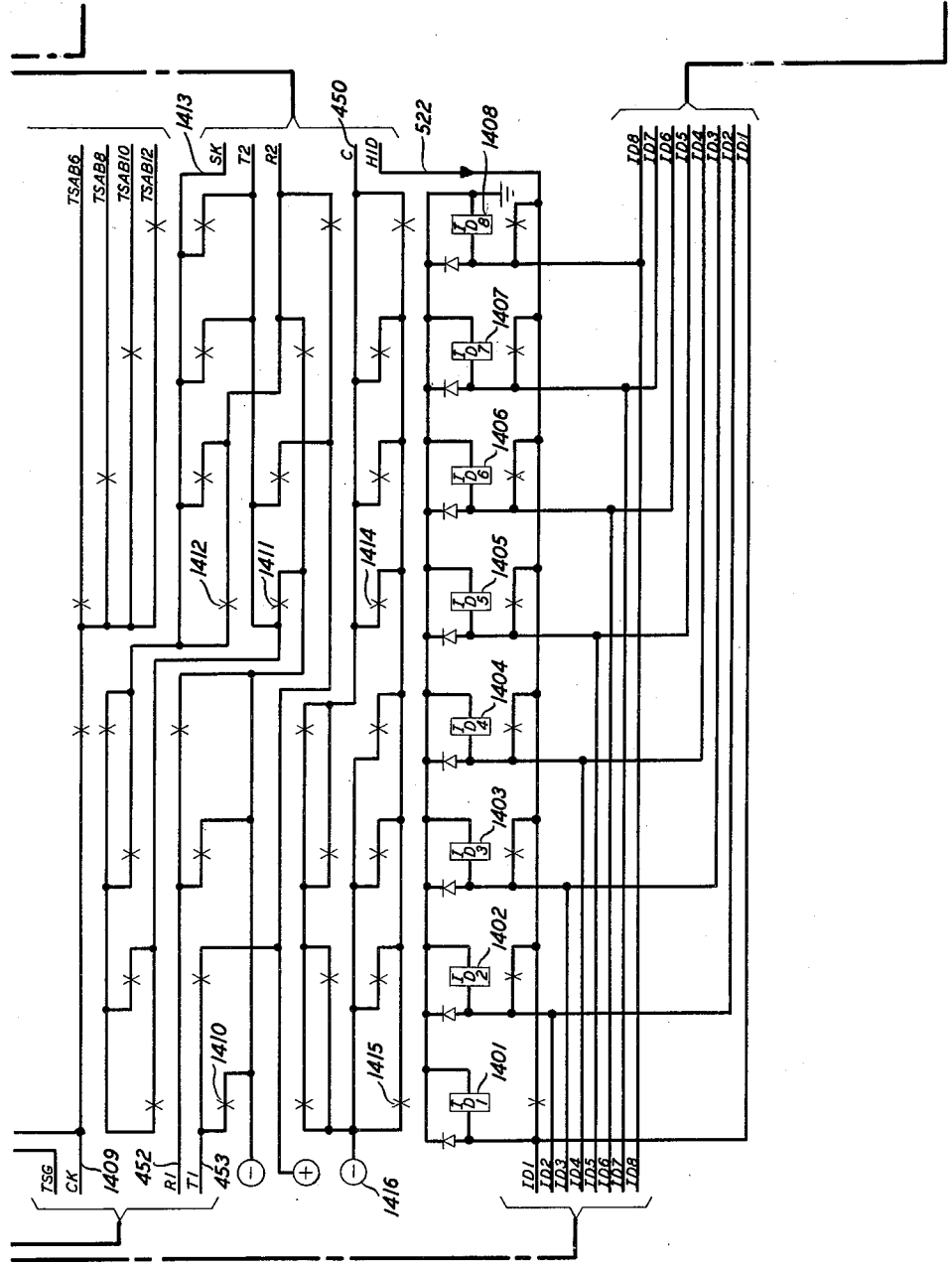

In FIG. 13, there are shown the details of a connection between the central office line circuit for subscriber S0 and the third A group trunk to the remote concentrator. The sleeve conductor 1370 is connected through break contact 927 to the coil of the relay 903. When the trunk A3 is seized, the sleeve conductor will be energized and the associated trunk relay 903 will be operated and it will lock operated through its make contact 928. The third A trunk was chosen in the example as it is assumed that the first and second A trunks were busy and the associated trunk relays 901 and 902 were operated. Under these conditions, the make contacts 911 and 923 of the TKA1 relay 901 and the make contacts 912 and 924 of the TKA2 relay 902 were closed and the break contacts 915, 916, 919, and 920 were opened. At the time the trunk to be employed is determined, the C relay 432 is normal and a path is complete from negative battery through the break contact 433 of the C relay 432, conductor 434, the make contact 509 of the A relay 502, conductor 520, and the operated contacts 911, 912, 923, and 924 to the appropriate identification relay windings in FIG. 14.

In the case of the example, negative battery is extended through make contacts 911 and 912 and break contact 917 to the winding of the ID1 relay 1401 and through make contacts 923 and 924 and break contact 921 to the winding of the ID5 relay 1405. In that the trunk relay 903 for trunk A3 will be operated as soon as the connection is established through the line and trunk switches, a holding path must be provided for the ID1 through ID8 identification relays 1401 through 1408. The hold path includes the negative potential source 521, make contact 506 on the A relay 502, the HID conductor 522, and the make contacts of the operated ID1 through ID8 relays, which, in this example, are the ID1 relay 1401 and the ID5 relay 1405. The contacts of the ID1 through ID8 relays 1401 through 1408 serve to determine the trunk switch select magnets which are to be operated to effect a connection between the called line and the first idle trunk to the remote concentrator. The operating path for the trunk switch select magnets is in part in common with the line switch select magnet operating path. Common to the two select magnet operating paths are the make contacts 1209 through 1212, the SM conductor 512, the make contacts 507 of A relay 502 or make contacts 518 of B relay 503, and the break contact 701 of CK1 relay 702. At this point, the line switch select magnet path goes through resistor 703 and the trunk switch select magnet path goes through resistor 704. The remainder of the trunk switch select magnet operating path is conductor 705 and the operated contacts of the ID1 through ID8 relays 1401 through 1408 through the chosen trunk switch select magnets to the negative potential source 1510. In the example in which trunk A3 is to be employed, the ID1 relay 1401 and the ID5 relay 1405 are operated. Under these conditions, the TSG conductor 522 is connected through make contact 1001 of the ID1 relay 1401 and make contact 1002 of the ID5 relay 1405 over the TSM3 lead to the S3 selected magnet which is not shown in FIG. 15 to the negative potential source 1510. There is also another trunk switch select magnet operating path extending from conductor 522 through make contact 1004 and make contact 1003 near the TSM0 lead to the winding of the S0 steering level select magnet 1511 to the negative potential source 1510. Operation of the first steering select magnet 1511 and the third horizontal select magnet, which is not shown, defines the selection of trunk A3. The connection of the trunks through the trunk switch can be seen in FIG. 18.

For example, the A3 trunk can be extended through one of the make contacts 1801 through 1804, associated with the S3 select magnet 1805 and one of the make contacts 1806 through 1809, associated with the S0 steering magnet 1810 to the appropriate one of the links extending the transmission path from the line switch to the trunk switch.

For example, the called line S0 lies in subgroup 0; therefore, one of the links 1G0 through 5G0 will be employed. The appropriate link within a subgroup to be used is determined from the hold magnet contact chains shown in FIG. 11. When a link is busy, its associated hold magnet will be operated. The hold magnets auxiliary contacts, such as 1150 through 1154, are connected in a chain which serves to operate one of the LK0 through LK4 link relays 1101 through 1105. For example, if the first link of the G0 subgroup of the A group is busy, the contact 1150 will be closed and the contact 1160 will be open. Similarly, if the second link of the same group is busy, contact 1151 will be closed and contact 1161 will be open. The operating potential for the LK0 through LK4 link relays 1101 through 1105 is derived from the source 1512 in FIG. 15. The operating path for the link relays includes make contacts of both the trunk switch and line switch select magnets, conductor 1513, one of the make contacts 1213 through 1215 of the subgroup relays 1205 through 1208, and specifically in this instance, make contact 1213 of the G0 relay 1205, one of the G0 through G3 conductors 1217 through 1220, one of the A relay make contacts 513 through 516, and the appropriate one of the conductors A0 through A3. In the example, the G0 conductor 1217 is extended through make contact 516, the A0 conductor 523, to the winding of the link relay associated with the first idle link in subgroup G0. Assuming that the first link 1G0 is idle, the negative potential on conductor 523 will be connected through the break contact 1160 to the winding of the LK0 relay 1101 and thence to ground. Operation of the LK0 relay 1101 opens contact 1106, thereby removing ground potential from the windings of link relays 1102 through 1105, thereby preventing inadvertent operation of additional link relays. The make contacts of the operated one of the LK0 through LK4 relays and the make contacts of the operated one of the G0 through G3 relays 1205 through 1208 define the line switch and trunk switch hold magnets associated with the first idle link in the subgroup in which the called line resides. In our example, the LK0 relay 1101 is operated and the G0 relay 1205 is operated. The hold magnet operating path includes the negative potential source 435, the make contact 436 of the TR1 relay 437 which operated in response to a service request as later described, the make contact 508 of the A relay 502, the HA conductor 524, the make contact 1107 of the LK0 relay 1101, the make contact 1221 of the G0 relay 1205, and the hold magnets 1323 of the trunk switch and 1312 of the line switch. In FIG. 13, only the hold magnets associated with the first link of subgroup G0 are shown. It must be remembered that there are twenty line switch hold magnets such as 1712 through 1715 shown in FIG. 17 and twenty trunk switch hold magnets such as 1812 through 1815 shown in FIG. 18. That is, there is one line switch hold magnet and one trunk switch hold magnet for each link between the line and trunk switches.

After the hold magnets have been operated, the connections shown in FIG. 13 are completed. That is, the tip and ring conductors 1303 and 1302 from the central office line circuit are connected through the horizontal contacts 1310 and 1308, and through the steering contacts 1311 and 1309 of the line switch 1304, and through the steering contacts 1320 and 1318 and the horizontal contacts 1321 and 1319 of the trunk switch 1322. The tip and ring conductors 1303 and 1302 from the central office line circuit are thereby connected to the tip and ring, respectively, of trunk A3. The sleeve or supervisory lead 1301 for the subscriber's line S0 is connected through line switch contacts 1306 and 1307 and through trunk switch contacts 1316 and 1317 to the conductor 1370. The potential at scan point 1369 determines the state of the trunk. That is, during the time the central office line circuit is in the busy condition the S conductor 1301 will be at approximately ground potential. When the line circuit at the central office is idle, the potential at the S conductor 1301 will be approximately negative 50 volts. Accordingly, by connecting the S conductor 1301 through the line and trunk switches to the scan point 1369, it is possible to detect when the central office line equipment is released and thereby an indication is obtained that the trunk may be released. The action of the central office line equipment is the same in the case of terminating and originating calls. That is, during the time a terminating or originating call exists, the sleeve conductor 1301 will be at ground potential and after either type of call has been completed, the sleeve conductor will revert to approximately negative 50 volts.

The hold magnets such as 1312 and 1323 lock up over the path which includes resistor 1313 and make contact 1305 of hold magnet 1312 to the negative potential source.

When the crosspoints close, a signal of approximately −25 volts is extended over the trunk sleeve conductor 1370 to operate the trunk relay 903. Operation of relay 903 opens its operating path via break contact 927 and closes a hold path over make contact 928 to the negative potential source 931. Accordingly, after this connection has been established and scanning of lines again proceeds, the next request for service will be served by a trunk circuit other than trunk A3.

In addition to providing an operating source for the relay 903, the negative 25-volt potential serves to back bias diode 1341 and thereby inhibit the generation of a request for service signal during the time a connection is established through the network.

Figure 10:
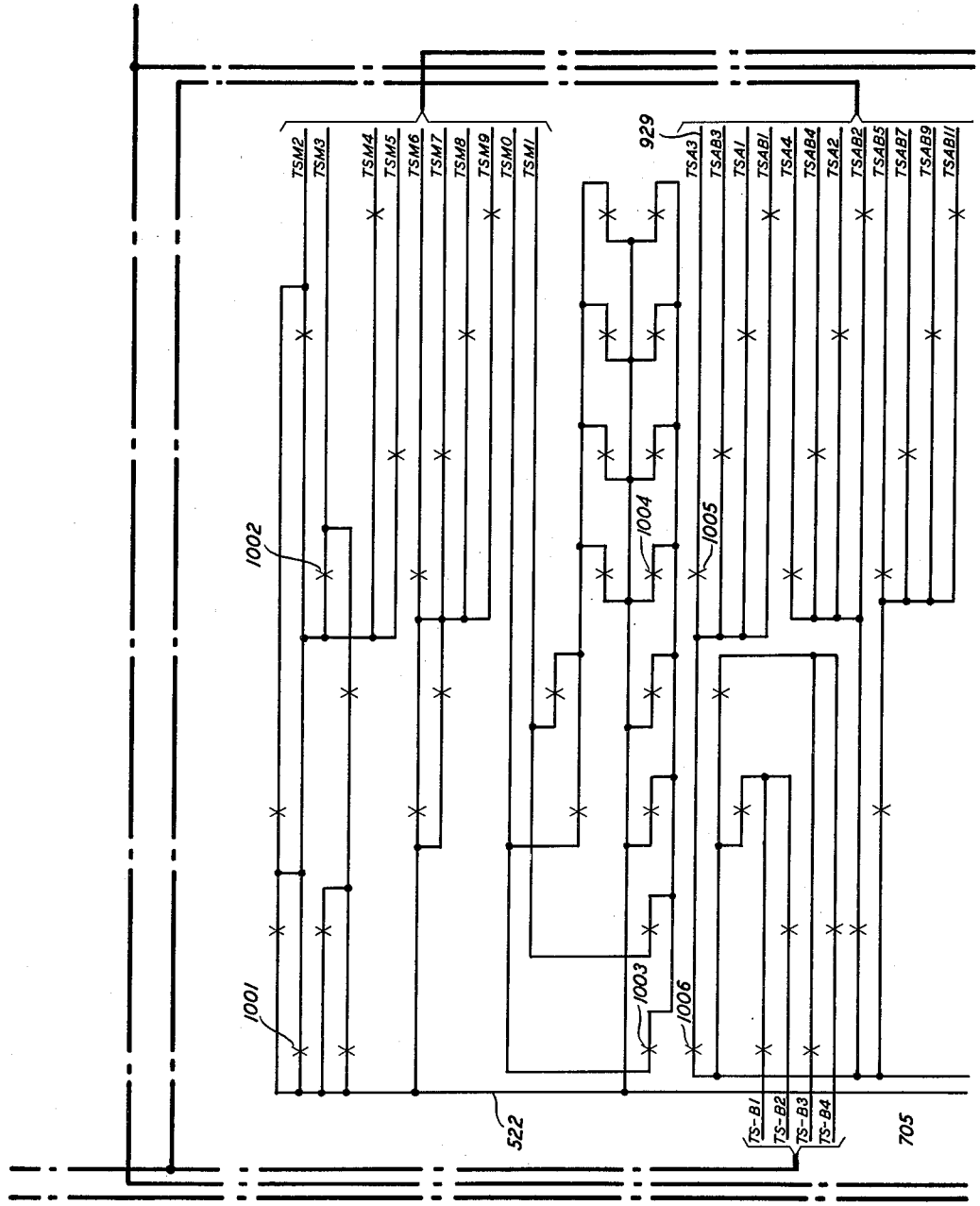

Operation of the trunk relay 903 extends a negative potential over the TSA3 lead 929 to a chain of contacts of the operated ones of the identification relays 1401 through 1408. As previously noted, in this example in which trunk A3 is employed, the ID1 relay 1401 and the ID5 relay 1405 are operated. As seen in FIG. 10, the TSA3 conductor 929 is extended through the make contact 1005 of the ID5 relay 1405 and the make contact 1006 of the ID1 relay 1401 to the check lead 1409. By this process, the equipment verifies that the trunk relay associated with the chosen trunk is in fact the one operated. Energization of the check lead 1409 serves to operate the check relay 706 over a path which includes the break contact 806 of the RL relay 804, the secondary winding of the check relay 706, resistor 707, diode 708, conductor 709, make contact 438 of the TR1 relay 437 to ground potential. Closure of the make contact 710 of the CK relay 706 closes the operating path for the winding of the CK1 relay 702. As previously explained, the operating paths for both the line switch select magnets and the trunk switch select magnets include the break contact 701 of the CK1 relay 702. Accordingly, once the control circuit has verified that the appropriate trunk relay has been operated, the select magnets of both the line and trunk switch are released.

During the time the central office unit is establishing the appropriate connections through the line and trunk switches, the field unit is similarly proceeding to connect the subscriber's station to the trunk which has been chosen by the central office unit. As was previously explained, when the service action flip-flop 404 was set to its "1" state, a freeze pulse was sent via the simplex of the first control pair comprising conductors 414 and 415 to the field unit. This signal over the simplex served to temporarily halt scanning action in the remote field unit. Before the field unit can establish the required connections through its line and trunk switches, it must obtain the identity of the trunk which is to be employed from the central office unit.

Communication, for purposes of control, between the central office unit and the remote concentrator unit is accomplished over the first and second control pairs comprising conductors 414, 415, 440, and 441. During the scanning cycle, the line terminals 416 and 417 of the coil 401 are connected via the make contacts 410 and 411 of the TR relay 418, first control pair conductors 414 and 415, break contacts 2401 and 2404 of the auxiliary relay 2409, and conductors 2405 and 2406 to the line terminals of the coil 2101. It is by way of this path that freeze signals, upon detection of a request for service in the central office, are transmitted to the remote unit and, similarly, requests for service from the field unit are transmitted to the central office unit. In both directions of transmission, the simplex of the pair is employed. The above-mentioned simplex path includes make contacts of the TR relay 418. The TR relay 418, during scanning, is held operated over parallel paths which include the T2 and R2 conductors 440 and 441 of the second control pair, the negative potential source 442, and the windings of the A and B relays 1901 and 1902 in the field units. Resistor 443, which is common to the two parallel paths, is adjusted so that the total current is sufficient to operate the TR relay 418 but insufficient to operate the A and B relays 1901 and 1902. The negative potential source 442, adjustable resistor 443, the winding of the TR relay 418, and resistor 444 join the two parallel paths at the junction of diodes 445 and 446. The path which includes the T2 conductor comprises diode 445, break contact 805 of the RL relay 804, break contact 439 of the TR1 relay 437, the T2 conductor 440, the break contact 2410 of the C1 relay 2419, diode 2411, conductor 2412, and the winding of the A relay 1901 to ground potential. The path which includes the R2 conductor 441 comprises diode 446, break contact 447 of the TR1 relay 437, the R2 conductor 441, the break contact 2001 of the C1 relay 2419, diode 2002, the break contact 2003 of the relay 2409, and the winding of the B relay 1902 to ground potential.

During the scanning cycle, the control relays are in the following states:

| Central office unit | Field unit |
| --- | --- |
| TR relay 418 operated. | A relay 1901 not operated. |
| TR1 relay 437 not operated. | B relay 1902 not operated. |
| O relay 432 not operated. | RL relay 1903 not operated. |
| RL1 relay 501 not operated. | Auxiliary relay 2409 not operated. |
| A relay 502 not operated. | |
| B relay 503 not operated. | C1 relay 2419 not operated. |
| RL relay 804 not operated. | C2 relay 2413 not operated. |
| CK relay 706 not operated. | RL1 relay 2004 not operated. |
| CK1 relay 702 not operated. | CK relay 2005 not operated. |

Figure 31:
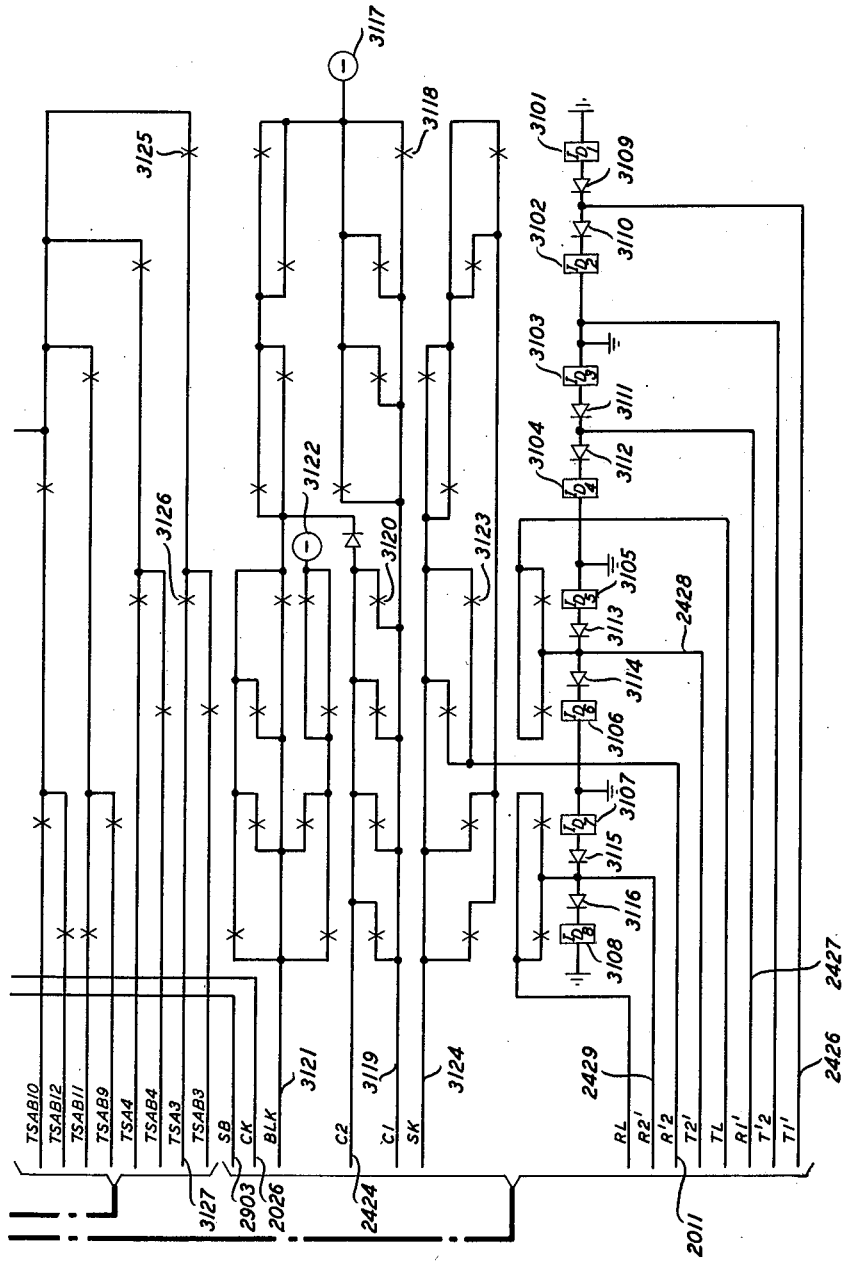

When the A relay 502 is the central office unit operated in response to the change in state of the SA flip-flop 404 a connection was established from the negative potential source 525 through make contact 510 of the A relay 502, the break contact 805 of the RL relay 804, the break contact 439 of the TR1 relay 437 to the T2 conductor 440 of the second control pair to the remote field unit. This direct negative potential (as opposed to a negative potential connected through resistors 443 and 444 and the winding of the TR relay 418) provides sufficient current over the T2 conductor to effect operation of the A relay 1901. It should be noted at this time that when a request for service relating to a line in the B group of lines appears at the central office, the direct negative potential is transmitted from the central office unit to the field unit over the R2 conductor 441, and under these conditions the B relay 1902 operates. Operation of either the A relay 1901 or the B relay 1902 provides an operating path for the auxiliary relay 2409 from the negative potential source 2301 through the make contact 2302 or the make contact 2303, diode 2414, and the winding of the auxiliary relay 2409 to the positive potential source 2415. Operation of the auxiliary relay 2409 transfers the T1 and R1 conductors 414 and 415 of the first control pair from the line terminals 2405 and 2406 of the coil 2100 to the windings of particular ones of the identification relays shown in FIG. 31. The T1' conductor 2426 is connected through the diodes 3109 and 3110 to the windings of the ID1 and ID2 relays 3101 and 3102, respectively. The R1' conductor 2427 is connected through diodes 3111 and 3112 to the windings of the ID3 and ID4 relays 3103 and 3104, respectively. After one of the ID1 through ID4 identification relays 3101 through 3104 has operated as later described, an operating path for the C1 relay 2419 will be provided.

The T2 and R2 conductors 440 and 441 are similarly employed to transmit trunk identification information from the central office unit to the field unit. The T2 conductor 440 is connected through make contact 2416 of the C1 relay 2419 and the break contact 2417 of the C2 relay 2413 to the T2' conductor which is connected to the oppositely poled diodes 3113 and 3114. The R2 conductor 441 is connected through make contact 2418 of the C1 relay 2419 and break contact 2425 of the C2 relay 2413 to the R2' conductor which is connected to the oppositely poled diodes 3115 and 3116. As will be seen later with respect to the arrangements at the central office unit, the identity of the trunk chosen at the central office unit will be transmitted from the central office to the remote concentrator over the first and second control pairs in a modified two-out-of-eight code. The eight possible codes comprise plus or negative potentials applied to each of the four conductors T1, R1, T2, and R2. In the coding scheme employed, one of the first control pair conductors, that is, T1 or R1, is always used, and the most, one of the second control pair conductors T2 or R2 is used. Accordingly, in all instances, one of the second control pair conductors is idle and is available for another purpose. A spare one of the two conductors of the second control pair is employed to transmit an indication from the field unit to the central office unit that it has completed its set-up cycle or, in the case of a release, its release cycle.

Before proceeding to a detailed discussion of the arrangements whereby a check signal is transmitted to the central office, it will now be shown how the coding of the control conductors, in accordance with the designation of the chosen trunk, is accomplished at the central office.

When the A relay 502 or the B relay 503 operates in response to a service request, the negative potential source 525 is connected through the make contact 510 or the make contact 526, respectively, to back bias the diode 445 or the diode 446. Although one of the parallel paths which provides the operate current for the TR relay 418 is thus disabled there is still sufficient current through the remaining parallel path to sustain operation of the TR relay. When the A relay 502 is operated the diode 445 is back biased and the TR relay 418 is held operated through diode 446, the R2 conductor 441, the break contact 2001 of the C1 relay 2419, diode 2002, the break contact 2003, and the winding of the B relay 1902 to ground potential. In this instance the TR relay 418 does not release until the auxiliary relay 2409 operates in the field and thereby opens contact 2003.

When the B relay 503 is operated the diode 446 is back biased and in this instance the TR relay 418 is held operated over a path which includes diodes 445, the T2 conductor 440, the break contact 2410 of the C1 relay 2419, diode 2411, the break contact 2430 of the auxiliary relay 2409, and the winding of the A relay 1901 to ground potential. The TR relay 418, therefore, does not release in this instance until after the auxiliary relay 2409 operates and thereby opens contact 2430.

Release of the TR relay 418 is intentionally delayed until atfer the auxiliary relay 2409 has operated in the field. This insures that the coil 2100 has been removed from the first control pair and that it is safe for the central office unit to send the appropriate potentials to the field unit to operate the desired ones of the ID1 through the ID8 identification relays 3101 through 3108. Release of the TR relay closes an operating path for the TR1 relay which includes ground potential, the break contact 457 of the TR relay 418, the TR1 relay 437, the HID conductor 522, and the make contact 506 in the case of operation of the A relay 502 or the make contact 527 in the case of operation of the B relay 503. Release of the TR relay connects the T1 and R1 conductors 414 and 415 through the break contacts 412 and 413 to chains of contacts of the ID1 through ID4 relays 1401 through 1404. Similarly, operation of the TR1 relay connects the T2 and R2 conductors 440 and 441 through the make contacts 448 and 449 to chains of contacts of the ID5 through ID8 relays 1405 through 1408.

In the example in which the ID1 and ID5 relays 1401 and 1405 are operated, negative potential will be connected through the make contact 1401 to the T1 conductor, and negative potential will be connected through the make contact 1411 to the T2 conductor. The T1' conductor 2426 at the remote unit corresponds to the T1 conductor at the central office unit and the T2' conductor 2428 corresponds to the T2 conductor. Negative potential on the T1' conductor is effective to operate the ID1 relay 3101 which corresponds to the ID1 relay 1401 at the central office unit and negative potential on the T2' conductor is effective to operate the ID5 relay 3105 which is the counterpart of the ID5 relay 1405 at the central office unit. The coding signals on the first and second control pairs are therefore effective to operate, at the remote unit identification relays having similar numbers to those operated in the central office unit.

It is assumed that the central office unit and the remote unit are operating without fault and that the Binary Counter 2501 has accurately responded to the control pulses from the central office unit. Under these conditions the Binary Counter 2501 will freeze in the same state that the Binary Counter 302 was in at the time the request for service was indicated. In the example, a terminating request for service to the S0 subscriber was indicated. Accordingly, all stages of the Binary Counter 2501 will be in the "0" state and the G0 conductor of the Translator 2503 and the H2 output conductor of the Translator 2504 will both be enabled.

The A relay 1901 which, as previously described, operated in response to a negative potential signal from the central office on the T2 conductor 440 is temporarily held operated by the circuit which includes the capacitor 2029, the resistor 2030, and the potentials connected thereto. That is, the capacitor 2029 acquires a negative charge which serves to hold the A or B relays 1901 or 1902 operated until such time as one of the first four identification relays 3101 through 3104 operates. When one of the first four identification relays 3101 through 3104 operates potential source 3117 is connected to the C1 conductor 3119. The negative potential on conductor 3119 serves to operate the C1 relay 2419 and over a path including diode 2031 serves to sustain the operation of the previously operated A or B relays 1901 or 1902. The charge on capacitor 2029 serves to hold the A or B relay operated between the time the TR1 relay 437 operates but before one of the first four identification relays 3101 through 3104 has operated. The identity of the line to which the connection is to be established is determined from the information available in the remote unit and once the identity of the trunk which is to provide the transmission facilities between the central office unit and the field unit has been determined, the appropriate connections may be established through the line and trunk switches 2204 and 2203, respectively. The LSA through LSD transistors 3001 through 3004 operate in accordance with the setting of the 0, 3, 4, and 5 stages of the Binary Counter 2501. The LSA through LSD relays 3005 through 3008 operate in response to enablement of their associated transistors. The contact chains which include the contacts of the LSA through LSD relays 3005 through 3008 determine the line switch select magnets which are to be operated. In the case of a call to the S0 subscriber, the LSA through LSD relays 3005 through 3008 will all be unoperated and a path will be completed from the LSB conductor 2901 through the break contact 3009 of the LSD relay 3008 to operate the S0 select magnet 2610, and a second path will be completed from the LSB conductor 2901 through the break contacts 3010, 3011, and 3012 to operate the S2 select magnet 2611.

Similarly numbered select magnets in the A and B line switches 2601 and 2602 will operate under the influence of the above control paths which include the contacts of the LSA through LSD relays 3005 through 3008. However, as in the case of the central office unit, it will be seen later that a hold magnet in the A switch will operate in the case of a connection to one of the A group of lines and a hold magnet in the B switch will operate in the case of a connection to one of the B group of lines. In the example in which a call is placed to the S0 subscriber's line, the S0 steering level select magnet 2610 and the S2 horizontal select magnet 2611 operate in parallel over the previously enumerated paths through the contacts of the LSA through LSD relays. These parallel paths join conductor 2901 and the operating path for the select magnets is completed over a path which includes the make contact 2902 of the ID1 relay 3101, the SB conductor 2903, the make contact 2006, and the break contact 2007 of the RL1 relay 2004 to the positive potential source 2008.

Figure 26:
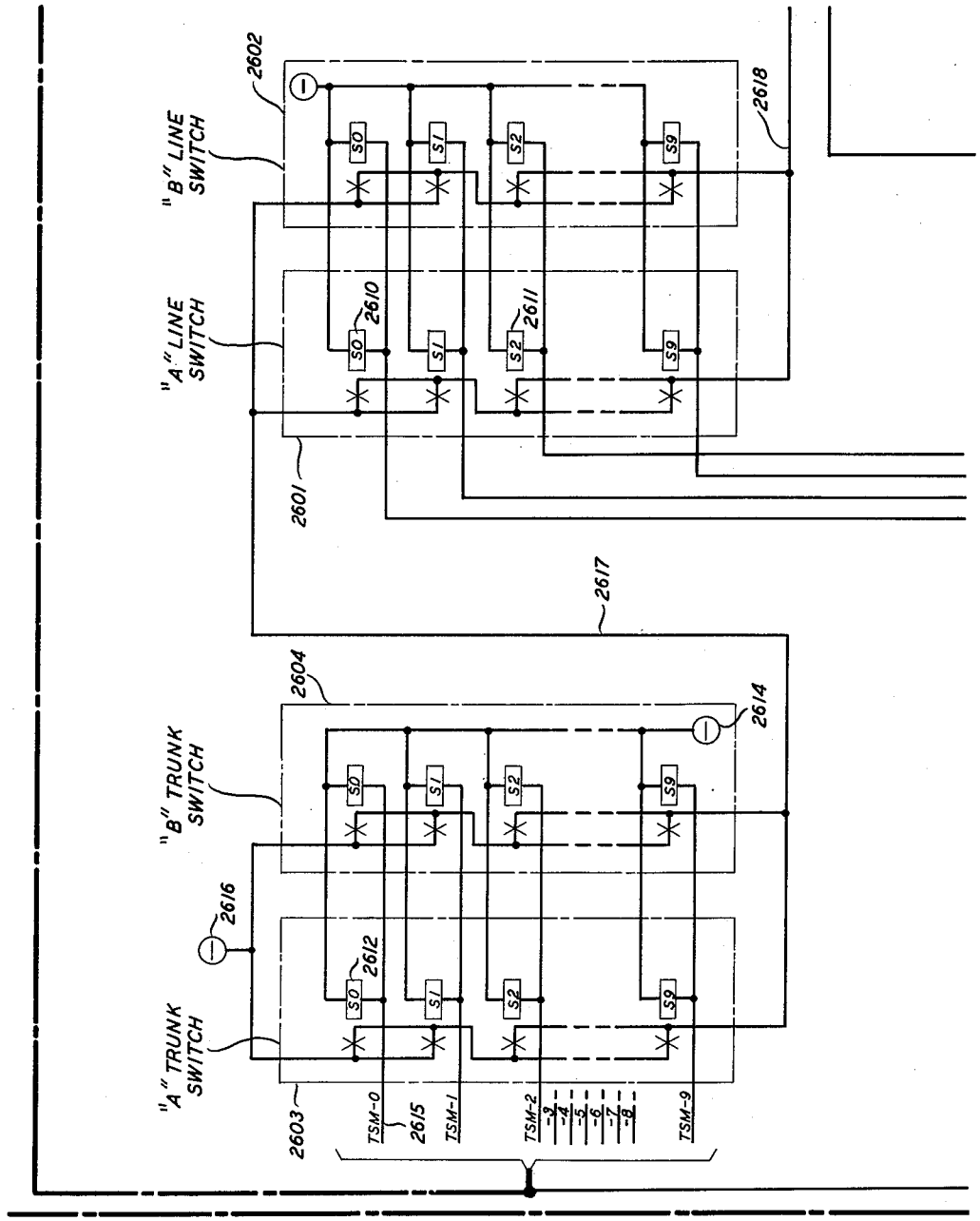
Figure 27:
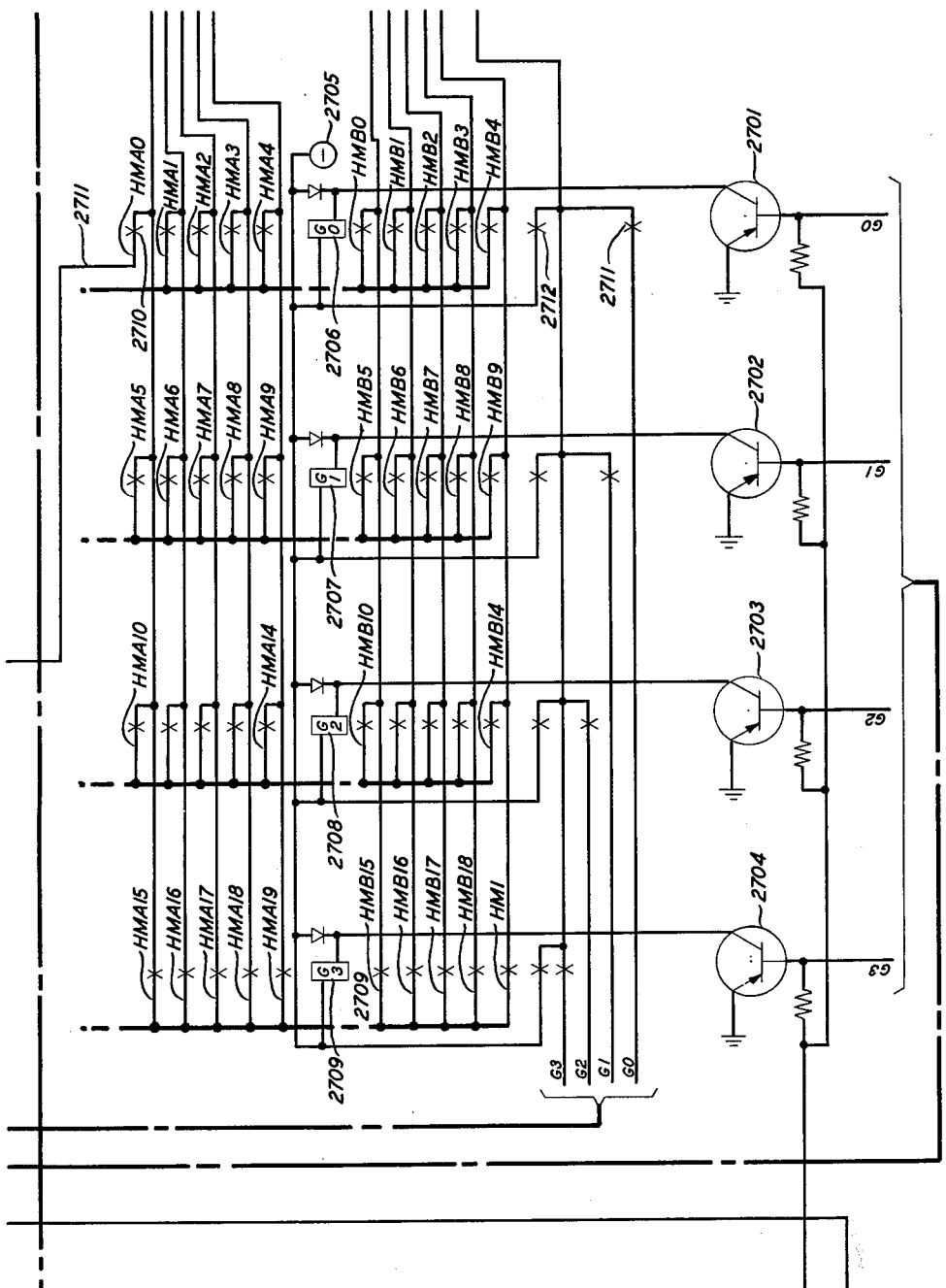

The appropriate trunk switch select magnets will operate in accordance with the settings of the ID1 through ID8 identification relays 3101 through 3108. In the example, the A3 transmission trunk is to be employed; therefore, the S0 select magnet 2612 and the S3 select magnet not shown in FIG. 26 must be operated. The operating path for the S0 select magnet is from the negative potential source 2614 through the S0 magnet 2612, the TSM-0 conductor 2615, the make contact 2904 of the ID1 relay 3101, the make contact 2905 of the ID5 relay 3105, the SB conductor 2903, the make contact 2006 of the C2 relay 2413, the break contact 2007 of the RL1 relay 2004 to the positive potential source 2008. The operating path for the S3 select magnet, which is not shown in FIG. 26, includes the path from the positive potential source 2008 and the SB conductor 2903, and at this point the operating path from the S3 select magnet deviates from the operating path for the S0 select magnet. The remainder of the path for the S3 magnet is the make contact 2906 of the ID1 relay 3101, the make contact 2908 of the ID5 relay 3105, the TSM-3 conductor 2907, the winding of the S3 select magnet to the negative potential source 2615. Again, similarly numbered select magnets in both the A and B trunk switches operate in response to the above numerated paths. However, as in all other instances, the desired connection is effected by operating a hold magnet on a mutually exclusive basis in one or the other of the two trunk switches. After the line and trunk switch select magnets have been operated, it is then possible to operate the required line and trunk switch hold magnet. As in the central office unit, there are twenty hold magnets associated with each of the A and B line switches. The hold magnets for only one link are shown in the drawing of the remote unit. These hold magnets 2212 and 2213 are shown in FIG. 22 of the drawing. As in the case of the central office unit, the lowest numbered idle link is always employed.

The link to be employed is determined from the hold magnet contact chain shown in FIG. 28 which is similar to the hold magnet contact chain previously described and shown in FIG. 11.

After the full complement of select magnets in the line switch and trunk switch have operated, one of the four subgroup transistors 2701 through 2704 will be energized. That is, after a steering select magnet and a horizontal select magnet have been operated in both the line switch and the trunk switch, a path will be completed from the negative potential source 2616 through the select magnet contacts to the conductor 2618. A negative potential on conductor 2618, in cooperation with significant potentials on the G0 through G3 conductors, will enable one of the four transistors 2701 through 2704 and attendant thereto one of the G0 through G3 relays 2706 through 2709 will operate. In the example, the S0 subscriber's line lies in subscribers' subgroup G0 of the A group of lines. Accordingly, the G0 output conductor of the Translator 2503 will bear a potential which, in cooperation with the negative potential on conductor 2618, will energize transistors 2701 and thereby operate relay 2706. The potentials on the G1 through G3 output conductors of the Translator 2503 will be such that the transistors 2702 through 2704 will not be energized. Operation of the G0 relay 2706 prepares an operating path for the hold magnets 2212 and 2213. As in the case of the example at the central office unit, only the hold magnets for the first link of the G0 subgroup are shown. Closure of the make contact 2710 prepares the operating path for the hold magnets 2212 and 2213.

The complete operating path for the hold magnets 2212 and 2213 is from the negative potential source, the winding of the hold magnet 2213, the winding of the hold magnet 2212, the HMA0 conductor 2711, make contact 2710 of the G0 relay 2706, the make contact 2806 of the LK0 relay 2801, the HA conductor 2807, the make contact 1904 of the A relay 1901, the break contact 2007 of the RL1 relay 2004 to the positive potential source 2008. The LK0 relay 2801 operated after the G0 relay 2706 operated and its operation completed the above enumerated path for the hold magnets 2212 and 2213. The operating path for the LK0 relay 2801 is from the positive potential source 2808, the winding of the LK0 relay 2801, the break contact 2809 of the hold magnet off-normal contacts, the A0 conductor 2810, the make contact 1905 of the A relay 1901, the G0 conductor 1906, the make contacts 2711 and 2712 of the G0 relay 2706 to the negative potential source 2705.

The operating path for the LK0 relay 2801 is broken when the hold magnet off-normal contact 2809 is opened. The LK0 relay 2801, however, is held operated over a path which includes conductor 2812 and the make contact 2712 of the G0 relay 2706. Operation of the LK0 relay 2801 opens the break contact 2815 and thereby prevents operation of another one of the LK1 through LK4 relays 2802 through 2805.

Operation of the hold magnets 2212 and 2213 completes the transmission path from the S0 subscriber 2223 to the tip and ring of the third transmission trunk in the A group of trunks. Once the transmission path is established, steps may be taken to release the select magnets and to place the control circuitry in a condition to search for further requests for service. Before an operation complete signal is transmitted from the remote unit to the central office, checks are made to assure that the proper hold magnets have operated and that the proper transmission trunk has been employed. At this point in time, the control relays in the field unit are in the following states:

A relay 1901 operated
B relay 1902 not operated
RL relay 1903 not operated
Auxiliary relay 2409 operated
C1 relay 2419 operated
C2 relay 2413 operated
RL1 relay 2004 not operated
CK relay 2005 not operated The C1 and C2 relays operated when the proper complement of identification relays 3101 through 3108 was operated. That is, when the ID1 relay 3101 operated, a path was closed from the negative potential source 3117 through the make contact 3118 of the ID1 relay 3101 to the C1 conductor 3119, diode 2009, and the winding of the C1 relay 2419 to the positive potential source 2420. The C2 relay operated over a path from the negative potential source 2421, resistor 2422, the winding of the C2 relay, the make contact 2423 of the C1 relay 2419, the C2 conductor 2424, the make contact 3120 of the ID5 relay 3105, the make contact 3118 of the ID1 relay 3101, and the negative potential source 3117. The block conductor 3121 is energized in the event of certain types of trouble in the field unit and energization thereof serves to inhibit operation of the C2 relay 2413. For example, if both the A and B relays 1901 and 1902 become inadvertently operated, a path is provided from the negative potential source 2301 through the make contact 2304, the make contact 2305, conductor 2306, to the junction of resistor 2422, and the winding of the C2 relay 2413. A negative potential from source 2301 applied to this point inhibits operation of the C2 relay as the source 2301 and the source 2421, from which operating potential for the C2 relay normally originates, are at the same voltage level. Similarly, if certain improper sets of identification relays 3101 through 3108 become operated, operation of the C2 relay 2413 will be inhibited. For example, if the ID5 and either the ID7 or ID8 relays become simultaneously energized, the block conductor 3121 will be connected to the negative potential source 3122. Also, if the ID6 relay and either the ID7 or ID8 relays become simultaneously energized, a path will also be provided from the negative potential source 3122 to the block conductor 3121. Similarly, if one of the first two identification relays and one of the second two identification relays become simultaneously operated, along with the operation of any one of the last four identification relays, a path will be provided from the negative potential source 3117 to the block conductor 3121. Assuming that a proper combination of identification relays is operated, both the C1 and C2 relays will be operated at the time the hold magnets 2212 and 2213 are energized.

In the process of establishing the identity of the transmission trunk to be employed, a signal was transmitted to the field over the tip conductor 440 of the second control pair. An operation complete signal is transmitted from the field unit to the central office unit over the remaining conductor of the second control pair, in this instance over the ring conductor 441. The R2 conductor 441 is energized over the following path; the make contact 2418 of the C1 relay 2419, the make contact 2010, the R'2 conductor 2011, the make contact 3123 of the ID5 relay 3105, the SK conductor 3124, the make contact 2012 of the CK relay 2005, resistor 2013, and the negative potential source 2014. The CK or check relay 2005 has primary and secondary windings which tend to aid each other. Energization of either the primary or secondary winding alone is insufficient to operate the CK relay 2005. The secondary winding of the CK relay is operated over a path from the negative potential source 2301, to the positive potential source 2015, and includes the make contact 2302 of the A relay 1901, the secondary winding of the CK relay 2005, diode 2018, resistor 2017, and the make contact 2016 of the C2 relay 2413. The primary winding of the CK relay is energized over a path from the negative potential source 2019 to the operating potential for the hold magnet 2212 and includes resistor 2020, break contact 2021 of the RL1 relay 2004, conductor 2022, make contact 2023, the CK conductor 2026, the make contact 3125 of the ID1 relay 3101, the make contact 3126 of the ID5 relay 3105, the TSA3 conductor 3127, make contacts 2206 and 2207 of the trunk switch 2203. As previously described, the hold magnet 2212 was energized from the positive potential source 2008. The positive potential source 2008 is applied to the hold magnet 2212 only through relay contacts and not through any resistive elements. The positive potential applied to the TSA3 conductor 3127 is therefore greater than the potential from the potential source 2250 applied through resistor 2251. Accordingly, unless the crosspoints 2206 and 2207 are closed, the potential applied through resistor 2251 is insufficient to permit operation of the CK relay 2005. From the above, it is seen that the primary winding of the CK relay 2005 is employed to assure that the desired connections have been established through the network as evidenced by operation of appropriate ones of the identification relays ID1 through ID8 and the appropriate hold magnet. Operation of the CK relay 2005 completes the previously enumerated path which provides the operation complete signal over the ring conductor 441 of the second control pair.

The operation complete signal on conductor 441 passes through the make contact 449 of the TR1 relay 437, the make contact 1412 of the ID5 relay 1405, the SK conductor 1413, the make contact 711 of the CK1 relay 702, conductor 426 to the 20 millisecond delay circuit 422. Enablement of the 20 millisecond delay circuit 422 serves to reset the SA flip-flop 404 to its "0" state and thereby initiates steps to return the control circuit at both the field and the central office unit to the scanning operation. However, before the 20 millisecond delay circuit 422 can be enabled, a check is made in the central office which is similar to the check conducted at the remote unit. This check process employs the CK relay 706, which, like its counterpart in the field, has a primary and secondary winding. These windings are connected to oppose each other. The secondary winding of the CK relay 706 is energized over a path from the TSA3 conductor 929 through the make contact 1005 of the ID5 relay 1405, the make contact 1006 of the ID1 relay 1401, the CK conductor 1409, the break contact 806 of the RL relay 804, conductor 807, the secondary winding of the check relay 706, resistor 707, diode 708, conductor 709, and the make contact 438 of the TR1 relay 437 to ground potential. Accordingly, operation of the appropriate trunk relay shown in FIG. 9 will provide an operating signal for the secondary winding of the CK relay 706. The C relay 432 is employed to assure that a proper combination of identification relays is operated at the central office unit and contacts of the C relay are employed to complete an enabling path for the primary winding of the CK relay 706. The C relay 432 operates from ground potential via the C conductor 450, the make contact 1414 of the ID5 relay 1405, the make contact 1415 of the ID1 relay 1401, and the negative potential source 1416. The operating path for the primary winding of the CK relay 706 is from ground potential through the make contact 438 of the TR1 relay 437, conductor 709, diode 712, the break contact 808 of the RL relay 804, the primary winding of the CK relay 706, conductor 809, resistor 810, break contact 811 of the RL relay 804, conductor 812, make contact 451 of the C relay 432, and the negative potential source 458.

The operation of the CK relay 706 in turn operates the CK1 relay 702 through the closure of contact 710. The operation of the CK1 relay 702 effects release of the operated select magnets by the opening of contact 701. The CK1 relay locks through a holding path including its own contact 718 and contact 460 of the TR relay 418. The release of the select magnets releases the operated one of the LK0 through LK4 relays 1101 through 1105 which was held operated over a path which includes conductor 1513 and the operated off-normal contacts of the select magnets to the potential source 1512.

Accordingly, a verification in the field that the desired trunk has been connected and a verification in the field and central office unit to assure that the appropriate trunk has been employed is sufficient to provide a path for enabling the 20 millisecond delay circuit 422 with a signal from the field which indicates that the setup procedure has been completed.

Enablement of the 20 millisecond delay circuit resets the SA flip-flop 404 to its "0" state and thereby initiates a sequence to restore both the central office unit and the field unit to the scanning sequence. Enablement of the 20 millisecond delay circuit 422 also serves to hold the release action flip-flop 405 in its "0" state.

When the SA flip-flop is reset, its "0" output conductor 428 is energized and this is effective to turn off the operated one of the A or B transistors 801 and 802. In the subject example, the A transistor 801 will go passive and attendant thereto the A relay 502 will release. The A relay in releasing (1) removes the enabling potential from the LSA through LSD transistors 1601 through 1604 which then become passive and thereby release their associated relays 1605 through 1608; (2) removes the enabling potential from the 60 through 63 capacitors 1201 through 1204 which become passive and effect release of the operated relay after group 1205 through 1208; (3) releases the TR1 relay 437 to prepare the operating path for the TR relay 418; (4) opens the holding path of the identification relays 1401 through 1408 which release and in turn release the C relay 432 and the CK relay 706.

The CK1 relay 702 remains operated under control of the TR relay 418 until the field unit is ready to receive scanning pulses from the central office. The release of the trunk identity relays 1401 through 1408 removes the operating potentials for the trunk identity relays 3101 through 3108 in the field unit. Release of the field identification relays effects release of the previously operated A or B relays 1901 or 1902 and the auxiliary relay 2409. Release of the identification relays also effects release of the select magnets in the field unit and this in turn opens the enabling path for the G0 transistor 2701 and attendant thereto the hold path of the G0 relay 2705. Release of the G0 relay 2706 opens contact 2712 and thereby opens the operating path for the LK0 relay 2801. Release of the LK0 relay 2801 opens contact 2816 thereof and thereby breaks the path between the potential source 2817 and the C1 relay 2419. The C1 relay is thereby released and in turn the holding path for the C2 relay 2413 is broken. When the C1 relay releases, the first control pair is reconnected to the coil 2100 and the parallel operating paths for the TR relay 418 to the windings of the A and B relays 1901 and 1902 are re-established. Release of the C1 relay 2419 in the field unit signals completion of the required actions in the field unit and the operation of the TR relay 418 in the central office unit opens a holding path for the CK1 relay 702 which now releases.

When the CK1 relay releases, the break contact 713 closes and thereby raises the potential on conductor 714 away from the level of the potential source 715. This change in signal applied through capacitor 716 serves to enable the Pulse Stretcher 305 and attendant thereto the Interval Timer 330. The Interval Timer 330, in cooperation with the Pulse Stretcher 305, will serve to hold the Astable Circuit 301 in its set state and to hold the stages of the Counter 302 in their reset state for approximately 100 milliseconds. It should be noted that the output signal on the "1" conductor 312 of the Astable Circuit 301 is ineffective to advance the Counter 302 as all stages are being held in their reset state. This 100 millisecond timing interval provides sufficient time for the central office and field unit relays and transient voltages within the system to restore to the state necessary for scanning of lines.

*Release Request*

As previously described, the scanning of trunks to detect a request for release of the trunk proceeds in an ordered fashion at the central office unit concurrently with the scanning of lines to detect requests for service. As previously indicated, the line which is scanned is determined by the states of the six stages of the Binary Counter 302 and of the AB flip-flop 601. The identity of the trunk which is to be scanned at any given instant is determined by the setting of the first five stages of the Binary Counter 302. In that only twenty trunks are employed, only twenty of the possible thirty-two states of the first five stages of Counter 302 are employed. Further, since the first five stages of the Counter 302 pass through their complete natural cycle four times during the period that the 128 lines in the A and B group are scanned, each trunk is therefore scanned four times during the period in which each line is scanned once. A request for release is indicated when the calling party hangs up in both an originating and terminating call. In either event, the line equipment in the central office such as 140 through 143 will be released and a significant negative potential will appear on the sleeve conductor such as 1301. With a significant negative potential on the sleeve conductor 1301 and a path completed through the line and trunk switch crosspoints 1306, 1307, 1316, and 1317, the direct current potential on the A3 conductor during scanning will be such that a pulse will appear on the release request conductor 313.

The Trunk Scanner 311 accepts the steady state input signals on the TG0 through TG4 conductors, the G0 through G4 conductors, and the A1 through A4, B1 through B4, and AB1 through AB12 conductors. In addition, the P pulse occurs on the input conductor 315. One conductor from each of the groups TG0 through TG4 and G0 through G4 is simultaneously energized to define one of the twenty trunks. If a trunk is requesting release, a D.-C. potential will exist on the appropriate one of the conductors A1 through A4, B1 through B4, or AB1 through AB12. If a request signal exists on one of the last enumerated conductors at the time the trunk associated therewith is scanned, a pulse will appear on the RT conductor 313 coincident in time with the P pulse on conductor 315.

The signal on conductor 313 sets the release action flip-flop 405 to its "1" state and thereby initiates actions within both the central office unit and the remote concentrator unit to release the transmission path between the concentrator subscriber and his associated central office line equipment. When the release action flip-flop 405 is set to its "1" state, a signal is transmitted through OR gate 425 to hold the service action flip-flop 404 in its reset state and over conductor 430 through OR gate 409 to hold the Astable Circuit 301 in its reset state. Further, when the release action flip-flop 405 is set to its "1" state, the signal on conductor 430 serves to energize the RL relay 804. In response thereto, make contact 813 closes a path from ground potential to operate the RL1 relay 501. The RL1 relay 501 is auxiliary to the RL relay 804 and merely serves to provide an appropriate number of contacts for the release action. By the above steps, the Astable Circuit 301 is held in its "0" state; therefore, the incrementing of the Counter 302 is halted. Similarly, the incrementing of the Field Unit Counter 2501 is halted. In the process of releasing the desired transmission trunk, signals must be transmitted from the central office to the remote unit to identify the trunk in question. Accordingly, the same ones of the identification relays 1401 through 1408 that were operated during the setup of the transmission connection must now be operated to effect release. As previously noted with respect to the establishment of a connection through the switching network, the TR relay 418 is held operated during scanning over a pair of paths, one of which includes the diode 445 and the break contact 805 of the RL relay 804. When the RL relay 804 operates, contact 805 opens and thereby opens one of the parallel holding paths for the TR relay 418. The TR relay 418, however, remains operated over a path which includes the diode 446 and the winding of the B relay 1902. The TR relay will not release until the auxiliary relay 2409 is operated.

Closure of the make contact 528 of the RL1 relay 501 places the negative potential 517 on the BX conductor 504. This serves to energize the LSA through LSD transistors 1601 through 1604 in accordance with the setting of the 0, 3, 4, and 5 stages of the counter 302. Attendant thereto, the associated ones of the LSA through LSD relays 1605 through 1608 operate. Selective operation of the LSA through LSD relays provides a path between the R0 through R3 conductors and the windings of the ID1 through ID8 relays 1401 through 1408. In the example in which subscriber's line S0 is connected to the third transmission trunk of the A group, the ID1 and ID5 identification relays 1401 and 1405 must operate on release of the trunk as they were operated during the establishment of the connection. Operation of the ID1 and ID5 relays 1401 and 1405 requires that the paths be established from the R0 conductor 529 through diode 1620 to the ID1 conductor 1621 and through diode 1626, the break contact 1622 of the LSA relay 1605, the break contact 1623 of the LSB relay 1606, and the make contact 1624 of the LSD relay 1608, to the ID5 conductor 1625. Operating potential for the identification relays 1401 and 1405 is derived over the path which includes the make contact 530 of the RL1 relay 501, the G0 conductor 1217, the make contact 1213 of the G0 relay 1205, the GB conductor 1222, the make contact 519 of the RL relay 501, and the break contact 455 of the C relay 432 to the negative potential source 458. The above enumerated path through the contacts of the G0 relay was completed after the appropriate ones of the LSA through LSD relays 1605 through 1608 were operated to remove the inhibiting potential from the conductor 1614. After the inhibiting potential is removed from conductor 1614, the transistors G0 through G3 are enabled in accordance with the setting of the second and third stages of the Binary Counter 302.

In the example, the G0 transistor 1201 becomes active. Accordingly, two of the eight identification relays 1401 through 1408 are closed in accordance with the setting of the Binary Counter 302.

The operation of the identification relays completes a path from the negative potential source 1416 through the make contact 1415 of the ID1 relay 1401 and the make contact 1414 of the ID5 relay 1405 to the C conductor 450. A negative potential on conductor 450 serves to operate the C relay 432. The C relay as seen above operates in response to the operation of a plausible number of identification relays.

Once the appropriate identification relays have been operated in the central office unit as indicated by operation of the C relay 432, a signal is transmitted from the central office unit to the field unit over the tip conductor 440 of the second control pair. The tip conductor is energized over a path from a positive potential source 454, make contact 456 of the C relay 432, make contact 814 of the RL relay 804, the break contact 439 of the TR1 relay 437, to the tip conductor 440. A positive potential on the conductor 440 indicates to the field unit that a release action is required. The trunk relay in the central office and the hold magnets associated therewith are released by means of a shunting action. Before proceeding to describe the path employed in the release of the trunk relay and the hold magnets, it should be noted that when the TR relay 418 released, the TR1 relay operated over a path which included ground, the break contact 457 of the TR relay 418, the winding of the TR1 relay 437, conductor 522, the make contact 531 of the RL1 relay 501, to the negative potential source 521.

The shunting path for releasing the hold magnets comprises a source of ground potential, make contact 438 of the TR1 relay 437, diode 712, the make contact 815 of the RL relay 804, the primary winding of the CK relay 706, the make contact 816 of the RL relay 804, the CK conductor 1409, the make contact 1006 of the ID1 relay 1401, the make contact 1005 of the ID5 relay 1405, and the TSA3 conductor 929. Ground potential on the TSA3 conductor 929 shunts down the holding current for the TKA3 relay 903 effecting its release and thereby closes the above enumerated path from ground through the break contact 927 to conductor 1370. Prior to release of the trunk, the conductor 1370 is connected through the trunk switch crosspoints 1316 and 1317 and the diode 1314 to the winding of the line switch hold magnet 1312. With ground potential on both sides of the line switch hold magnet 1312, the hold magnet releases, opening its auxiliary contact 1305 and thereby breaks the holding path for the trunk switch hold magnet 1323. The desired release action at the central office unit is now complete; however, before scanning for further release requests and requests for service can be resumed, the release action must be completed in the field unit and a signal signifying completion must be transmitted from the field unit to the central office unit. The action in the central office and field units is checked by means in the CK relay 706, and when the RL relay 804 is operated, currents through the primary and secondary windings of the CK relay 706 provide opposing magnetic fields and the CK relay does not operate. The secondary winding of the CK relay is energized over a path from ground potential, the make contact 438 of the TR1 relay 437, the diode 708, resistor 707, the secondary winding of the CK relay 706, conductor 807, make contact 803, of the RL relay 804, the make contact 451 of the C relay 432, and the negative potential source 458. The primary winding is energized over a path from ground potential, the make contact 438, conductor 709, diode 712, make contact 815 of the RL relay 804, conductor 809, the primary winding of the CK relay 706, make contact 816 of the RL relay 804, the check conductor 1409, the make contacts 1006 and 1005 of the ID1 and ID5 identification relays, respectively, the TSA3 conductor 929, the hold contact 928 of the TKA3 relay 903, resistor 930, and negative potential source 931. After the winding of the TKA3 relay has been shunted down and the contact 928 has released and subsequent thereto the trunk switch crosspoints 1316 and 1317 have released, the flow of current through the primary winding of the CK relay 706 will be halted. Accordingly, the CK relay, under the influence of the field provided by the secondary winding, will operate. As explained with respect to the establishment of a connection, operation of the CK relay operates the CK1 auxiliary relay. The action in central office unit is halted at this time awaiting a response from the field unit indicating that the field unit has completed its operation. This response is brought back to the central office unit over the remaining one of the two conductors of the second control pair as was the case in the establishment of a connection. When the signal is received from the field unit, the central office unit will proceed in the same manner as is described with respect to the establishment of a connection; that is, the remainder of the central office equipment is released and a recycling is effected to prepare for further scanning of lines and trunks. During the recycling period in the central office, pulses will not be transmitted to the conductors of the first cable pair and it is this absence of pulses which is employed in the field unit to effect recycling of the Counter 2501.

The positive signal on the tip conductor 440 of the second control pair effects operation of the RL relay 1903 over a path which includes the T2 conductor 440, the break contact 2410 of the C1 relay 2419, the diode 2024, break contact 2025 of the auxiliary relay 2409, through the winding of the RL relay 1903, to ground potential. The RL relay 1903 locks through its make contact 1907 around the break contact 2025 of the auxiliary relay 2409. The RL1 auxiliary release relay 2004 operates in response to closure of the make contact 1908 of the RL relay 1903. Closure of the make contact 2027 of the RL1 relay 2024 completes a path from the negative potential source 1909 through the make contact 1910 to operate the auxiliary relay 2409. As in the case of the establishment of a connection, operation of the auxiliary relay 2409 transfers the first control pair comprising conductors 414 and 415 from the winding of the line coil 2101 to the windings of the ID1 through ID8 identification relays 3101 through 3108. As was the case in the establishment of a call, the signals on the first and second control pairs are such that the appropriate identification relays operate in the field unit. In the example, the ID1 and ID5 identification relays 3101 and 3105 will operate. When the appropriate identification relays have operated, the C1 and C2 relays will operate over paths previously described with respect to the establishment of a connection. Operation of the C2 relay provides a path from the negative potential 2019 through the primary winding of the CK relay 2005, the make contact 2028 of the RL1 relay 2004, conductor 2022, the make contact 2023 of the C2 relay 2413, the CK conductor 2026, the make contact 3125 of the ID1 relay 3101, and the make contact 3126 of the ID5 relay 3105, the TSA3 conductor 3127, resistor 2251, to the positive potential source 2250. The current through this path is limited by the resistor 2251. The negative potential applied through the trunk switch sleeve contacts 2206 and 2207, however, is sufficient to shunt down the current in the windings of the trunk switch and line switch hold magnets 2212 and 2213, respectively.

When the shunting potential is applied to the hold magnets 2212 through 2213 through the above enumerated path, sufficient current flows to effect operation of the CK relay 2005. The operation of the CK relay 2005 signifies that a shunting potential has been applied to the desired hold magnets. Operation of the CK relay 2005 completes a path from the negative potential source 2014 to the SK conductor 3124 and then through the make contact 3123 of the ID5 identification relay 3105, the R'2 conductor 2011, the make contact 2010 of the C2 relay 2413, the make contact 2418 of the C1 relay 2419, to the R2 conductor 441. This signal on the R2 conductor 441 signifies to the central office unit that the release process has been completed in the remote unit and in response thereto the central office unit now undertakes the 100 millisecond post operation timing procedure and releases the control apparatus in preparation for continued scanning and detection of requests for service and requests for release.

*Originating Request for Service*

As previously explained with respect to the scanning of lines at the remote unit upon detection of a request for service, a positive pulse will be transmitted from the remote unit to the central office unit via the simplex of the first control pair. The request for service pulse serves to operate the service action flip-flop 404 in the central office unit over a path which includes the diode 403. Detection of a request for originating service temporarily freezes the Counter 2501 in the field unit, and shortly thereafter, the central office unit assumes control of the remote unit in the same manner described with respect to the establishment of a connection after a terminating request for service. After the central office unit has assumed control of the remote unit, the choice of a transmission trunk and links proceeds in the manner previously described and actions at both the central office unit and the remote unit continue until after the desired transmission path has been established.

It is to be understood that the above-described arrangements are but illustrative of the principles of the invention. Numerous other arrangements may be devised by those skilled in the art without departing from the spirit and scope of the invention.

What is claimed is:

1. In a telephone switching system including a central office having a plurality of subscriber line circuits, the combination comprising a central office concentrating unit; a remote concentrating unit; first and second pluralities of subscriber stations served by and connected to said remote concentrating unit; a source of scanning pulses in said central office unit; first, second, and third pluralities of transmission trunks, together fewer in number than both of said first and second pluralities of subscriber stations interconnecting said central office unit and said remote unit; said first plurality of transmission trunks being connected through said remote unit only to said first plurality of subscriber stations, said second plurality of transmission trunks being connected through said remote unit only to said second plurality of subscriber stations, said third plurality of transmission trunks being connected through said remote unit to both of said first and second plurality of subscriber stations; means interconnecting said central office unit and certain of said subscriber line circuits; scanning means responsive to said scanning pulses for simultaneously determining the supervisory states of said certain subscriber line circuits and first, second, and third pluralities of transmission trunks to said remote unit; and means included in said scanning means for cyclically scanning said first, second, and third pluralities of transmission trunks a plurality of times for each scanning cycle of said certain subscriber line circuits.

2. The combination of claim 1 further comprising first and second pairs of control conductors interconnecting said central office unit and said remote unit, means for transmitting said scanning pulses to said remote unit over one of said pairs of control conductors, scanning means in said remote unit responsive to said scanning pulses for determining the supervisory states of said stations connected to said remote concentrating unit, and means responsive to a service request of one of said stations for temporarily halting further scanning in said remote unit and for transmitting a request for service signal to said central office unit.

3. The combination of claim 2 wherein said request for service is transmitted from said remote unit to said central office unit via the simplex path of one of said control pairs.

4. The combination claimed in claim 1 wherein said central office unit and said remote unit each further comprise line and trunk crossbar switches and interconnecting transmission links for selectively and individually connecting said certain subscriber line circuits and said transmission trunks and for connecting said transmission trunks and said subscriber stations.

5. The combination claimed in claim 2 further comprising control means in said central office unit responsive to a signal from said scanning means in said central office unit indicating a request for service from one of said certain line circuits to terminate a call to one of said subscriber stations, said control means including means for temporarily halting the generation of said scanning pulses and means for transmitting an indication over one of said pairs of control conductors from said central office unit to said remote unit that one of said subscriber stations is being called, means in said central office unit for assigning one of said tranmission trunks between said central office unit and said remote unit to said terminating call to said one of said subscriber stations, means for establishing a connection between said one of said certain line circuits and said assigned transmission trunk, means for transmitting indicia representative of the identity of said assigned trunk from said central office unit to said remote unit over said pairs of control conductors, and means in said remote unit responsive to said identification indicia for establishing a connection between said assigned trunk and said called subscriber station.

6. The combination claimed in claim 5 further comprising means in said remote unit for checking that said connection established through said remote unit is in fact to said assigned trunk, and means in said remote unit for transmitting an operation complete signal from said remote unit to said central office unit indicating that the desired interconnection has been established.

7. The combination of claim 6 further comprising means in said central office unit for checking to assure that the connection established through said central office unit is in fact a connection between said one of said certain line circuits and said assigned trunk, and means in said central office unit responsive to a signal from said checking means in said central office unit and to said operation complete signal from said remote unit for recycling said central office unit in preparation for further scanning of lines and trunks.

8. A line concentrating system comprising a plurality of subscriber stations, a field concentrator unit in which said stations terminate, a central office concentrator unit, a plurality of transmission trunks fewer in number than said plurality of subscriber stations interconnecting said field unit and said central office unit, a telephone central office having a plurality of subscriber line circuits equal in number to and individually associated with said subscriber stations, transmission and supervisory paths interconnecting said central office subscriber line circuits and said central office concentrator unit, a pulse source located in said central office unit, scanning means in said central office unit responsive to said pulse source for simultaneously scanning said line circuits and said trunks to detect requests for service and requests for disconnect, means in said central office unit for transmitting pulses from said source to said field unit, means in said field unit responsive to pulses from said central office unit for scanning said subscriber stations to detect a request for originating service, means responsive to said last-named means for temporarily halting the scanning of lines in said field unit and for transmitting a request for service signal from said field unit to said central office unit, and means including means for transmitting pulses of either polarity from said central office unit to said field unit for synchronizing said central office unit scanning means and said field unit scanning means.

9. A line concentrating system in accordance with claim 8 further comprising means in said central office unit responsive to said request for service signal for disabling said pulse source and for transmitting control signals to said field unit whereby said field unit is placed under the control of said central office unit for purposes of establishing a desired connection between said subscriber's station requesting service and a particular one of said transmission trunks.

10. A line concentrating system in accordance with claim 9 further comprising means in said central office unit responsive to a request for service signal from said central office scanning means or from said field unit scanning means for establishing a transmission path through said central office unit and said field unit between a subscriber station and its associated subscriber line circuit.

11. A line concentrating system in accordance with claim 10 further comprising means responsive to a request for disconnect signal from said scanning means in said central office unit for disabling said pulse source, for seizing control of said field unit and for controlling the release of switching means in said central office unit and said field unit connected to said trunk from which said request for disconnect signal originated.

12. The combination of claim 10 further comprising counting means wherein an indication is maintained of the identities of the line and trunk being scanned at any particular time.

13. A line concentrator system comprising a plurality of subscribers' stations arranged in first and second groups of stations, a field concentrator unit in which said stations terminate, a central office concentrating unit, a plurality of transmission trunks fewer in number than said plurality of subscriber stations interconnecting said field unit and said central office unit, a telephone central office having a plurality of subscriber line circuits equal in number to and individually associated with said subscriber stations, means interconnecting said central office subscriber line circuits and said central office concentrating unit, a pulse source located in said central office unit, a scanning means in said central office unit responsive to pulses from said source for scanning said subscriber line circuits, bistable means in said central office unit for conditioning said first or second group of subscriber lines in preparation for scanning thereof, counting means in said central office unit for defining the line to be scanned within the conditioned group, means in said central office unit for transmitting pulses of a first polarity to said field unit when lines of said first group are to be scanned and for transmitting pulses of a second polarity from said central office unit to said field unit when said lines of said second group are to be scanned, and means in said field unit responsive to said first and second polarities of pulses for selectively scanning said subscriber stations to detect requests for originating service.

14. The combination defined in claim 13 wherein said last-named means includes counting means responsive to said first and second polarities of pulses for defining the subscriber's station to be scanned and means for scanning said stations.

15. The combination defined in claim 14 further comprising recycling means in said central office unit controlled by said counting means in said central office unit for temporarily disabling said pulse source and resetting said counting means at said office unit to an initial condition.

16. The combination defined in claim 15 further comprising recycling means in said remote unit operative in the absence of said first and second pluralities of pulses from said office unit for resetting said counting means in said field unit to an initial condition.

17. In a telephone line concentrating system having a central office unit and a field unit interconnected by transmission and control paths, the combination comprising a source of control pulses in said central office unit, means in said central office unit responsive to pulses from said source for transmitting pulses of a first and a second plurality to said field unit alternatively, first and second pulse detection means in said field unit responsive to said pulses of said first and second polarity and a pair of mutually exclusive monostable means responsive to said first and second pulse detection means for generating control signals for said field unit.

18. The combination of claim 17 wherein said pair of mutually exclusive monostable means comprise a first transistor individual to one of said monostable means, a second transistor individual to the other of said monostable means, and a third transistor common to said one and said other of said monostable means.

References Cited in the file of this patent
UNITED STATES PATENTS

| | | |
|---|---|---|
| 2,715,658 | Dunlap | Aug. 16, 1955 |
| 2,908,765 | Gatzert | Oct. 13, 1959 |
| 2,925,473 | Lucas | Feb. 16, 1960 |
| 2,944,115 | Henquet et al. | July 5, 1960 |
| 2,957,949 | James et al. | Oct. 25, 1960 |